US012493443B2

(12) United States Patent
Huang et al.

(10) Patent No.: US 12,493,443 B2
(45) Date of Patent: Dec. 9, 2025

(54) PROJECTION DISPLAY METHOD AND ELECTRONIC DEVICE FOR IMMERSIVE DISPLAY EFFECT SYNCHRONIZATION

(71) Applicant: HUAWEI TECHNOLOGIES CO., LTD., Shenzhen (CN)

(72) Inventors: Decai Huang, Wuhan (CN); Can Zhou, Wuhan (CN); Bo Wang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 188 days.

(21) Appl. No.: 18/340,684

(22) Filed: Jun. 23, 2023

(65) Prior Publication Data

US 2023/0350631 A1 Nov. 2, 2023

Related U.S. Application Data

(63) Continuation of application No. PCT/CN2021/136691, filed on Dec. 9, 2021.

(30) Foreign Application Priority Data

Dec. 25, 2020 (CN) .......................... 202011567127.3

(51) Int. Cl.
G06F 3/14 (2006.01)
G06F 3/0484 (2022.01)
H04M 1/72409 (2021.01)

(52) U.S. Cl.
CPC .......... G06F 3/1462 (2013.01); G06F 3/0484 (2013.01); H04M 1/72409 (2021.01); G06F 2203/04803 (2013.01)

(58) Field of Classification Search
CPC ................. G06F 3/1462; G06F 3/0484; G06F 2203/04803
See application file for complete search history.

(56) References Cited

U.S. PATENT DOCUMENTS

2015/0074589 A1 3/2015 Pan et al.
2016/0080708 A1* 3/2016 Urata ...................... H04W 4/80
348/744

(Continued)

FOREIGN PATENT DOCUMENTS

CN 106445269 A 2/2017
CN 110673782 A 1/2020
CN 111314768 A * 6/2020

Primary Examiner — Terrell M Robinson
(74) Attorney, Agent, or Firm — Leydig, Voit & Mayer, Ltd.

(57) ABSTRACT

A first electronic device displays a first interface including first content, where the first interface further includes a status bar and/or a navigation bar of the first electronic device. A second electronic device displays a first projection window including the first content, where the first projection window further includes any one of the status bar, the navigation bar, and a title bar of a projection application. The first electronic device switches from displaying the first interface to displaying a second interface, where the second interface includes second content, and the second interface does not include the status bar and the navigation bar. The second electronic device switches from displaying the first projection window to displaying a second projection window, where the second projection window includes the second content, and the second projection window does not include the status bar, the navigation bar, and the title bar.

20 Claims, 44 Drawing Sheets

(56) References Cited

U.S. PATENT DOCUMENTS

| | | | |
|---|---|---|---|
| 2017/0017454 A1* | 1/2017 | Kim | G06F 3/04845 |
| 2017/0235435 A1* | 8/2017 | Sohn | G06F 3/0481 |
| | | | 715/738 |
| 2018/0275948 A1* | 9/2018 | Xu | G06F 3/1454 |
| 2019/0012769 A1 | 1/2019 | Arrieta | |
| 2022/0191313 A1* | 6/2022 | Pan | G06F 1/1677 |
| 2022/0229624 A1* | 7/2022 | Xiong | G06F 3/04817 |
| 2022/0308823 A1* | 9/2022 | Fan | G06F 3/1454 |

\* cited by examiner

PROJECTION DISPLAY METHOD AND ELECTRONIC DEVICE FOR IMMERSIVE DISPLAY EFFECT SYNCHRONIZATION

CROSS-REFERENCE TO RELATED APPLICATIONS

This application is a continuation of International Application No. PCT/CN2021/136691, filed on Dec. 9, 2021, which claims priority to Chinese Patent Application No. 202011567127.3, filed on Dec. 25, 2020. The disclosures of the aforementioned applications are hereby incorporated by reference in their entireties.

TECHNICAL FIELD

This application relates to the field of communication technologies, and in particular, to a projection display method and an electronic device.

BACKGROUND

With the development of electronic technologies and the mobile internet, a user may simultaneously own more electronic devices such as a mobile phone, a tablet computer, a personal computer (PC), and a smart home device (such as a television). A plurality of electronic devices of the user may be connected to each other for use. For example, the mobile phone of the user may be connected to the tablet computer, and screen content of the mobile phone may be projected on the tablet computer for display, showing advantages of a large screen.

In the foregoing example, the mobile phone projects a screen on the tablet computer. To improve visual experience of the user when using the mobile phone, when the mobile phone displays a user interface (UI) of an application, a status bar and a navigation bar of the mobile phone may be hidden, to implement an immersive display effect, so that the UI interface of the application occupies the entire screen of the mobile phone. However, when the tablet computer receives projection from the mobile phone, the screen content of the mobile phone that is displayed on the tablet computer cannot implement the foregoing immersive display effect. For example, the screen content of the mobile phone that is displayed on the tablet computer may include content of the status bar and the navigation bar of the mobile phone, and may further include a title bar of a projection application used to implement the foregoing projection function.

In other words, in the foregoing solution of projection from the mobile phone to the tablet computer, although the immersive display effect may be implemented on a mobile phone side, the immersive display effect cannot be implemented on the tablet computer, that is, immersive display effect synchronization between the mobile phone and the tablet computer cannot be implemented.

SUMMARY

This application provides a projection display method and an electronic device, to implement immersive display effect synchronization between a projecting device and a projected device in a projection scenario.

According to a first aspect, this application provides a projection display method. The method is applied to a system including a first electronic device and a second electronic device, and the first electronic device is connected to the second electronic device.

The method may include: The first electronic device displays a first interface including first content, where the first interface further includes a status bar and/or a navigation bar of the first electronic device. The second electronic device displays a first projection window including the first content, where the first projection window further includes any one of the status bar, the navigation bar, and a title bar of a projection application. To be specific, when the first electronic device displays the first interface in a "non-immersive display" manner, the second electronic device may alternatively display a projection window (namely, the first projection window) of the first interface in the "non-immersive display" manner.

In addition, the first electronic device may switch from displaying the first interface to displaying a second interface, where the second interface includes second content, and the second interface does not include the status bar and the navigation bar. The second electronic device may switch from displaying the first projection window to displaying a second projection window, where the second projection window includes the second content, and the second projection window does not include the status bar, the navigation bar, and the title bar. To be specific, when the first electronic device switches from displaying the first interface in the "non-immersive display" manner to displaying the second interface in an "immersive display" manner, the second electronic device may alternatively display a projection window (namely, the second projection window) of the second interface in the "immersive display" manner.

In conclusion, according to the method in this application, immersive display effect synchronization between a projecting device (that is, the first electronic device) and a projected device (that is, the second electronic device) can be implemented in a projection scenario.

In a possible design manner of the first aspect, after the first electronic device switches from displaying the first interface to displaying the second interface, and before the second electronic device switches from displaying the first projection window to displaying the second projection window, the method in this application may further include: The first electronic device sends the second content to the second electronic device. The first electronic device collects first status data of the first electronic device, and sends the first status data to the second electronic device. The first status data indicates that the first electronic device hides the status bar and the navigation bar. The second electronic device may receive the first status data and the second content. In other words, the first electronic device may collect status data of the first electronic device, and indicate, to the second electronic device by using the status data of the first electronic device, whether the first electronic device hides the status bar and the navigation bar.

In this way, the second electronic device may display, based on the first status data, the second projection window that includes the second content but does not include the status bar, the navigation bar, and the title bar. The first status data indicates that the first electronic device hides the status bar and the navigation bar. Therefore, to implement status synchronization between the second electronic device and the first electronic device, the second electronic device may hide the status bar, the navigation bar, and the title bar, and display, in the "immersive display" manner, the second projection window that does not include the status bar, the navigation bar, and the title bar.

In another possible design manner of the first aspect, after the first electronic device displays the first interface including the first content, and before the second electronic device displays the first projection window including the first content, the method in this application further includes: The first electronic device sends the first content to the second electronic device. The first electronic device collects second status data of the first electronic device, and sends the second status data to the second electronic device. The second status data indicates that the first electronic device does not hide the status bar and the navigation bar. In other words, the first electronic device may collect status data of the first electronic device, and indicate, to the second electronic device by using the status data of the first electronic device, whether the first electronic device hides the status bar and the navigation bar.

In this way, the second electronic device may display, based on the second status data, the first projection window that includes the first content, the status bar, the navigation bar, and the title bar. The second status data indicates that the first electronic device does not hide the status bar and the navigation bar. Therefore, to implement status synchronization between the second electronic device and the first electronic device, the second electronic device may not hide the status bar, the navigation bar, and the title bar, and display, in the "non-immersive display" manner, the first projection window that includes the status bar, the navigation bar, and the title bar.

In another possible design manner of the first aspect, after the first electronic device switches from displaying the first interface to displaying the second interface, the first electronic device may alternatively switch from an immersive display state to a non-immersive display state. In other words, the first electronic device may switch from hiding the status bar and the navigation bar to not hiding (that is, displaying) the status bar and the navigation bar. In addition, the first electronic device may alternatively indicate the second electronic device to switch from the immersive display state to the non-immersive display state.

In another possible design manner of the first aspect, in a physical display projection scenario, the first electronic device may trigger the first electronic device to collect the status data of the first electronic device. This design manner describes a trigger condition or a trigger occasion for collecting, by the first electronic device, the status data of the first electronic device in the physical display projection scenario.

Specifically, the method in this application may include: collecting the status data of the first electronic device when the first electronic device performs landscape/portrait mode switching; or collecting the status data of the first electronic device when the first electronic device receives a first preset operation of a user; or collecting the status data of the first electronic device when a display interface of the first electronic device is switched from an interface of an application to an interface of another application; or the first electronic device periodically collects the status data of the first electronic device. The status data of the first electronic device is the first status data or the second status data.

In another possible design manner of the first aspect, in a virtual display projection scenario, the first electronic device displays the first content or the second content on a virtual display that is generated when the first electronic device adapts to a screen size of the second electronic device.

In the virtual display projection scenario, the second electronic device may trigger the first electronic device to collect the status data of the first electronic device. This design manner describes a trigger condition or a trigger occasion for collecting, by the first electronic device, the status data of the first electronic device in the virtual display projection scenario.

Specifically, the method in this application may further include: After receiving a first message from the second electronic device, the first electronic device collects the status data of the first electronic device. The status data of the first electronic device is status data of the virtual display. The status data of the virtual display is the first status data or the second status data.

The first message is sent when the second electronic device performs landscape/portrait mode switching, and the first message indicates the first electronic device to update a projection interface of the virtual display in response to the landscape/portrait mode switching of the second electronic device; or the first message is sent when the second electronic device receives a second preset operation, and the first message indicates the first electronic device to update a projection interface of the virtual display in response to the second preset operation.

The first message is further used to trigger the first electronic device to collect the status data of the virtual display.

In another possible design manner of the first aspect, at least one of the first interface, the second interface, a setting interface of the first electronic device, or a notification bar of the first electronic device includes a preset function switch. The preset function switch is used to start or close a preset function. The preset function is a function of synchronizing the status data of the first electronic device to the second electronic device by the first electronic device.

Before the first electronic device collects the status data of the first electronic device, the method in this application further includes: The first electronic device receives an enabling operation performed by the user on the preset function switch.

In this design manner, in a process in which the first electronic device projects a screen to the second electronic device, when the first electronic device meets the foregoing trigger condition or trigger occasion, the first electronic device cannot collect the status data of the first electronic device. Instead, the method in this application can be performed only after the preset function switch is started, and the foregoing trigger condition or trigger occasion is met.

In another possible design manner of the first aspect, the status data (for example, the first status data or the second status data) transmitted by the first electronic device to the second electronic device is specifically an immersive data structure. The data structure may include at least: an immersive event identifier tag_immersive and an immersive event value_immersive. Therefore, the second electronic device parses the immersive status data (that is, the immersive data structure) to obtain the immersive event identifier tag_immersive and the immersive event value_immersive. The immersive event identifier tag_immersive may be referred to as an event identifier for short. The immersive event value_ immersive may include a first event and a second event.

Specifically, the first status data includes an event identifier and information about a first event, and the second status data includes the event identifier and information about the second event.

The event identifier indicates functions or roles of first status information and second status information, and the functions or roles of the first status information and the second status information are: indicating to the second electronic device that the first electronic device hides or displays the status bar and the navigation bar.

The information about the first event indicates an event of hiding the status bar and the navigation bar during projection from the first electronic device to the second electronic device, and the information about the second event indicates an event of displaying the status bar and the navigation bar during projection from the first electronic device to the second electronic device.

In another possible design manner of the first aspect, the first content and the second content are interface images of a video application; or the first content and the second content are interface images of a game application. In other words, the method in this application is applicable to a process in which the first electronic device projects a screen to the second electronic device in a game scenario or a video scenario.

In another possible design manner of the first aspect, the first electronic device and the second electronic device may implement multi-window projection. Specifically, the first interface further includes third content. The first electronic device may display the first content and the third content in two windows of the first interface on split screens. That the first interface includes a status bar and/or a navigation bar of the first electronic device is specifically: each of the two windows of the first interface includes the status bar and/or the navigation bar.

Correspondingly, the first projection window further includes the third content. The second electronic device may display the first content and the third content in two windows of the first projection window on split screens. Each of the two windows of the first projection window includes any one of the status bar, the navigation bar, and the title bar.

In this design manner, the first electronic device displays two windows (such as a window A and a window B) in the "non-immersive display" manner, that is, both the window A and the window B are in the non-immersive display state. In this case, the second electronic device may alternatively display, in the "non-immersive display" manner, two windows (for example, the window A and the window B) projected by the first electronic device. The first electronic device and the second electronic device may implement non-immersive state synchronization.

In another possible design manner of the first aspect, the first electronic device and the second electronic device may implement multi-window projection. Specifically, the second interface further includes fourth content, and the first electronic device may display the second content and the fourth content in two windows of the second interface on split screens. That the second interface does not include the status bar and the navigation bar is specifically: at least one of the two windows of the second interface does not include the status bar and the navigation bar.

Correspondingly, the second projection window further includes the fourth content, and the second electronic device may display the second content and the fourth content in two windows of the second projection window on split screens. Neither of the two windows of the second projection window includes the status bar, the navigation bar, and the title bar.

In this design manner, the first electronic device displays at least one of the two windows (such as the window A and the window B) in the "immersive display" manner, that is, at least one of the window A and the window B is in the immersive display state. In this case, the second electronic device may display, in the "immersive display" manner, the two windows (for example, the window A and the window B) projected by the first electronic device. The first electronic device and the second electronic device may implement immersive state synchronization.

According to a second aspect, this application provides a projection display method. The method may be applied to a first electronic device, and the first electronic device is connected to a second electronic device. In this method, the first electronic device may display a first interface including first content, where the first interface further includes a status bar and/or a navigation bar of the first electronic device. The first electronic device projects the first content to the second electronic device, and sends second status data, where the second status data indicates that the first electronic device does not hide the status bar and the navigation bar. The first electronic device may alternatively switch from displaying the first interface to displaying a second interface, where the second interface includes second content, and the second interface does not include the status bar and the navigation bar. The first electronic device projects the second content to the second electronic device, and sends first status data, where the first status data indicates that the first electronic device hides the status bar and the navigation bar.

It may be understood that for beneficial effects that can be achieved by the method according to any one of the second aspect and the possible design manners provided in the foregoing, refer to the beneficial effects in any one of the first aspect and the possible design manners of the first aspect. Details are not described herein again.

In a possible design manner of the second aspect, the method in this application may further include: collecting status data of the first electronic device when the first electronic device performs landscape/portrait mode switching. Alternatively, collecting status data of the first electronic device when the first electronic device receives a first preset operation of a user. Alternatively, collecting status data of the first electronic device when a display interface of the first electronic device is switched from an interface of an application to an interface of another application. Alternatively, the first electronic device periodically collects status data of the first electronic device.

The status data of the first electronic device is the first status data or the second status data.

In another possible design manner of the second aspect, the first electronic device displays the first content or the second content on a virtual display that is generated when the first electronic device adapts to a screen size of the second electronic device. The method in this application may further include: After receiving a first message from the second electronic device, the first electronic device collects the status data of the first electronic device.

The status data of the first electronic device is status data of the virtual display. The status data of the virtual display is the first status data or the second status data. The first status data indicates that the first electronic device hides the status bar and the navigation bar, and the second status data indicates that the first electronic device does not hide the status bar and the navigation bar.

The first message is sent when the second electronic device performs landscape/portrait mode switching, and the first message indicates the first electronic device to update a projection interface of the virtual display in response to the landscape/portrait mode switching of the second electronic device; or the first message is sent when the second electronic device receives a second preset operation, and the first message indicates the first electronic device to update a projection interface of the virtual display in response to the second preset operation. The first message is further used to trigger the first electronic device to collect the status data of the virtual display.

In another possible design manner of the second aspect, at least one of the first interface, the second interface, a setting interface of the first electronic device, or a notification bar of the first electronic device includes a preset function switch. The preset function switch is used to start or close a preset function, and the preset function is a function of synchronizing the status data of the first electronic device to the second electronic device by the first electronic device. Before collecting the status data of the first electronic device, the method in this application further includes: The first electronic device receives an enabling operation performed by the user on the preset function switch.

In another possible design manner of the second aspect, the first status data includes an event identifier and information about a first event, and the second status data includes the event identifier and information about a second event. The event identifier indicates functions or roles of first status information and second status information, and the functions or roles of the first status information and the second status information are: indicating to the second electronic device that the first electronic device hides or displays the status bar and the navigation bar.

The information about the first event indicates an event of hiding the status bar and the navigation bar during projection from the first electronic device to the second electronic device, and the information about the second event indicates an event of displaying the status bar and the navigation bar during projection from the first electronic device to the second electronic device.

In another possible design manner of the second aspect, the first content and the second content are interface images of a video application; or the first content and the second content are interface images of a game application.

In another possible design manner of the second aspect, the first interface further includes third content, and the first electronic device displays the first content and the third content in two windows of the first interface on split screens. That the first interface includes a status bar and/or a navigation bar of the first electronic device is specifically: each of the two windows of the first interface includes the status bar and/or the navigation bar.

In another possible design manner of the second aspect, the second interface further includes fourth content, and the first electronic device displays the second content and the fourth content in two windows of the second interface on split screens. That the second interface does not include the status bar and the navigation bar is specifically: at least one of the two windows of the second interface does not include the status bar and the navigation bar.

According to a third aspect, this application provides a projection display method. The method may be applied to a second electronic device, and the second electronic device is connected to a first electronic device. In the method, the second electronic device may receive first content and second status information from the first electronic device. The second status data indicates that the first electronic device does not hide a first status bar and a navigation bar. The second electronic device displays a first projection window including the first content, where the first projection window further includes any one of the status bar, the navigation bar, and a title bar of a projection application. The second electronic device may alternatively receive second content and first status information from the first electronic device, where the first status data indicates that the first electronic device hides the status bar and the navigation bar. The second electronic device may switch from displaying the first projection window to displaying a second projection window. The second projection window includes the second content, and the second projection window does not include the status bar, the navigation bar, and the title bar.

It may be understood that for beneficial effects that can be achieved by the method according to any one of the third aspect and the possible design manners provided in the foregoing, refer to the beneficial effects in any one of the first aspect and the possible design manners of the first aspect. Details are not described herein again.

In a possible design manner of the third aspect, the method in this application may further include: sending a first message to the first electronic device when the second electronic device performs landscape/portrait mode switching. The first message indicates the first electronic device to update, in response to the landscape/portrait mode switching, a projection interface of a virtual display that is generated when the first electronic device adapts to a screen size of the second electronic device. Alternatively, the second electronic device sends a first message to the first electronic device when receiving a second preset operation. The first message indicates the first electronic device to update, in response to the second preset operation, a projection interface of a virtual display that is generated when the first electronic device adapts to a screen size of the second electronic device.

The first message is further used to trigger the first electronic device to collect status data of the first electronic device, where the status data of the first electronic device is status data of the virtual display. The status data of the first electronic device is the first status data or the second status data.

In another possible design manner of the third aspect, the first status data includes an event identifier and information about a first event, and the second status data includes the event identifier and information about a second event.

The event identifier indicates functions or roles of first status information and second status information, and the functions or roles of the first status information and the second status information are: indicating to the second electronic device that the first electronic device hides or displays the status bar and the navigation bar.

The information about the first event indicates an event of hiding the status bar and the navigation bar during projection from the first electronic device to the second electronic device, and the information about the second event indicates an event of displaying the status bar and the navigation bar during projection from the first electronic device to the second electronic device.

In another possible design manner of the third aspect, the first content and the second content are interface images of a video application; or the first content and the second content are interface images of a game application.

In another possible design manner of the third aspect, the first projection window further includes third content projected by the first electronic device, and the second electronic device displays the first content and the third content in two windows of the first projection window on split screens. Each of the two windows of the first projection window includes any one of the status bar, the navigation bar, and the title bar.

In another possible design manner of the third aspect, the second projection window further includes fourth content projected by the first electronic device, and the second electronic device displays the second content and the fourth content in two windows of the second projection window on split screens. Neither of the two windows of the second projection window includes the status bar, the navigation bar, and the title bar.

According to a fourth aspect, this application provides an electronic device. The electronic device is a first electronic device, and the first electronic device is connected to a second electronic device. The first electronic device includes: a communication module, a display, a memory, and one or more processors. The communication module, the display, the memory, and the processor are coupled. The memory is configured to store computer program code. The computer program code includes computer instructions. When the processor executes the computer instructions, the first electronic device performs the method performed by the first electronic device in any one of the first aspect, the second aspect, and the possible design manners.

According to a fifth aspect, this application provides an electronic device. The electronic device is a second electronic device, and the second electronic device is connected to a first electronic device. The second electronic device includes: a communication module, a display, a memory, and one or more processors. The communication module, the display, the memory, and the processor are coupled. The memory is configured to store computer program code. The computer program code includes computer instructions. When the processor executes the computer instructions, the second electronic device performs the method performed by the second electronic device in any one of the first aspect, the third aspect, and the possible design manners.

According to a sixth aspect, this application provides a chip system. The chip system is applied to an electronic device that includes a display, a memory, and a communication module. The chip system includes one or more interface circuits and one or more processors. The interface circuit and the processor are connected to each other through a line. The interface circuit is configured to receive a signal from the memory of the electronic device, and send the signal to the processor, where the signal includes computer instructions stored in the memory. When the processor executes the computer instructions, the electronic device performs the method according to any one of the first aspect, the second aspect, the third aspect, and the possible design manners.

According to a seventh aspect, this application provides a computer storage medium. The computer storage medium includes computer instructions. When the computer instructions run on an electronic device, the electronic device is enabled to perform the method according to any one of the first aspect, the second aspect, or the third aspect, and the possible design manners.

According to an eighth aspect, this application provides a computer program product. When the computer program product runs on a computer, the computer is enabled to perform the method according to any one of the first aspect, the second aspect, or the third aspect and the possible design manners.

It may be understood that beneficial effects that can be achieved by the electronic device according to the fourth aspect and the fifth aspect, the chip system according to the sixth aspect, the computer storage medium according to the seventh aspect, and the computer program product according to the eighth aspect provided, refer to beneficial effects in any one of the first aspect and the possible design manners of the first aspect. Details are not described herein again.

DESCRIPTION OF EMBODIMENTS

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In description of this application, unless otherwise stated, "a plurality of" means two or more than two.

For ease of understanding, the terms "immersive display" and "non-immersive display" in embodiments of this application are described herein with reference to the accompanying drawings.

In some embodiments of this application, when an electronic device displays a UI interface of an application in a "non-immersive display" manner, a display of the electronic device may not only display UI interface content of the application, but also may include a status bar and a navigation bar of the electronic device.

Figure 1A:
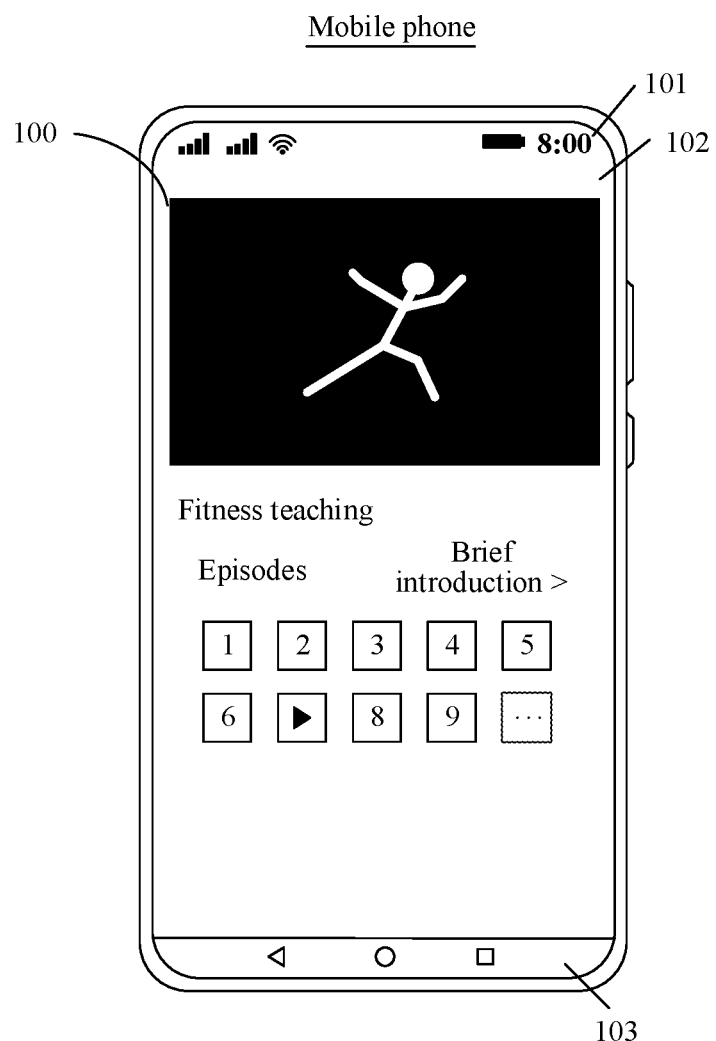
FIG. 1A is a schematic diagram of a UI interface displayed by a mobile phone in a "non-immersive display" manner.

For example, a mobile phone shown in FIG. 1A displays a video interface 100 in the "non-immersive display" manner in a portrait mode. As shown in FIG. 1A, a display of the mobile phone not only displays UI interface content 102 of a video application, but also includes a status bar 101 and a navigation bar 103 of the mobile phone.

Figure 1B:
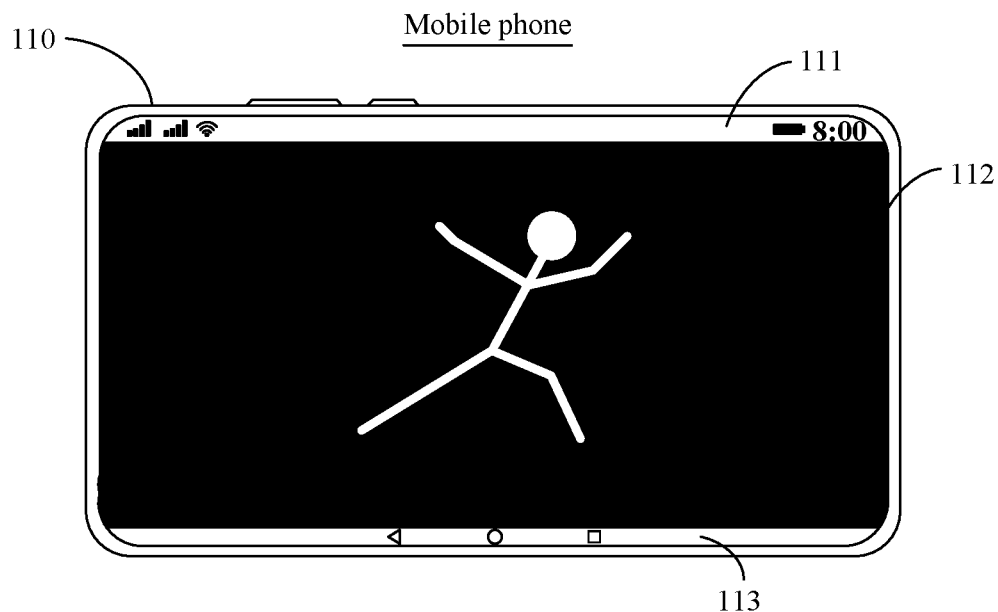
FIG. 1B is a schematic diagram of a UI interface displayed by a mobile phone in a "non-immersive display" manner.

For another example, a mobile phone shown in FIG. 1B displays a video interface 110 in the "non-immersive display" manner in a landscape mode. As shown in FIG. 1B, a display of the mobile phone not only displays UI interface content 112 of a video application, but also includes a status bar 111 and a navigation bar 113 of the mobile phone.

It should be noted that, when the electronic device displays the UI interface of the application in the "non-immersive display" manner, the status bar and the navigation bar of the electronic device are visible to a user. For example, the status bar 101 and the navigation bar 103 shown in FIG. 1A, and the status bar 111 and the navigation bar 113 shown in FIG. 1B are visible to the user.

In some other embodiments of this application, when an electronic device displays a UI interface of an application in the "non-immersive display" manner, a display of the electronic device may not only display UI interface content of the application, but also may include a status bar of the electronic device. In this embodiment, in a "non-immersive display state", the electronic device may hide the navigation bar.

Specifically, for some electronic devices, even in the "non-immersive display state", the navigation bar is invisible to the user. For example, as shown in FIG. 1D, a mobile phone displays a video interface 130 in a "non-immersive display" manner. As shown in FIG. 1D, a display of the mobile phone not only displays the UI interface content 102 of the video application, but also includes the status bar 101 of the mobile phone, but does not include a navigation bar. The mobile phone may display the navigation bar of the mobile phone only when the mobile phone responds to a preset gesture input by the user. For example, in response to the preset gesture shown in FIG. 1D, the mobile phone may display the video interface 100 shown in FIG. 1A. The video interface 100 includes not only the status bar 101, but also the navigation bar 103 of the mobile phone. In the following embodiment, an example in which the electronic device hides the status bar and the navigation bar in the "non-immersive display state" is used to describe the method in this embodiment of this application.

When the electronic device displays the UI interface of the application in an "immersive display" manner, the electronic device may hide the status bar and the navigation bar. The UI interface content of the application may be displayed on the display of the electronic device, and the status bar and the navigation bar of the electronic device are not displayed.

Figure 1C:
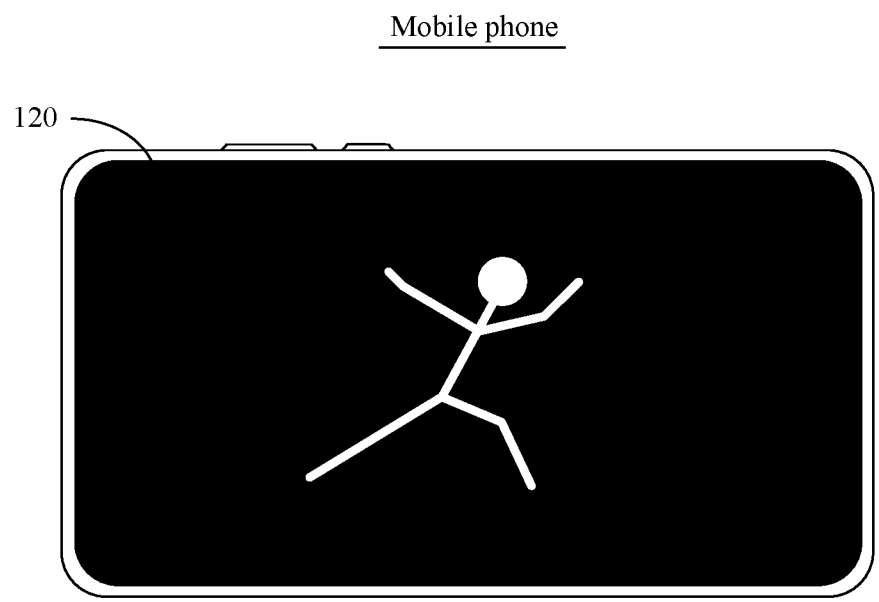
FIG. 1C is a schematic diagram of a UI interface displayed by a mobile phone in an "immersive display" manner.
Figure 1D:
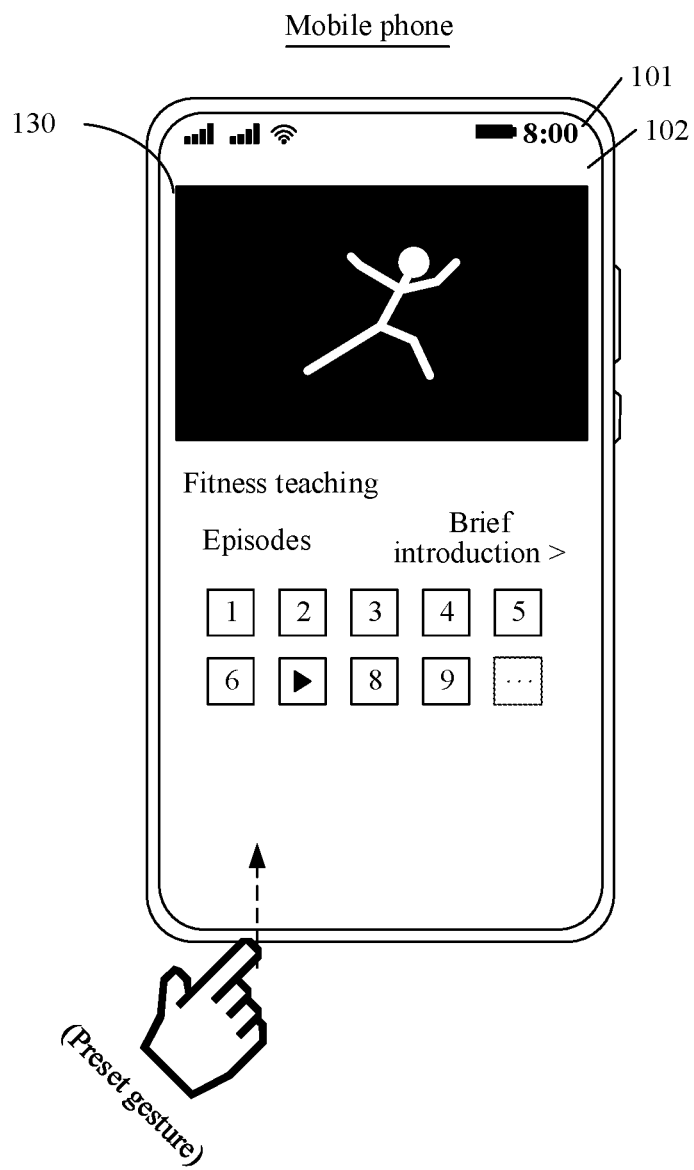
FIG. 1D is a schematic diagram of a UI interface displayed by a mobile phone in a "non-immersive display" manner.

For example, the mobile phone shown in FIG. 1C displays a video interface 120 in an "immersive display" manner in a landscape mode. As shown in FIG. 1C, UI interface content of a video application may be displayed on a display of the mobile phone, but a status bar and a navigation bar of the mobile phone are not displayed. Some electronic devices may also display an application interface in the "immersive display" manner in the portrait mode, which is not shown in the accompanying drawings.

It should be noted that, when the electronic device displays the UI interface of the application in the "immersive display" manner, the status bar and the navigation bar of the electronic device are invisible to the user. For example, as shown in FIG. 1C, the status bar and the navigation bar of the mobile phone are invisible to the user. In this embodiment of this application, when the electronic device displays the UI interface of the application in the "non-immersive display" manner, the electronic device may be referred to as being in the "non-immersive display state". When the electronic device displays the UI interface of the application in the "immersive display" manner, the electronic device may be referred to as being in the "immersive display state".

In this embodiment of this application, a mobile phone is used as an example to describe the status bar and the navigation bar of the electronic device.

Status bar: Located on the top of a screen of the mobile phone, the status bar may include a mobile network identifier, a wireless network identifier, a mobile phone battery level identifier, time information, and the like of the mobile phone. For example, the mobile network identifier may be a 4G identifier, a 5G identifier, or the like. The wireless network identifier may be a wireless fidelity (Wi-Fi) identifier and/or a Bluetooth identifier, or the like.

Navigation Bar: It is a shortcut button bar at the bottom of the screen of the mobile phone. It is usually displayed at the bottom of the screen of the mobile phone in a form of virtual buttons. By default, the navigation bar includes three buttons: Back button, Home button, and Recent button. The Back button is used to return to a previous interface, the Home button is used to return to a desktop, and the Recent button is used to display a recently used application. For example, the Back button may be a triangular virtual button in the navigation bar shown in FIG. 1A or FIG. 1B, the Home button may be a circular virtual button in the navigation bar shown in FIG. 1A or FIG. 1B, and the Recent button may be a rectangular virtual button in the navigation bar shown in FIG. 1A or FIG. 1B.

Figure 2A:
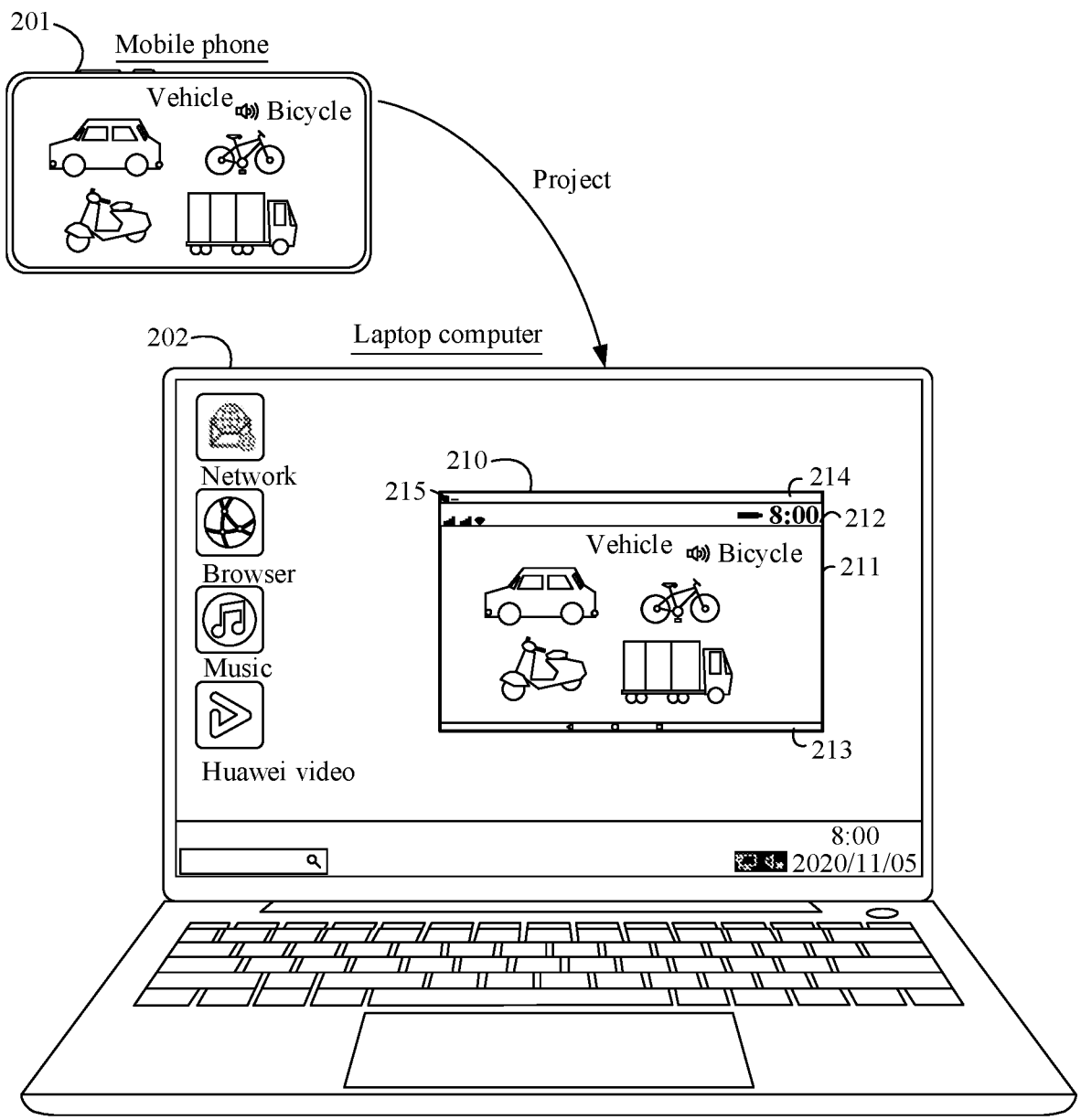
FIG. 2A is a schematic diagram of UI interfaces of a mobile phone and a laptop computer in a physical display projection scenario.
Figure 2B:
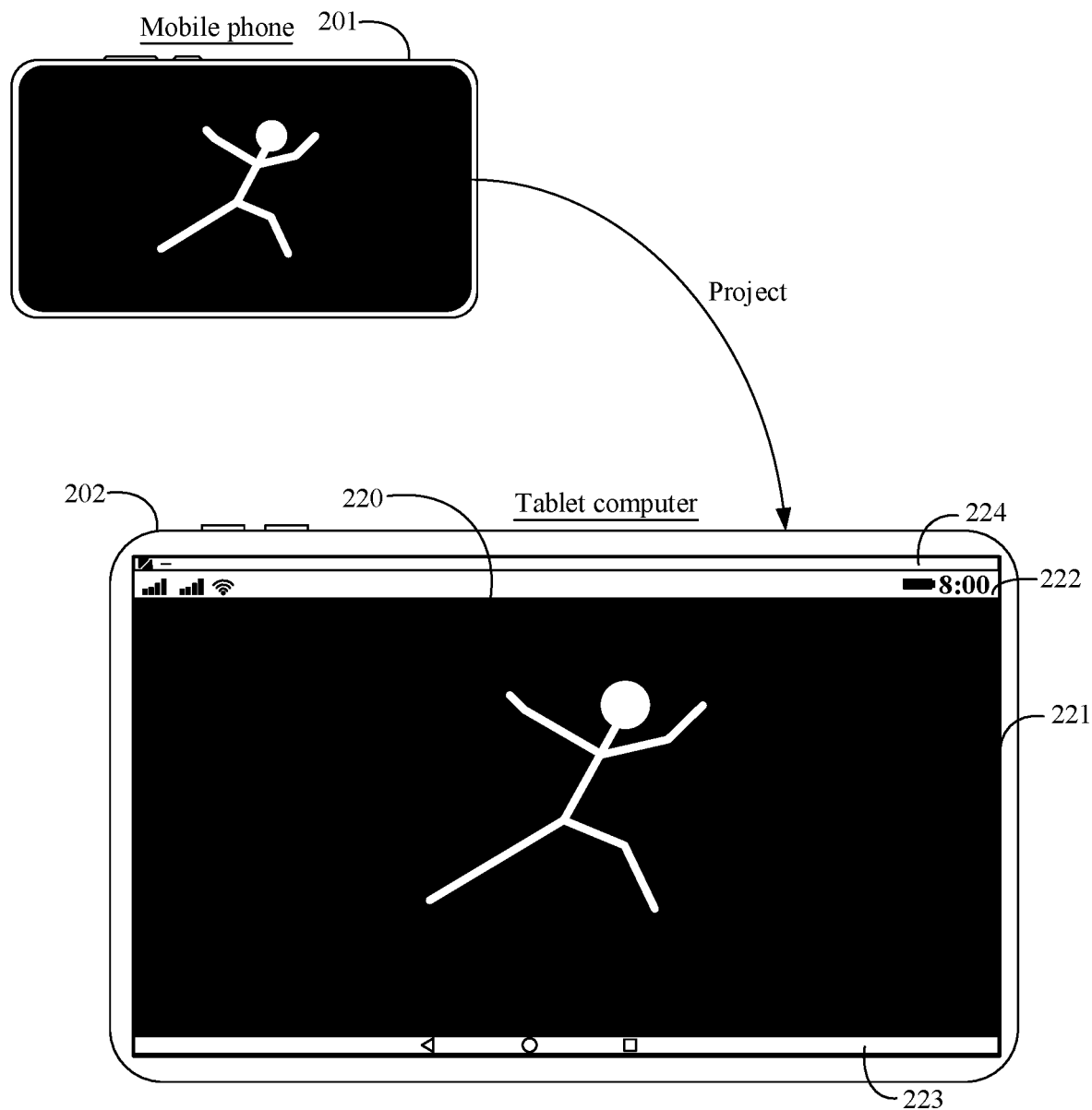
FIG. 2B is a schematic diagram of UI interfaces of a mobile phone and a tablet computer in a physical display projection scenario.

An embodiment of this application provides a projection system. As shown in FIG. 2A or FIG. 2B, the projection system 200 may include a remote device 201 and a local device 202. The remote device 201 is a first electronic device, and the local device 202 is a second electronic device. The remote device 201 and the local device 202 may establish a connection in a wired or wireless manner. Based on the established connection, the remote device 201 and the local device 202 may be used together. Specifically, the remote device 201 may be used as a projecting device, and the local device 202 is a projected device. The remote device 201 may project, by using a projection application, screen content of the remote device 201 onto the local device 202 for display.

In specific implementation, the remote device 201 may be a device that includes a display, such as a mobile phone, a tablet computer, a handheld computer, a PC, a cellular phone, a personal digital assistant (PDA), a wearable device (such as a smartwatch), or a smart home device (such as a television), a vehicle-mounted computer, a game console, and an augmented reality (AR)/virtual reality (VR) device. The local device 202 may be a device that includes a display, such as a tablet computer, a laptop computer, a PC, a smart television, or a projector. For example, as shown in FIG. 2A, the remote device 201 may be a mobile phone, and the local device 202 may be a laptop computer. For another example, as shown in FIG. 2B, the remote device 201 may be a mobile phone, and the local device 202 may be a tablet computer.

Generally, the local device 202 is a large-screen device, and a screen size of the remote device 201 is smaller. For example, a screen size of the local device 202 (for example, the laptop computer) shown in FIG. 2A is greater than a screen size of the remote device 201 (for example, the mobile phone). For another example, a screen size of the local device 202 (such as the tablet computer) shown in FIG. 2B is greater than the screen size of the remote device 201 (such as the mobile phone). In this way, the remote device 201 projects screen content onto the local device 202 for display, and this cannot only reduce impact of a limitation of the screen size of the remote device 201 on user visual experience, but also reflect an advantage of a large screen.

In this embodiment, when the remote device 201 establishes a connection with the local device 202 in a wireless manner, a wireless communication protocol used may be a Wi-Fi protocol, a Bluetooth protocol, a ZigBee protocol, a near field communication (NFC) protocol, various cellular network protocols, or the like. This is not specifically limited herein. A wired connection between the remote device 201 and the local device 202 may include: a universal serial bus (USB) connection and high-definition multimedia interface (HDMI). In the following embodiment, an example in which the remote device 201 establishes a connection with the local device 202 in a wireless manner is used to describe the method in the embodiment of this application.

The remote device and the local device may be touchscreen devices, or may be non-touchscreen devices. In this embodiment, both the remote device and the local device are terminals that can run an operating system, install an application, and have a display (or a display screen). Operating systems of the remote device and the local device may be an Android system, an ios system, a windows system, a mac system, a Linux system, or the like. This is not specifically limited in this embodiment. The operating systems of the remote device and the local device may be the same or may be different.

In some current solutions, not only a non-immersive display effect can be implemented on a remote device, but also an immersive display effect can be implemented. For example, as shown in FIG. 1A or FIG. 1B, the mobile phone displays the UI interface of the video application in the "non-immersive display" manner. For another example, as shown in FIG. 1C or FIG. 2B, the mobile phone displays the UI interface of the video application in the "immersive display" manner. As shown in FIG. 2A, the mobile phone displays a UI interface of a game application in the "immersive display" manner.

However, in a process in which the remote device 201 projects a screen to the local device 202, when the remote device 201 displays the UI interface of the application in the "immersive display" manner, the local device 202 cannot display the UI interface of the application in the "immersive display" manner.

For example, as shown in FIG. 2A, the remote device 201 (for example, the mobile phone) projects a screen to the local device 202 (for example, the laptop computer). In other words, the mobile phone and the laptop computer can achieve multi-screen collaboration. As shown in FIG. 2A, the mobile phone displays a UI interface of a game application in the "immersive display" manner. A display of the mobile phone displays the UI interface of the game application, but does not display a status bar and a navigation bar of the mobile phone.

When the mobile phone displays the UI interface of the game application in the "immersive display" manner, the laptop computer shown in FIG. 2A cannot display the UI interface of the game application in the "immersive display" manner. As shown in FIG. 2A, a projection window 210 of the laptop computer displays not only a UI interface 211 of the game application projected by the mobile phone, but also a status bar 212, a navigation bar 213, and a title bar 214 of a projection application. The laptop computer does not achieve an immersive display effect during projection.

For another example, as shown in FIG. 2B, the remote device 201 (for example, the mobile phone) projects a screen to the local device 202 (for example, the tablet computer). As shown in FIG. 2B, the mobile phone displays the UI interface of the video application in the "immersive display" manner. A display of the mobile phone displays the UI interface of the video application, but does not display the status bar and the navigation bar of the mobile phone.

When the mobile phone displays the UI interface of the video application in the "immersive display" manner, the tablet computer shown in FIG. 2B cannot display the UI interface of the video application in the "immersive display" manner. As shown in FIG. 2B, a projection window 220 of the tablet computer not only displays a UI interface 221 of the video application projected by the mobile phone, but also displays a status bar 222, a navigation bar 223, and a title bar 224 of a projection application. The tablet computer does not achieve an immersive display effect during projection.

An embodiment of this application provides a projection display method. The method may be applied to the foregoing projection system. According to the method, in a process in which the remote device 201 projects a screen to the local device 202, synchronization of the immersive display effect between the local device 202 and the remote device 201 can be achieved. In other words, when the remote device 201 is in the "immersive display state", the local device 201 may also enter the "immersive display state", and display a projection interface of the remote device 201 in the "immersive display" manner.

It should be noted that, the projection in this embodiment of this application may include physical display projection and virtual display projection. The following embodiments describe in detail the physical display projection and the virtual display projection, and specific applications of the method in embodiments of this application in a virtual display projection scenario.

(1) Physical Display Projection

In a physical display projection scenario, display content of a projection window displayed by the local device 202 is the same as content of a display interface of the remote device 201.

Figures 1, 2C:
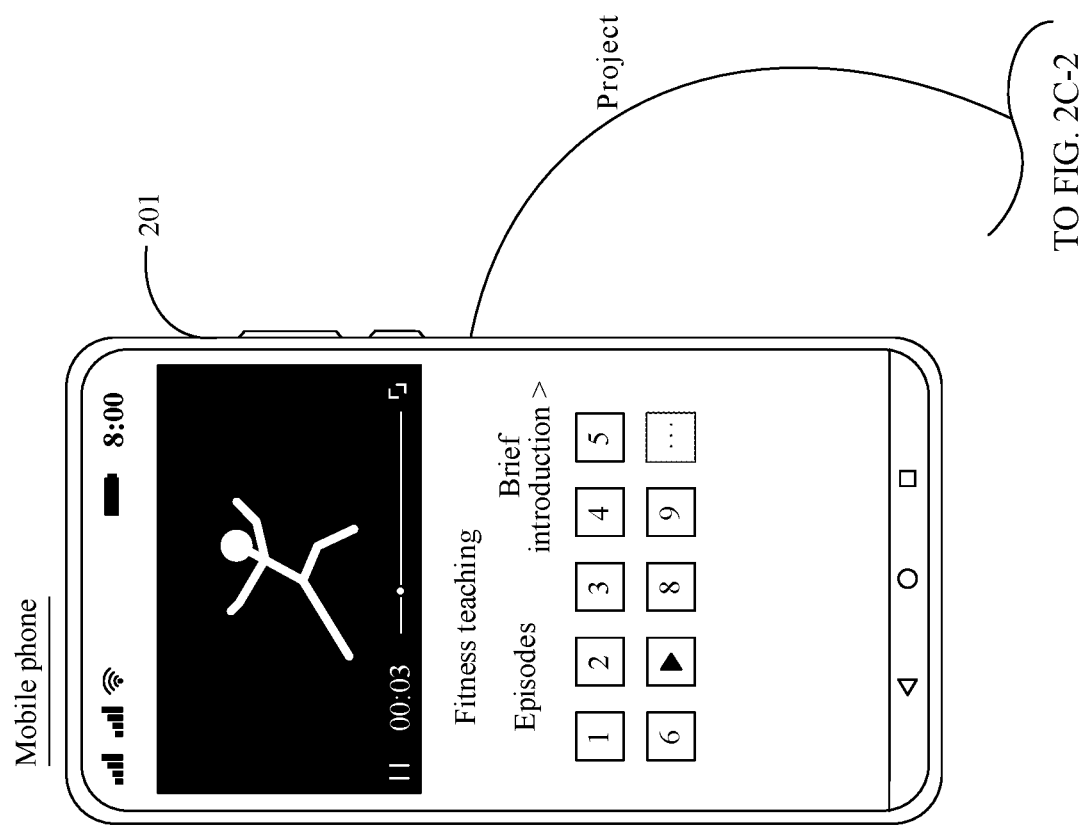
FIG. 2C-1 and FIG. 2C-2 are a schematic diagram of UI interfaces of a mobile phone and a tablet computer in a physical display projection scenario.
Figures 2, 2C:
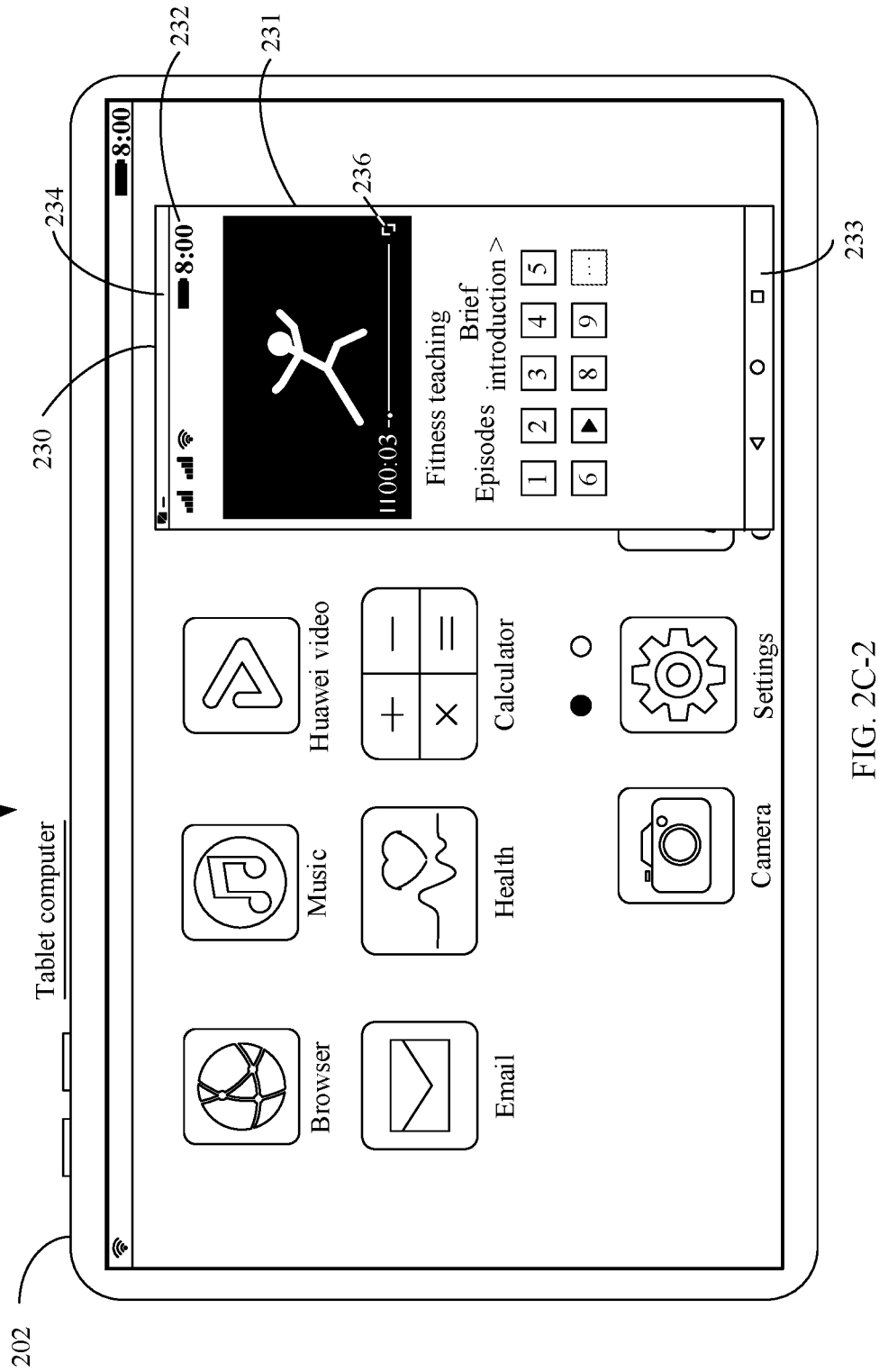

For example, as shown in FIG. 2A, display content of the projection window 210 displayed by the laptop computer (that is, the local device 202) is the same as content of the display interface of the mobile phone (that is, the remote device 201). For another example, as shown in FIG. 2B, display content of the projection window 220 displayed by the tablet computer (that is, the local device 202) is the same as content of the display interface of the mobile phone (that is, the remote device 201). For another example, as shown in FIG. 2C-1 and FIG. 2C-2, display content of a projection window 230 displayed by the tablet computer (that is, the local device 202) is the same as content of the display interface of the mobile phone (that is, the remote device 201).

The physical display projection in this embodiment of this application may specifically include the following three situations. In each situation, content displayed on the projection window displayed by the local device 202 is the same as content of the display interface of the remote device 201.

Situation (1):

The remote device 201 projects a screen to the local device 202 in a landscape mode, and the local device 202 displays the projection window of the remote device 201 in a small window.

For example, as shown in FIG. 2A, the mobile phone is in the landscape mode, and the mobile phone projects a screen to the laptop computer. In FIG. 2A, the laptop computer displays the projection window 210 of the mobile phone in the small window, and the display content of the projection window 210 is the same as the content of the display interface of the mobile phone.

It should be noted that, that the local device 202 displays the projection window of the remote device 201 in a small window specifically refers to: The projection window occupies a part of a screen of the local device 202, and the other part of the screen displays the UI interface of the local device 202. For example, as shown in FIG. 2A, a part of the screen of the laptop computer is used to display the projection window 210, and the other part of the screen is used to display a desktop of the laptop computer.

It should be noted that, the screen size of the local device 202 may be different from the screen size of the remote device 201. As a result, a height-to-width ratio of the screen of the local device 202 is also different from a height-to-width ratio of the screen of the remote device 201. Therefore, if the local device 202 displays projection content of the remote device 201 in full screen according to the height-to-width ratio of the screen of the remote device 201, a problem of distortion of the projection content may occur. In the physical display projection scenario, the local device 202 displays the projection window of the remote device 201 in the small window, so that a problem of distortion of the projection content in the projection window displayed by the local device 202 may be avoided, and user visual experience in a projection process may be ensured.

Situation (2):

The remote device 201 projects a screen to the local device 202 in a landscape mode, and the local device 202 displays the projection window of the remote device 201 in a full window.

For example, as shown in FIG. 2B, the mobile phone is in the landscape mode, and the mobile phone projects a screen to the tablet computer. In FIG. 2B, the tablet computer displays a projection window 220 of the mobile phone in the full window, and display content of the projection window 220 is the same as content of a display interface of the mobile phone.

It should be noted that, that the local device 202 displays the projection window of the remote device 201 in a full window specifically refers to: The projection window occupies the entire screen of the local device 202. For example, as shown in FIG. 2B, the entire screen of the tablet computer is used to display the projection window 220.

It should be noted that, although a screen size of the local device 202 may be different from a screen size of the remote device 201, a height-to-width ratio of the screen of the local device 202 may be close to a height-to-width ratio of the screen of the remote device 201. For example, a height-to-width ratio of a screen of the tablet computer is close to a height-to-width ratio of a screen of the mobile phone. Therefore, even if the local device 202 displays projection content of the remote device 201 in full screen according to the height-to-width ratio of the screen of the remote device 201, a problem of distortion of the projection content may not occur. Therefore, in the physical display projection scenario, the local device 202 may display the projection window of the remote device 201 in the full window, and this can ensure user visual experience in a projection process.

Situation (3):

The remote device 201 projects a screen to the local device 202 in a portrait mode, and the local device 202 displays the projection window of the remote device 201 in a small window.

For example, as shown in FIG. 2C-1 and FIG. 2C-2, the mobile phone is in the portrait mode, and the mobile phone projects a screen to the tablet computer. In FIG. 2C-1 and FIG. 2C-2, the tablet computer displays a projection window 230 of the mobile phone in the small window, and display content of the projection window 230 is the same as content of a display interface of the mobile phone. As shown in FIG. 2C-1 and FIG. 2C-2, a projection window 230 includes a UI interface 231 of the video application projected by the mobile phone, but also displays a status bar 232, a navigation bar 233, and a title bar 234 of the projection application.

It should be noted that, in the physical display projection scenario, when the remote device 201 is in the portrait mode, the local device 202 displays the projection window of the remote device 201 in the small window, so that a problem of distortion of projection content in the projection window displayed by the local device 202 may be avoided, and user visual experience in a projection process may be ensured.

(2) Virtual Display Projection

In a virtual display projection scenario, display content of the projection window displayed by the local device 202 is different from content of the display interface of the remote device 201.

Figure 2D:
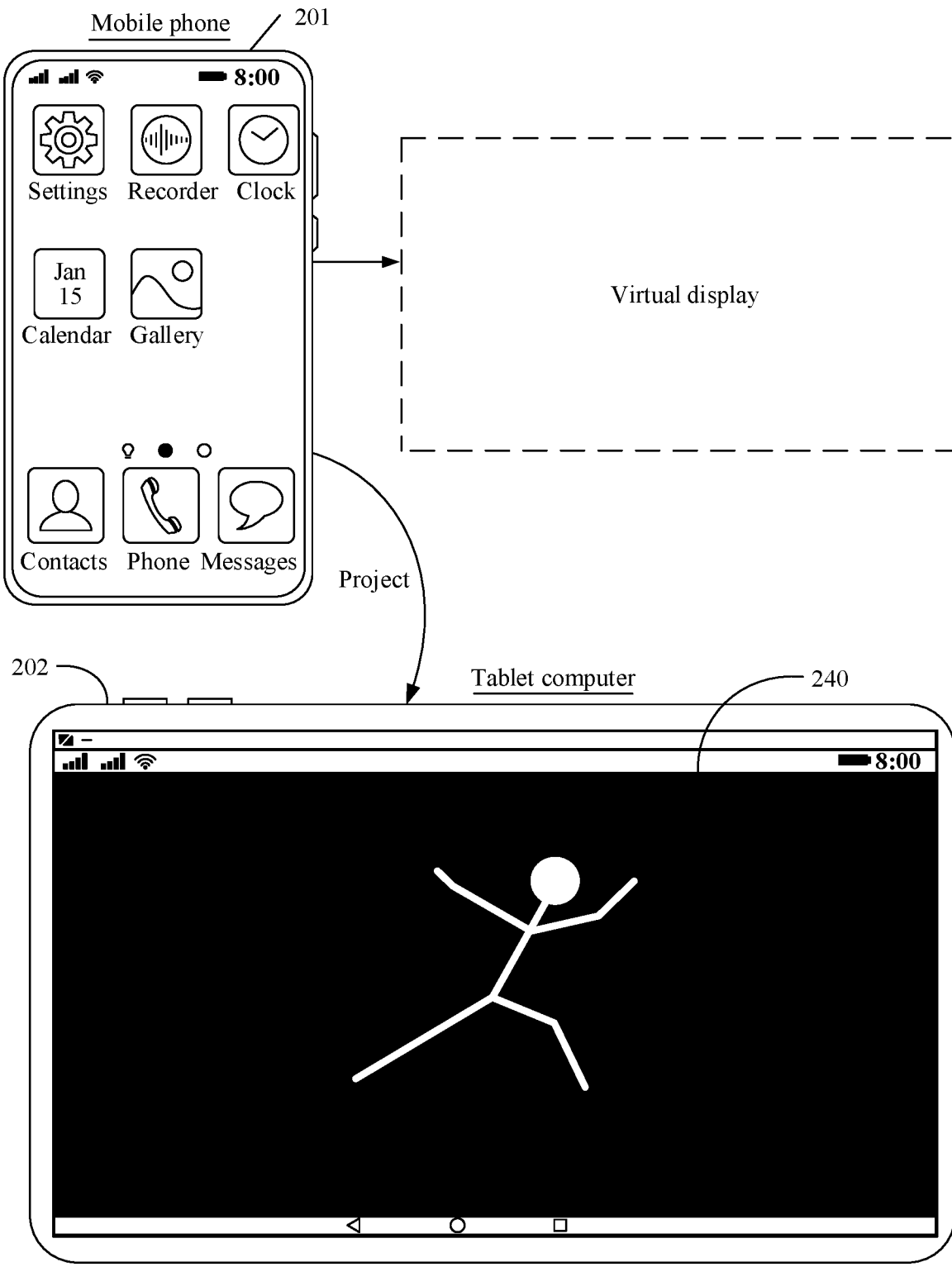
FIG. 2D is a schematic diagram of UI interfaces of a mobile phone and a tablet computer in a virtual display projection scenario.

For example, as shown in FIG. 2D, the mobile phone is in the portrait mode, and the mobile phone projects a screen to the tablet computer. In FIG. 2D, the tablet computer displays a projection window 240 of the mobile phone in full window, and the mobile phone displays a main interface. Display content of the projection window 240 is different from content of the display interface of the mobile phone.

The projection window 230 shown in FIG. 2C-1 and FIG. 2C-2 includes a "zoom-in button" 236. The "zoom-in button" 236 is used to trigger the tablet computer to display a video playback interface in full screen. In response to a tapping operation performed by the user on the "zoom-in button" 236, the tablet computer may send a request instruction to the mobile phone. After receiving the request instruction, the mobile phone may adapt a screen size of the tablet computer, generate a virtual display, generate (for example, draw and render) new projection data based on the virtual display, and transmit the projection data to the tablet computer. After receiving the projection data, the tablet computer may display the projection window 240 shown in FIG. 2D. However, a physical screen size of the mobile phone cannot adapt to the projection data generated based on the virtual display. Therefore, the mobile phone may not display content of the projection window 240. In this case, the mobile phone may display the main interface, or the mobile phone may display any one of one or more applications that have recently run and are not closed. For example, as shown in FIG. 2D, the mobile phone may display the main interface.

When the user uses an electronic device, the electronic device may be in a landscape mode or in the portrait mode. In this embodiment of this application, the landscape mode and the portrait mode of the electronic device are described herein. A display (including a folded screen in an expanded state) of the electronic device may include four sides. The four sides include two sides that are parallel and equal to each other and that are longer, and may be referred to as long sides of the display. The four sides further include two shorter sides that are parallel and equal to each other, and may be referred to as short sides of the display.

In the landscape mode, a long side of the display of the electronic device is parallel to a horizontal plane (for example, an included angle between the long side of the display and the horizontal plane is 0), or an included angle between the long side of the display and the horizontal plane is less than or equal to a preset value. In the portrait mode, a long side of the display of the electronic device is basically perpendicular to a horizontal plane, or an included angle between the long side of the display and the horizontal plane is greater than a preset value. The preset value is less than or equal to 45 degrees, and a specific value of the preset value may be set according to an actual application scenario. For example, the preset value may be 20 degrees.

In the landscape mode, the display of the electronic device is basically in a horizontal bar shape. A height of the display of the electronic device is less than a width, and an aspect ratio (that is, a ratio of height to width) of the display is less than 1. In the portrait mode, the display of the electronic device is basically in a vertical bar shape. A height of the display of the electronic device is greater than a width, and an aspect ratio (that is, a ratio of height to width) of the display is greater than 1.

The height of the display is a length of a side whose included angle between the display and the horizontal plane is larger, and the width of the display is a length of a side whose included angle between the display and the horizontal plane is smaller. The height of the display may also be understood as a longitudinal length of the display, the width of the display may also be understood as a transverse length of the display, and the aspect ratio of the display may also be understood as an aspect ratio (that is, a ratio of a longitudinal length to a transverse length) of the display.

The following describes embodiments of this application in detail with reference to the accompanying drawings. A hardware structure of a remote device (such as an electronic device 300) is described by using an example in which the remote device is a mobile phone. For the hardware structure of the local device, refer to detailed description of the electronic device 300 in this embodiment of this application. Details are not described herein again in this embodiment of this application.

Figure 3:
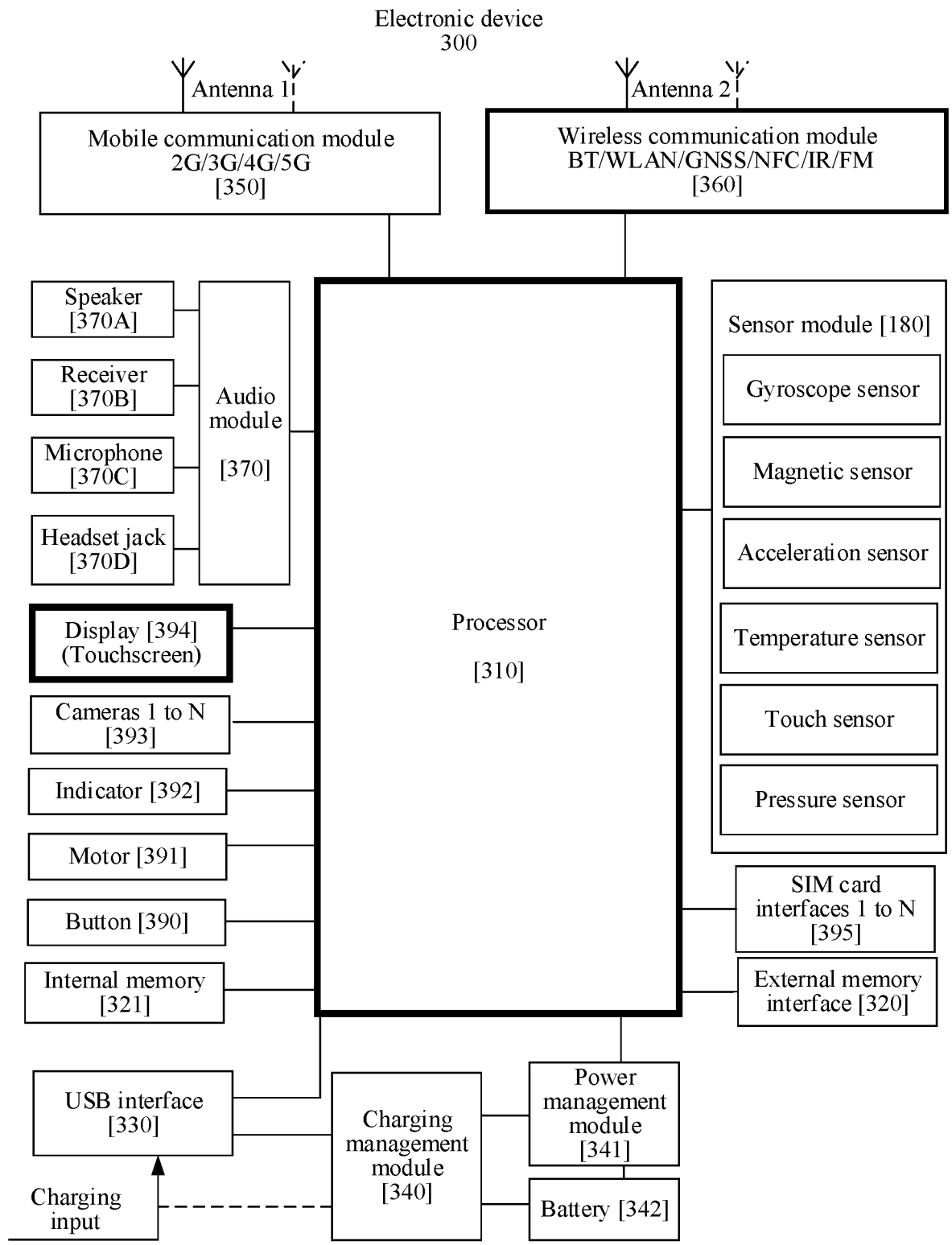
FIG. 3 is a schematic diagram of a hardware structure of an electronic device according to an embodiment of this application.

As shown in FIG. 3, the electronic device 300 may include: a processor 310, an external memory interface 320, an internal memory 321, a universal serial bus (universal serial bus, USB) interface 330, a charging management module 340, a power management module 341, a battery 342, an antenna 1, an antenna 2, a mobile communication module 350, and a wireless communication module 360, an audio module 370, a speaker 370A, a receiver 370B, a microphone 370C, a headset jack 370D, a sensor module 380, a button 390, a motor 391, an indicator 392, a camera 393, a display 394, and a subscriber identity module (SIM) card interface 395 and the like.

The sensor module 380 may include sensors such as a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It may be understood that the structure shown in this embodiment does not constitute a specific limitation on the electronic device 300. In some other embodiments, the electronic device 300 may include more or fewer components than those shown in the figure, or some components may be combined, or some components may be split, or different component arrangements may be used. The illustrated components may be implemented in hardware, software, or a combination of software and hardware.

The processor 310 may include one or more processing units, for example: The processor 310 may include an application processor (AP), a modem processor, a graphics processing unit (GPU), an image signal processor (ISP), a controller, a memory, a video codec, and a digital signal processor (DSP), a baseband processor, and/or a neural-network processing unit (NPU), or the like. Different processing units may be independent components, or may be integrated into one or more processors.

The controller may be a nerve center and a command center of the electronic device 300. The controller may generate an operation control signal based on instruction operation code and a time sequence signal, to complete control of instruction reading and instruction execution.

A memory may be further disposed in the processor 310, and is configured to store instructions and data. In some embodiments, the memory in the processor 310 is a cache. The memory may store instructions or data just used or cyclically used by the processor 310. If the processor 310 needs to use the instructions or the data again, the processor 310 may directly invoke the instructions or the data from the memory. This avoids repeated access, reduces waiting time of the processor 310, and improves system efficiency.

In some embodiments, the processor 310 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that an interface connection relationship between the modules shown in this embodiment is merely used as an example for description, and does not constitute a limitation on a structure of the electronic device 300. In some other embodiments, the electronic device 300 may alternatively use different interface connection manners or a combination of a plurality of interface connection manners in the foregoing embodiment.

The charging management module 340 is configured to receive charging input from a charger. The charger may be a wireless charger, or may be a wired charger. In some embodiments of wired charging, the charging management module 340 may receive charging input of the wired charger through the USB interface 330. In some embodiments of wireless charging, the charging management module 340 may receive a wireless charging input by using a wireless charging coil of the electronic device 300. When charging the battery 342, the charging management module 340 may alternatively supply power to the electronic device by using the power management module 341.

The power management module 341 is configured to connect the battery 342, the charging management module 340, and the processor 310. The power management module 341 receives input from the battery 342 and/or the charging management module 340, and supplies power to the processor 310, the internal memory 321, the external memory, the display 394, the camera 393, the wireless communication module 360, and the like. The power management module 341 may be further configured to monitor a parameter such as a battery capacity, a battery cycle count, or a battery health status (electric leakage or impedance). In some other embodiments, the power management module 341 may also be disposed in the processor 310. In some other embodiments, the power management module 341 and the charging management module 340 may also be disposed in a same component.

A wireless communication function of the electronic device 300 may be implemented through the antenna 1, the antenna 2, the mobile communication module 350, the wireless communication module 360, the modem processor, the baseband processor, and the like.

The antenna 1 and the antenna 2 are configured to transmit and receive electromagnetic wave signals. Each antenna in the electronic device 300 may be configured to cover one or more communication frequency bands. Different antennas may be further multiplexed, to improve antenna utilization. For example: The antenna 1 may be multiplexed as a diversity antenna of a wireless local area network. In some other embodiments, the antenna may be used in conjunction with a tuning switch.

The mobile communication module 350 may provide a wireless communication solution that is applied to the electronic device 300 and includes a 2G/3G/4G/5G or the like. The mobile communication module 350 may include at least one filter, a switch, a power amplifier, a low noise amplifier (LNA), and the like. The mobile communication module 350 may receive an electromagnetic wave through the antenna 1, perform processing such as filtering or amplification on the received electromagnetic wave, and transmit the electromagnetic wave to the modem processor for demodulation.

The mobile communication module 350 may further amplify a signal modulated by the modem processor, and convert the signal into an electromagnetic wave for radiation through the antenna 1. In some embodiments, at least some functional modules in the mobile communication module 350 may be disposed in the processor 310. In some embodiments, at least some functional modules in the mobile communication module 350 may be disposed in a same device as at least some modules in the processor 310.

The modem processor may include a modulator and a demodulator. The modulator is configured to modulate a to-be-sent low-frequency baseband signal into a medium- and high-frequency signal. The demodulator is configured to demodulate a received electromagnetic wave signal into a low-frequency baseband signal. Then, the demodulator transmits the demodulated low-frequency baseband signal to the baseband processor for processing. The low-frequency baseband signal is processed by the baseband processor and then transmitted to the application processor. The application processor outputs a sound signal through the audio device (not limited to the speaker 370A and receiver 370B), or displays an image or video through the display 394. In some embodiments, the modem processor may be a stand-alone device. In some other embodiments, the modem processor may be independent of the processor 310, and is disposed in a same component as the mobile communication module 350 or another functional module.

The wireless communication module 360 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 300.

The wireless communication module 360 may be one or more components integrating at least one communication processor module. The wireless communication module 360 receives an electromagnetic wave through the antenna 2, performs frequency modulation and filtering processing on an electromagnetic wave signal, and sends a processed signal to the processor 310. The wireless communication module 360 may further receive a to-be-sent signal from the processor 310, perform frequency modulation and amplification on the signal, and convert the signal into an electromagnetic wave for radiation through the antenna 2.

In some embodiments, the antenna 1 of the electronic device 300 is coupled to the mobile communication module 350, and the antenna 2 is coupled to the wireless communication module 360, so that the electronic device 300 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (global positioning system, GPS), a global navigation satellite system (GLONASS), a BeiDou navigation satellite system (BDS), a quasi-zenith satellite system (QZSS), and/or a satellite based augmentation system (SBAS).

The electronic device 300 implements a display function by using a GPU, the display 394, the application processor, or the like. The GPU is a microprocessor for image processing, and is connected to the display 394 and the application processor. The GPU is used to perform mathematical and geometric calculations for graphics rendering. The processor 310 may include one or more GPUs that execute program instructions to generate or change display information.

The display 394 is configured to display an image, a video, or the like. The display 394 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like.

The electronic device 300 may implement an image shooting function by using the ISP, the camera 393, the video codec, the GPU, the display 394, the application processor, or the like.

The ISP is configured to process data fed back by the camera 393. For example, during photographing, a shutter is opened, light is transmitted to a photosensitive element of the camera by using a lens, an optical signal is converted into an electrical signal, and the photosensitive element of the camera transmits the electrical signal to the ISP for processing, and converts the electrical signal into an image visible to naked eyes. The ISP may alternatively perform algorithm optimization on image noise, luminance, and skin tone. The ISP may alternatively perform parameter optimization on exposure and color temperature of a shooting scene. In some embodiments, the ISP may be disposed in the camera 393.

The camera 393 is configured to capture a still image or video. An object is projected to the photosensitive element by generating an optical image through the lens. The photosensitive element may be a charge coupled device (CCD) or a complementary metal-oxide-semiconductor (CMOS) phototransistor. The photosensitive element converts the optical signal into an electrical signal, and then transmits the electrical signal to the ISP to convert it into a digital image signal. The ISP outputs the digital image signal to the DSP for processing. The DSP converts the digital image signal into an image signal in a standard format such as RGB or YUV. In some embodiments, the electronic device 300 may include one or N cameras 393, where N is a positive integer greater than 1.

The digital signal processor is configured to process digital signals, and may process other digital signals in addition to digital image signals. For example, when the electronic device 300 selects a frequency, the digital signal processor is configured to perform Fourier transform on frequency energy and the like.

The video codec is used to compress or decompress digital video. The electronic device 300 may support one or more video codecs. In this way, the electronic device 300 may play or record videos in a plurality of encoding formats, for example, moving picture experts group (MPEG)-1, MPEG-2, MPEG-3, and MPEG-4.

The NPU is a neural network (NN) computing processor, quickly processes input information by referring to a structure of a biological neural network, for example, by referring to a mode of transmission between human brain neurons, and may further continuously perform self-learning. Applications such as intelligent cognition of the electronic device 300 may be implemented by using the NPU, for example, image recognition, facial recognition, speech recognition, and text understanding.

The external memory interface 320 may be configured to connect to an external memory card, for example, a Micro SD card, to expand a storage capability of the electronic device 300. The external memory card communicates with the processor 310 through the external memory interface 320, to implement a data storage function. For example, files such as music and a video are stored in the external memory card.

The internal memory 321 may be configured to store computer-executable program code, and the executable program code includes instructions. The processor 310 executes various functional applications and data processing of the electronic device 300 by running the instructions stored in the internal memory 321. For example, in this embodiment of this application, the processor 310 may execute the instructions stored in the internal memory 321. The internal memory 321 may include a program storage area and a data storage area.

The program storage area may store an operating system, an application (for example, a voice playing function or an image playing function) required by at least one function, and the like. The data storage area may store data (such as audio data and a phone book) created when the electronic device 300 is used, and the like. In addition, the internal memory 321 may include a high-speed random access memory, and may further include a non-volatile memory, for example, at least one magnetic disk storage device, a flash memory, or a universal flash storage (UFS).

The electronic device 300 may implement an audio function, such as music playing or recording, by using the audio module 370, the speaker 370A, the receiver 370B, the microphone 370C, the headset jack 370D, the application processor, and the like.

The touch sensor, also known as the "touch panel". The touch sensor may be disposed on the display 394, and the touch sensor and the display 394 form a touchscreen, which is also referred to as a "touchscreen". The touch sensor is configured to detect a touch operation performed on or near the touch sensor. The touch sensor may transfer the detected touch operation to the application processor, to determine a touch event type. The display 394 may provide a visual output related to the touch operation. In some other embodiments, the touch sensor may alternatively be disposed on a surface of the electronic device 300, and a location of the touch sensor is different from that of the display 394.

In this embodiment of this application, the electronic device 300 may detect, by using the touch sensor, a touch operation input by a user on the touchscreen, and collect one or more of a touch location, a touch area, a touch direction, touch time, and the like of the touch operation on the touchscreen. In some embodiments, the electronic device 300 may determine the touch location of the touch operation on the touchscreen by combining the touch sensor and the pressure sensor.

The button 390 includes a power-on button, a volume button, and the like. The button 390 may be a mechanical button, or can be a touch button. The electronic device 300 may receive a key input, and generate a key signal input related to a user setting and function control of the electronic device 300.

The motor 391 may generate a vibration prompt. The motor 391 may be configured to provide an incoming call vibration prompt and touch vibration feedback. For example, touch operations performed on different applications (such as photographing and audio playing) may correspond to different vibration feedback effects. For touch operations performed on different areas of the display 394, the motor 391 may also correspond to different vibration feedback effects. Different application scenarios (for example: time reminder, information receiving, alarm clock, game, or the like) may also correspond to different vibration feedback effects. The touch vibration feedback effect can also be customized.

The indicator 392 may be an indicator light, and may be configured to indicate a charging status and a power change, or may be configured to indicate a message, a missed call, a notification, or the like. The SIM card interface 395 is configured to connect to a SIM card. The SIM card may be inserted into the SIM card interface 395 or removed from the SIM card interface 395, to implement contact and separation from the electronic device 300. The electronic device 300 may support one or N SIM card interfaces, where N is a positive integer greater than 1. The SIM card interface 395 may support a nano-SIM card, a micro-SIM card, a SIM card, and the like.

All methods in the following embodiments may be implemented in the electronic device 300 having the foregoing hardware structure.

The software system of the electronic device 300 (such as a remote device 201 or a local device 200) may use a layered architecture, an event-driven architecture, a microkernel architecture, a microservice architecture, or a cloud architecture. In this embodiment of this application, an Android system with the layered architecture is used as an example to describe a software structure of the remote device 201 or the local device 202.

Figure 4A:
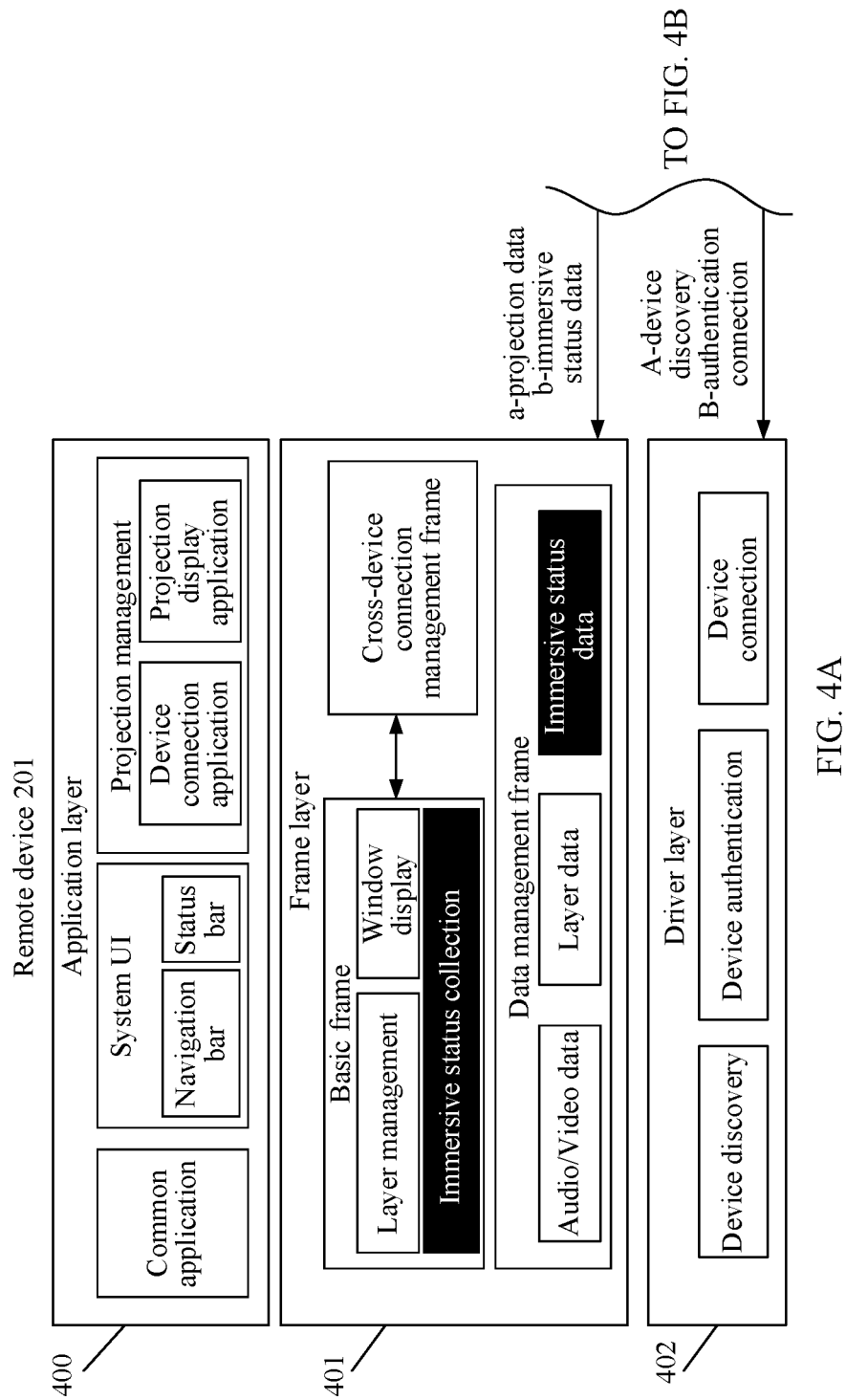
FIG. 4A and FIG. 4B are a schematic diagram of a software structure of an electronic device according to an embodiment of this application.
Figure 4B:
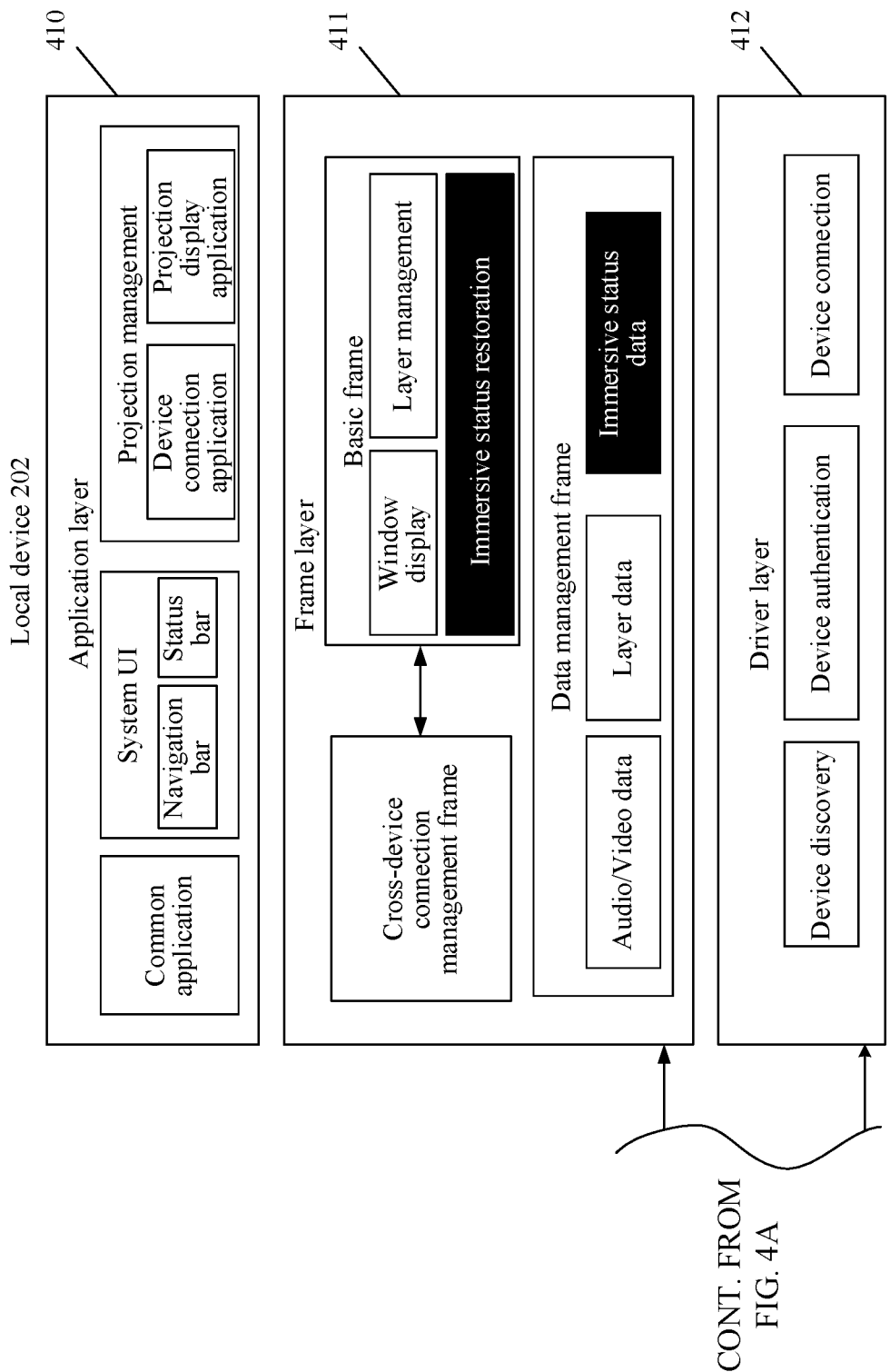

FIG. 4A and FIG. 4B are a block diagram of software structures of a remote device 201 and a local device 202 according to an embodiment of this application. In a layered architecture, software may be divided into several layers, and each of the layers has a clear role and task. Layers communicate with each other through software interfaces. In some embodiments, the Android system is divided into three layers: an application layer (Application), an application framework layer (Framework), and a kernel layer (Kernel, also referred to as a driver layer) from top to bottom. For example, as shown in FIG. 4A and FIG. 4B, the remote device 201 may include an application layer 400, a framework layer 401, and a driver layer 402. The local device 202 may include an application layer 410, a framework layer 411, and a driver layer 412.

Application layer: may include a range of application packages. For example, the application layer 400 and the application layer 410 shown in FIG. 4A and FIG. 4B may include: common applications, applications related to projection management, and an application of system (System) UI.

The common applications may be applications, such as Camera, Gallery, Calendar, Phone, Map, Navigation, WLAN, Bluetooth, Music, Videos, Messages, and Launcher. The application of system UI may include a navigation bar, a status bar, and the like of the electronic device 300 (for example, the remote device 201 or the local device 202). Applications related to projection management may include a device connection application and a projection display application. The device connection application is used to manage a wired or wireless connection between cross-devices (such as the remote device 201 and the local device 202) for implementing projection. The projection display application is used to display projection content or a projection interface projected by the remote device 201 to the local device 202.

The framework layer (Framework) provides an application programming interface (application programming interface, API) and a programming framework for an application at the application layer. As shown in FIG. 4A and FIG. 4B, the framework layer may provide a basic framework, a cross-device management framework, and a data management module.

The basic framework is responsible for basic capabilities such as a window display module, a layer management module, an immersive state collection module, and an immersive state restoration module. The immersive state collection module may collect a status of the remote device 201, for example, an immersive display state or a non-immersive display state. The remote device 201 may indicate, to the local device 202 by using "immersive status data", the status of the remote device 201, such as the immersive display state or the non-immersive display state. Immersive state restoration means that the local device 202 may restore a display manner of the local device 202 based on the "immersive status data" from the remote device 201, so that the status of the local device 202 is consistent with the status of the remote device 201.

The cross-device connection management framework is configured to manage a connection protocol (for example, a Wi-Fi connection protocol or a Bluetooth connection protocol) between cross-devices (such as the remote device 201 and the local device 202). The data management module is configured to manage data communication between the remote device 201 and the local device 202 in a cross-device scenario (for example, a multi-screen collaboration scenario). For example, as shown in FIG. 4A and FIG. 4B, the data management module may be configured to manage a-projection data and b-immersive status data that are transmitted by the remote device 201 to the local device 202. The a-projection data may include projected audio and video data and layer data, and the audio and video data and the layer data may also be referred to as screen image data. The b-immersive status data indicates the status of the remote device 201, for example, the immersive display state or the non-immersive display state.

The driver layer may provide capabilities such as device discovery, device authentication, and device connection between the remote device 201 and the local device 202. For example, as shown in FIG. 4A and FIG. 4B, the remote device 201 and the local device 202 may perform A-device discovery and B-authentication connection, to establish a connection (for example, a wired or wireless connection) between the remote device 201 and the local device 202. The a-projection data and the b-immersive status data may be transmitted by using a connection established by the driver layer.

Figure 5:
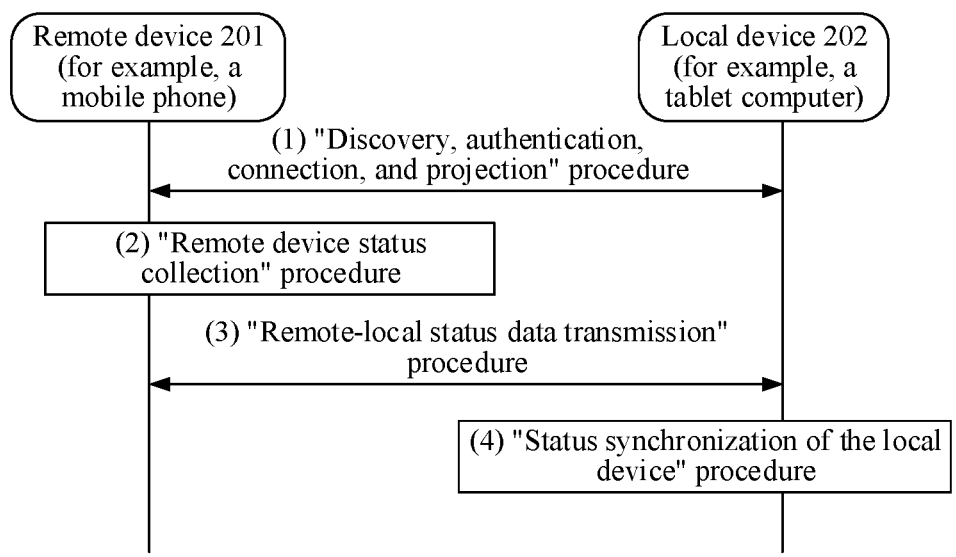
FIG. 5 is a flowchart of a projection display method according to an embodiment of this application.

In conclusion, as shown in FIG. 5, the method in this embodiment of this application may include the following four procedures: (1) "Discovery, authentication, connection, and projection" procedure; (2) "Remote device status collection" procedure; (3) "Remote-local status data transmission" procedure; (4) "Status synchronization of the local device" procedure The local device 202 and the remote device 201 may perform the foregoing (2) "Remote device status collection" procedure and (3) "Remote-local status data transmission" procedure and (4) "Status synchronization of the local device" procedure in a process in which the remote device 201 projects a screen to the local device 202.

The remote device 201 and the local device 202 may perform the "discovery, authentication, and connection" procedure in the foregoing (1) "Discovery, authentication, connection, and projection" procedure by using the driver layer. An application, a data management module at a framework layer, and a driver layer related to projection management in the remote device 201 and the local device 202 may support the remote device 201 and the local device 202 in performing the "projection" procedure in the foregoing (1) "Discovery, authentication, connection, and projection" procedure. The basic framework at the framework layer of the remote device 201 may execute (2) "Remote device status collection" procedure to perform immersive display state collection, and obtain immersive status data of the remote device 201 (b-immersive status data as shown in FIG. 4A and FIG. 4B). The remote device 201 and the local device 202 may perform, by using the connection established at the driver layer, (3) "Remote-local status data transmission" procedure, to transmit the immersive status data and the a-projection data shown in FIG. 4A and FIG. 4B. The basic framework at the framework layer of the local device 202 may perform (4) "Status synchronization of the local device" procedure, to perform immersive state restoration, so that the state of the local device 202 is consistent with the state of the remote device 201.

For example, in the following embodiment, an example in which the remote device 201 is a mobile phone, the local device 202 is a tablet computer, and the mobile phone projects a picture of a video application to the tablet computer is used, and a synchronization process of an immersive display state or a non-immersive display state of the tablet computer and the mobile phone is described with reference to the foregoing physical display projection scenario.

Figure 6A:
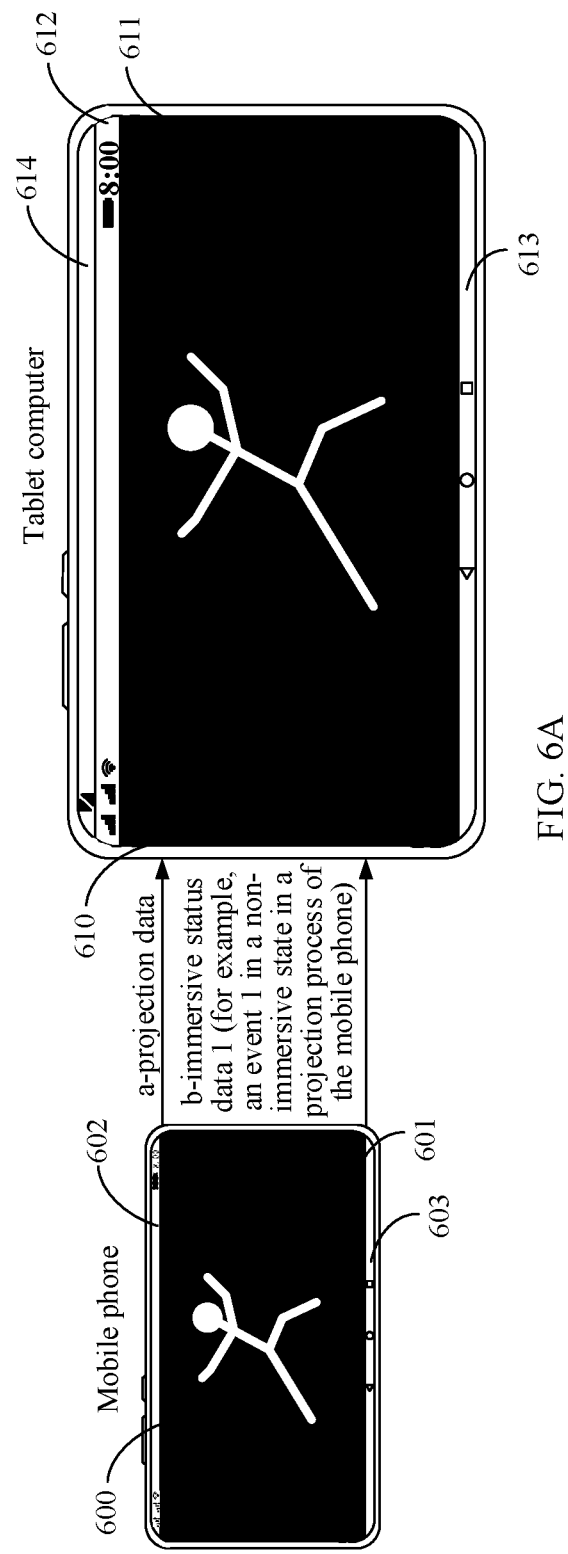
FIG. 6A and FIG. 6B are schematic diagrams of UI interfaces of a mobile phone and a tablet computer in a physical display projection scenario according to an embodiment of this application.

In a process in which the mobile phone projects a screen to the tablet computer, the mobile phone may display a first interface 600 shown in FIG. 6A. The first interface 600 not only includes first content (for example, a UI interface image of a video application) 601, but also includes a status bar 602 and a navigation bar 603 of the mobile phone. The mobile phone is in a non-immersive display state. The mobile phone may transmit second projection data (a-projection data shown in FIG. 6A) to the tablet computer. The second projection data includes first content 611, and the first content 611 is a mirror image of the first content 601. The mobile phone may take a screenshot of the first content 601 or send, in a streaming mode, the first content 601 displayed by the mobile phone to the tablet computer, and the tablet computer presents the display content of the mobile phone in a projection window (for example, a first projection window). Content (for example, the first content 611) presented in the projection window (for example, the first projection window) and the first content 601 are mirrored.

In this case, the mobile phone may collect second status data of the mobile phone (b-immersive status data 1 as shown in FIG. 6A). The b-immersive status data 1 shown in FIG. 6A may be: An event 1 indicating that the mobile phone is in a non-immersive display state during projection is used to indicate to the tablet computer that the mobile phone does not hide the status bar and the navigation bar, and that the mobile phone is in the non-immersive display state. The mobile phone may send the second status data (b-immersive status data 1 as shown in FIG. 6A) to the tablet computer. After receiving the second status data, the tablet computer may display a projection interface of the mobile phone in a "non-immersive display" manner. For example, the tablet computer may display the first projection window 610 shown in FIG. 6A. The first projection window 610 not only includes the first content (for example, a UI interface image of a video application) 611, but also includes a status bar 612, a navigation bar 613, and a title bar 614. The tablet is in the non-immersive display state. The mobile phone and the tablet computer shown in FIG. 6A are in the same state in a projection process, and both are in the non-immersive display state.

In a process in which the mobile phone projects a screen to the tablet computer, the mobile phone may alternatively display a second interface 620. The second interface 620 includes second content (for example, a UI interface image of a video application) 620, but does not include the status bar and the navigation bar of the mobile phone. In other words, the mobile phone hides the status bar and the navigation bar of the mobile phone, and the mobile phone is in an immersive display state. The mobile phone may transmit first projection data (a-projection data shown in FIG. 6B) to the tablet computer. The first projection data includes second content 631, and the second content 631 is a mirror image of the second content 620. The mobile phone may take a screenshot of the second content 620 or send, in a streaming mode, the second content 620 displayed by the mobile phone to the tablet computer, and the tablet computer presents the display content of the mobile phone in a projection window (for example, a second projection window). Content (for example, the second content 631) presented in the projection window (for example, the second projection window) and the second content 620 are mirrored.

Figure 6B:
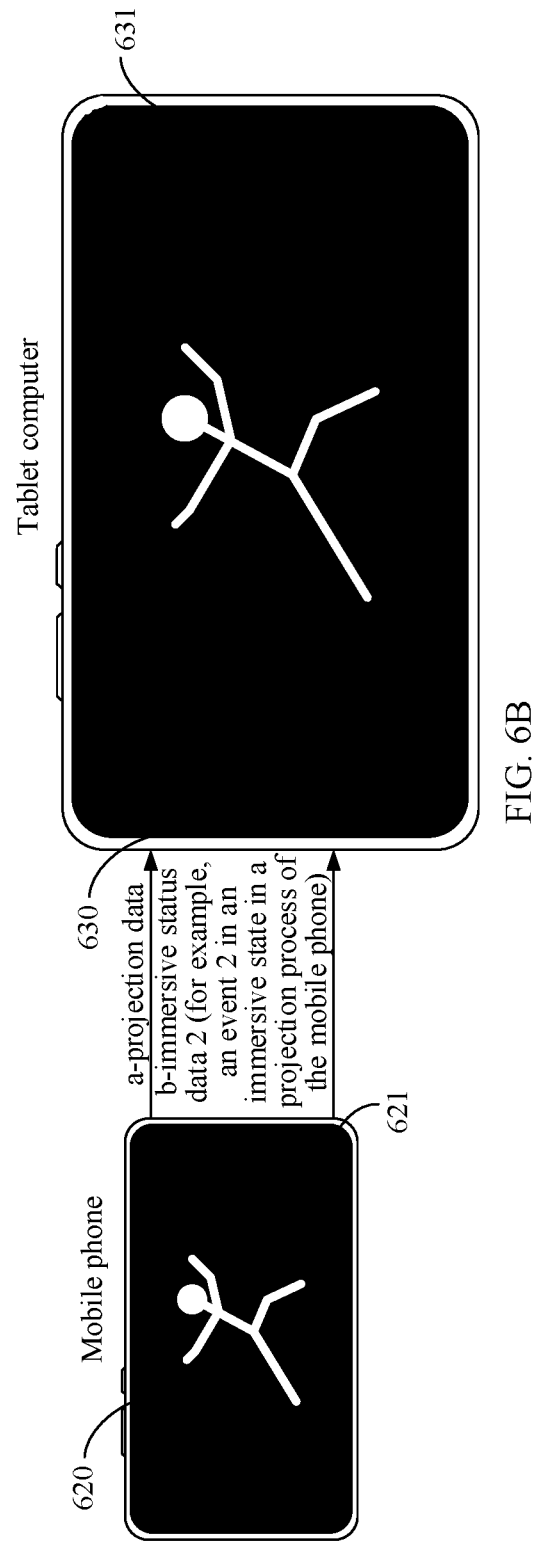

In this case, the mobile phone may collect first status data (b-immersive status data 2 as shown in FIG. 6B) of the mobile phone. The b-immersive status data 2 shown in FIG. 6B may be: An event 2 indicating that the mobile phone is in an immersive display state during projection is used to indicate to the tablet computer that the mobile phone hides the status bar and the navigation bar, and that the mobile phone is in the immersive display state. The mobile phone may alternatively transmit first status data to the tablet computer. After receiving the second status data, the tablet computer may display a projection interface of the mobile phone in an "immersive display" manner. For example, the tablet computer may display a second projection window 630 shown in FIG. 6B. The second projection window 630 includes second content (for example, a UI interface image of a video application) 631, but does not include a title bar, a navigation bar, and a status bar of a projection application. In other words, the tablet computer hides the title bar, the navigation bar, and the status bar, and the tablet computer is in the immersive display state. The mobile phone and the tablet computer shown in FIG. 6B are in the same state in a projection process, and both are in the immersive display state.

For ease of understanding, in the following embodiments, an example in which the remote device 201 is a mobile phone and the local device 202 is a tablet computer is used to describe the method in embodiments of this application with reference to a physical display projection scenario. The following embodiment describes the four procedures shown in FIG. 5 in detail, to describe the method in embodiments of this application.

(1) "Discovery, Authentication, Connection, and Projection" Procedure

When a user wants to project screen content of the mobile phone to the tablet computer for display, the user may enable a projection function of the mobile phone, to trigger the mobile phone to discover a surrounding projecting device (such as a tablet computer), and establish a connection to the projecting device to implement the projection function.

For example, the connection between the mobile phone and the tablet computer may be a wireless connection or a wired connection. For example, the foregoing wireless connection may be any connection such as a Wi-Fi connection, a Bluetooth connection, or an NFC connection. For example, the wired connection may be a USB connection. In the following embodiment, an example in which the remote device 201 and the local device 202 establish a Wi-Fi connection in a wireless manner is used to describe the method in this embodiment of this application.

The user may enable the projection function of the mobile phone by using a projection setting interface of the mobile phone, to trigger the mobile phone to perform the foregoing "Discovery, authentication, connection, and projection" procedure, to implement the projection function.

Figure 7A:
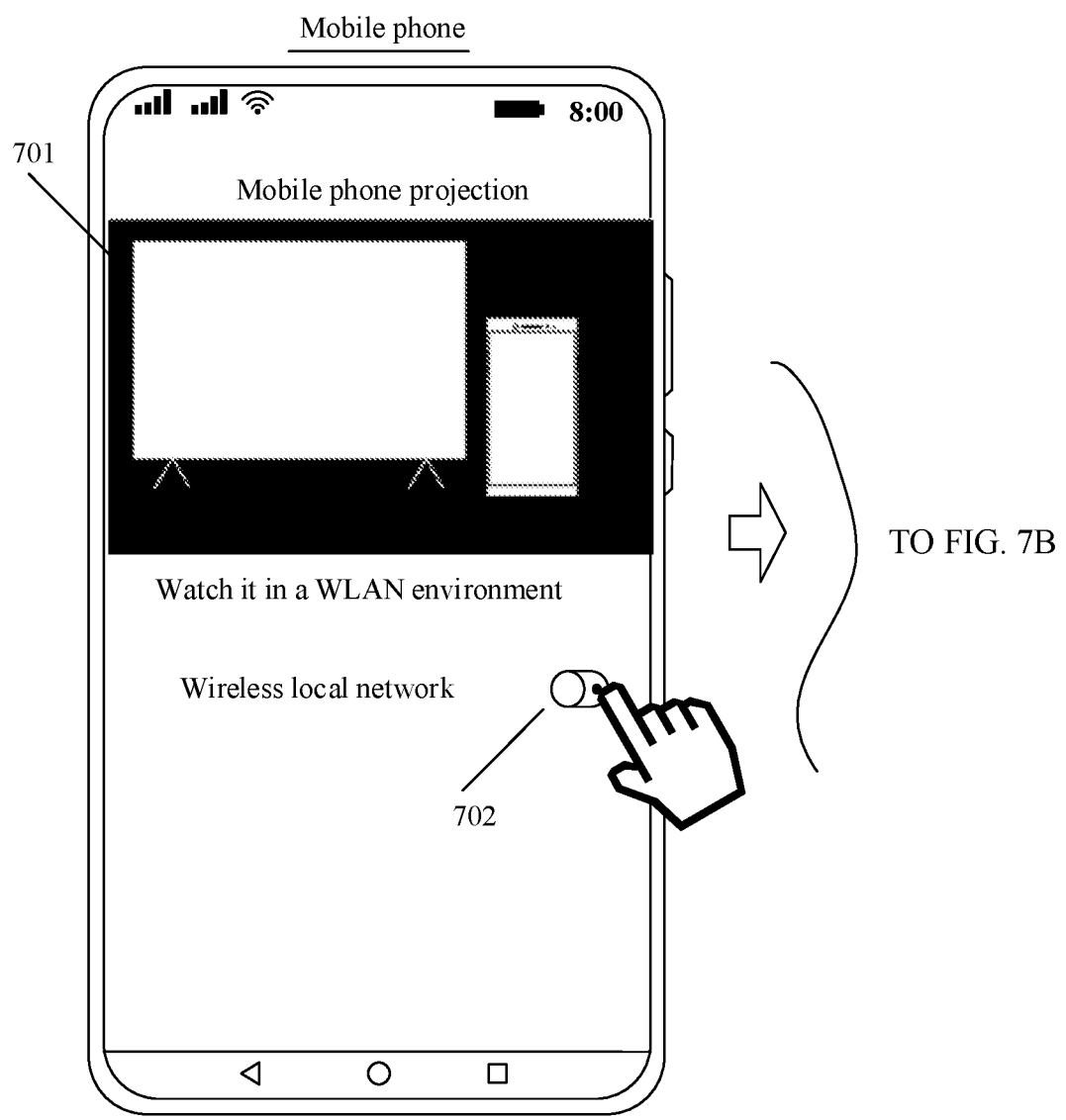
FIG. 7A to FIG. 7C are schematic diagrams of UI interfaces for starting a projection function by a mobile phone according to an embodiment of this application.
Figure 7B:
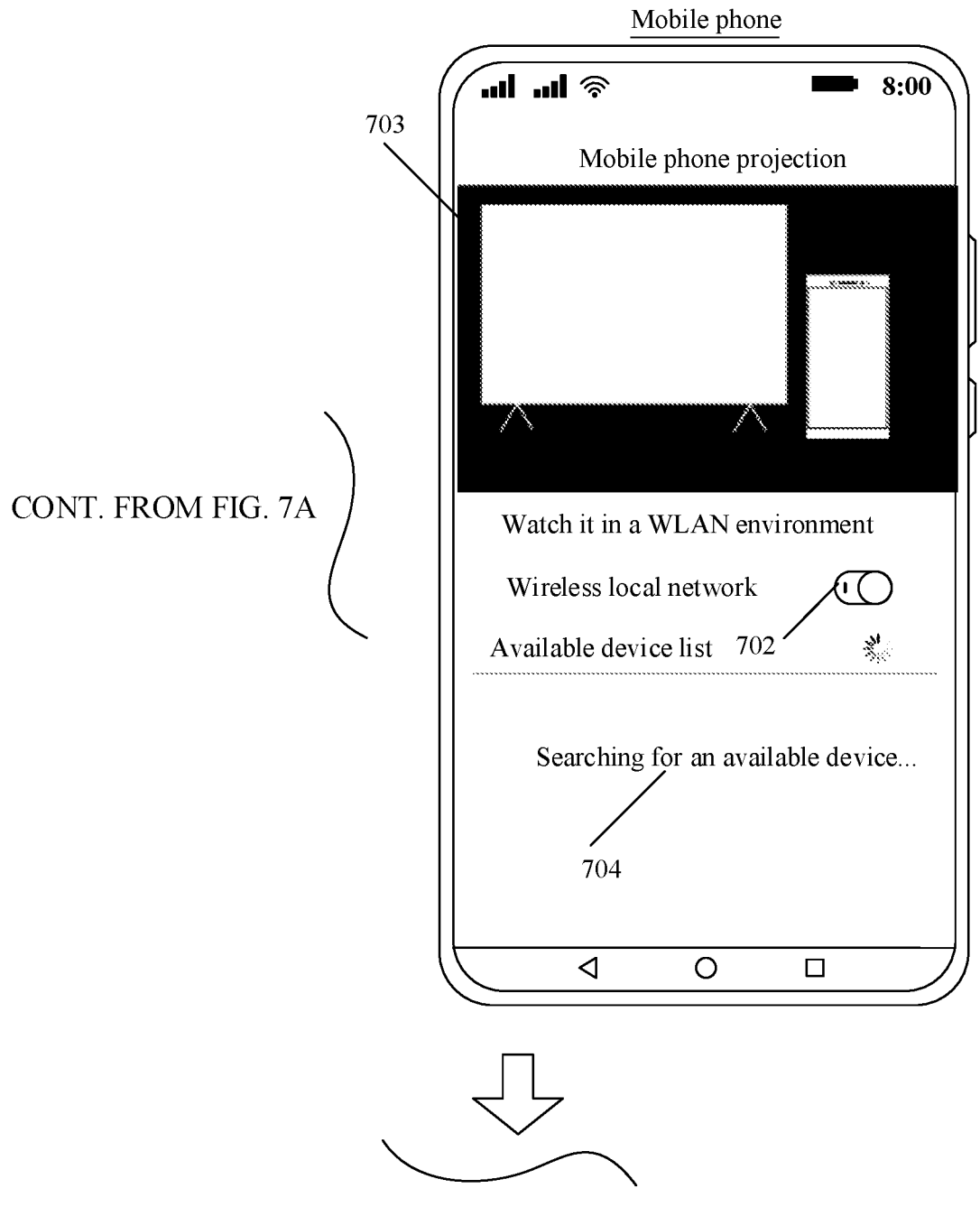

For example, the mobile phone may display a projection setting interface 701 shown in FIG. 7A. The projection setting interface 701 includes a projection switch button 702. As shown in FIG. 7A, the projection switch button 702 is in an off state. The mobile phone may receive an enabling operation (for example, a tapping operation) performed by a user on the projection switch button 702. In response to the tapping operation performed by the user on the projection switch button 702, the mobile phone may search for or discover a surrounding wireless device by using Wi-Fi, to support the mobile phone in using a "mobile phone projection" function. For example, the mobile phone may display a projection setting interface 703 shown in FIG. 7B. The projection setting interface 703 includes search prompt information 704, for example, "Searching for an available device . . . ". In the projection setting interface 703, the projection switch button 702 is in an on state.

Figure 7C:
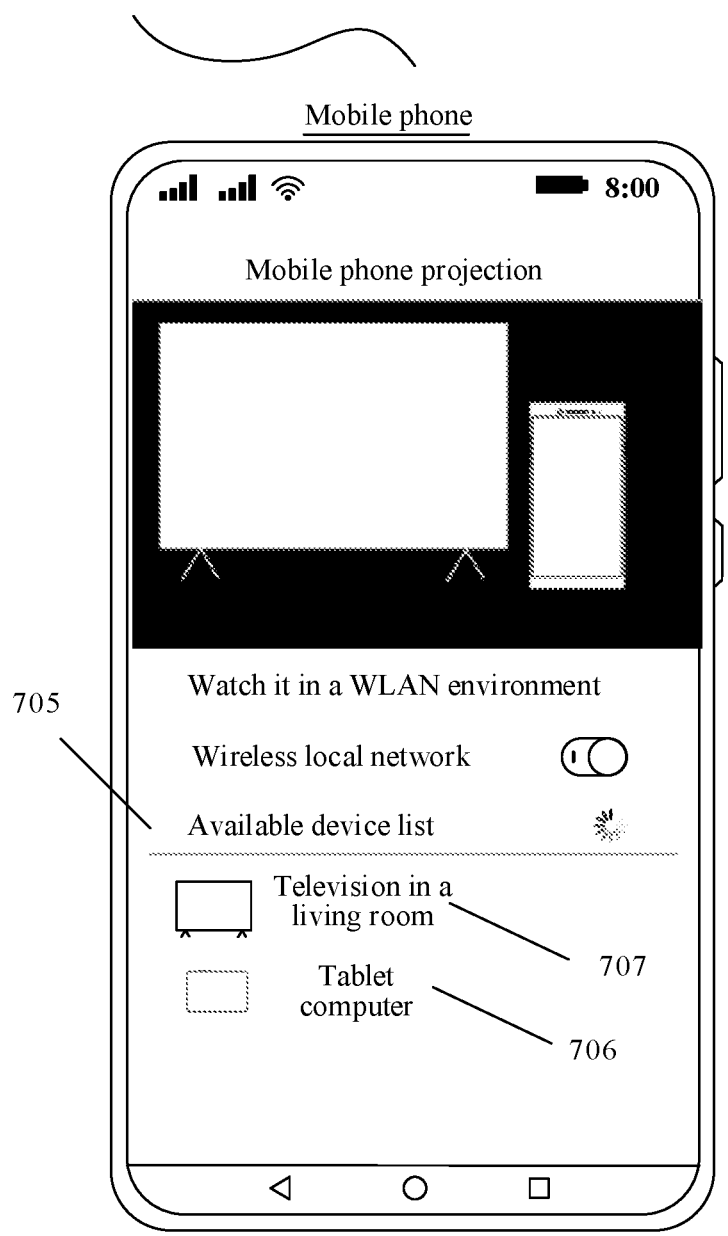

After the mobile phone finds a wireless device around it (For example, the mobile phone receives a Probe Response frame sent by another wireless device), the mobile phone may display an available device list 705 shown in FIG. 7C on the projection setting interface. The device list 705 includes an option 706 of a wireless device (such as a tablet computer) found by the mobile phone and an option 707 of a wireless device (such as a living room television). In response to a tapping operation performed by the user on the option 706 of the tablet computer, after authentication is passed between the mobile phone and the tablet computer, a Wi-Fi connection may be established, and then a screen is projected to the tablet computer.

For detailed descriptions of the foregoing (1) "Discovery, authentication, connection, and projection" procedure, refer to a specific method in which a mobile phone and a tablet computer perform the procedure in a conventional technology. Details are not described herein in this embodiment of this application.

(2) "Remote Device Status Collection" Procedure

The mobile phone may collect immersive status data of the mobile phone, and the immersive status data indicates that the mobile phone is in an immersive display state or a non-immersive display state.

It should be understood that if a display interface of the mobile phone does not include the status bar and the navigation bar, it indicates that the mobile phone is in the immersive display state; or if a display interface of the mobile phone includes the status bar and the navigation bar, it indicates that the mobile phone is in the non-immersive display state. It can be learned that the mobile phone may identify the immersive display state or the non-immersive display state of the mobile phone by determining whether the display interface of the mobile phone includes the status bar and the navigation bar.

For example, in a process of projecting a screen from a mobile phone to a tablet computer, that collecting a trigger condition or a trigger occasion of immersive status data of the mobile phone may include at least one of the following four implementations.

Implementation (1):

When the mobile phone is switched from a landscape mode to a portrait mode, immersive status data of the mobile phone is collected. When the mobile phone is switched from a portrait mode to a landscape mode, immersive status data of the mobile phone is collected.

Figure 8A:
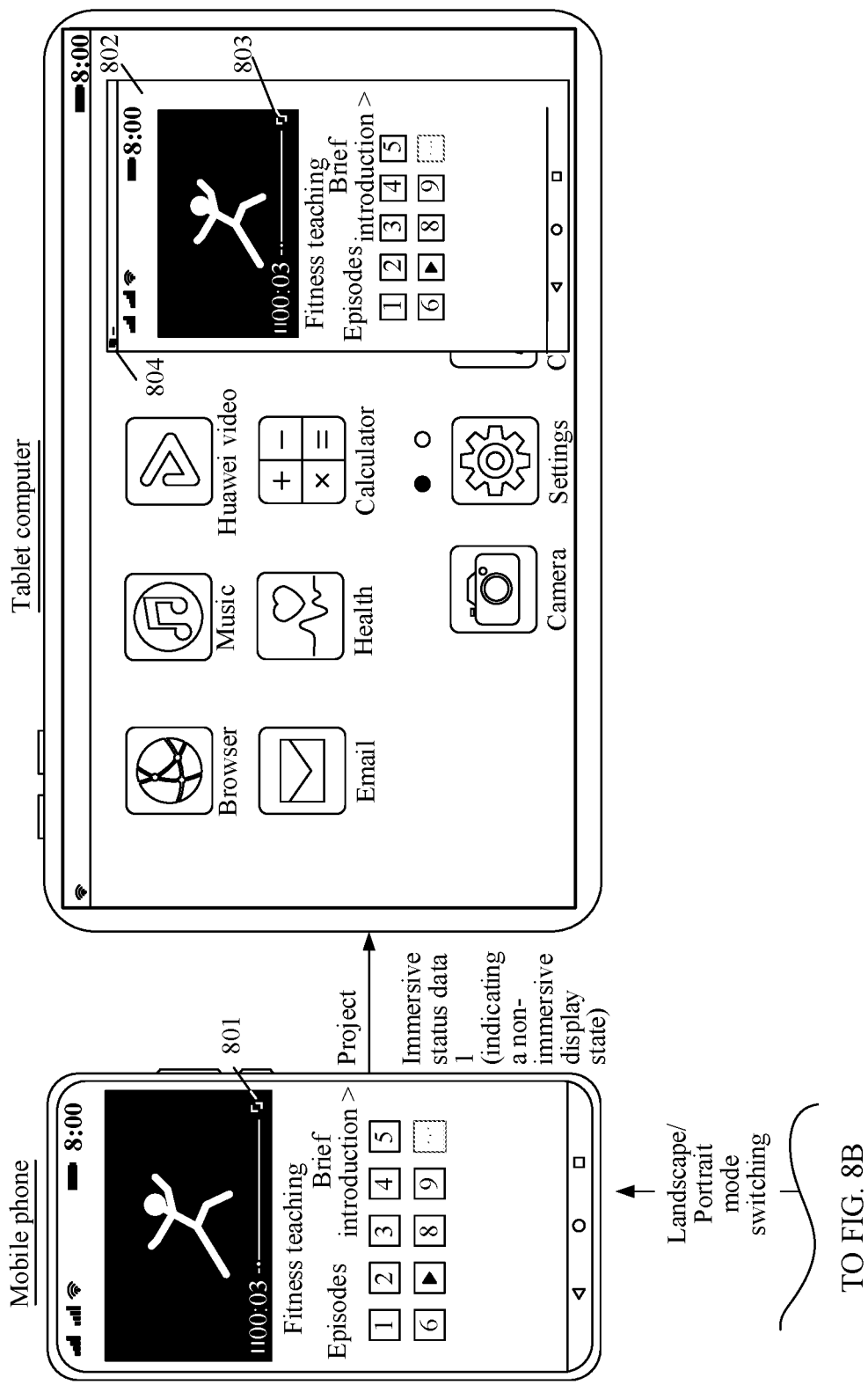
FIG. 8A and FIG. 8B are schematic diagrams of UI interfaces of a mobile phone and a tablet computer in a physical display projection scenario according to an embodiment of this application.

Generally, when the mobile phone is in the portrait mode, there is a high probability that the mobile phone displays a UI interface of an application in a "non-immersive display" manner, that is, the mobile phone is in the non-immersive display state. For example, as shown in FIG. 8A, the mobile phone is in a portrait mode, the mobile phone displays a UI interface of a video application in a "non-immersive display" manner, and the mobile phone is in a non-immersive display state.

Figure 8B:
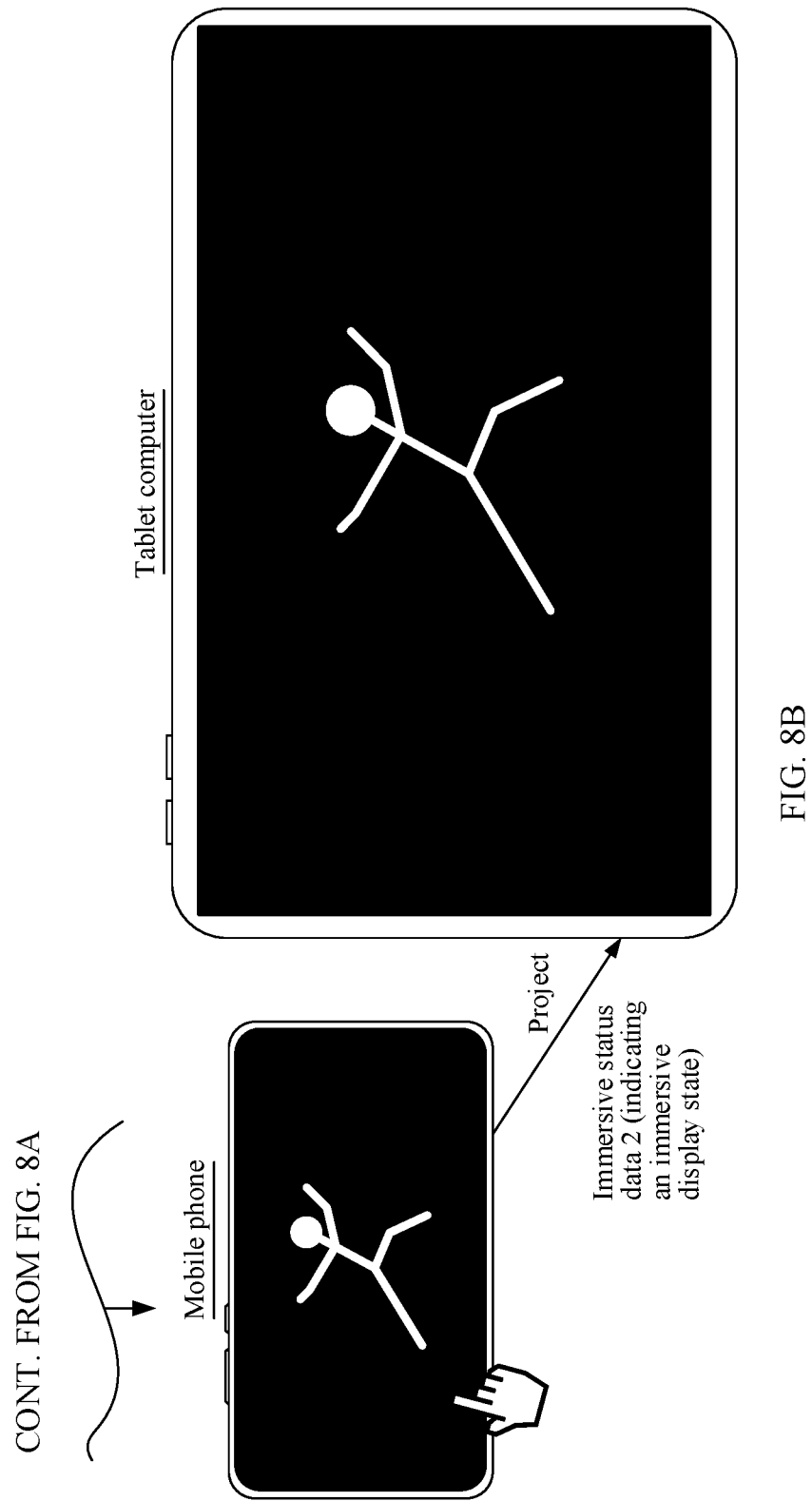

After the mobile phone switches from the portrait mode to a landscape mode, the mobile phone may automatically display the UI interface of the application in an "immersive display" manner, that is, the mobile phone switches from the non-immersive display state to the immersive display state. In other words, when the mobile phone switches from the portrait mode to the landscape mode, the mobile phone may automatically switch from the non-immersive display state to the immersive display state. For example, after the mobile phone switches from the portrait mode shown in FIG. 8A to the landscape mode shown in FIG. 8B, as shown in FIG. 8B, the mobile phone displays the UI interface of the video application in the "immersive display" manner. In other words, the mobile phone switches from the non-immersive display state to the immersive display state.

It is assumed that the mobile phone displays the UI interface of the application in the "immersive display" manner in the landscape mode, that is, the mobile phone is in the immersive display state. When the mobile phone switches from the landscape mode to the portrait mode, the mobile phone may automatically display the UI interface of the application in the "non-immersive display" manner, that is, the mobile phone switches from the immersive display state to the non-immersive display state. In other words, when the mobile phone switches from the landscape mode to the portrait mode, the mobile phone may automatically switch from the immersive display state to the non-immersive display state. For example, after the mobile phone switches from the landscape mode shown in FIG. 8B to the portrait mode shown in FIG. 8A, as shown in FIG. 8A, the mobile phone displays the UI interface of the video application in the "non-immersive display" manner. In other words, the mobile phone switches from the immersive display state to the non-immersive display state.

In conclusion, when switching between the landscape mode and the portrait mode, the mobile phone may automatically switch between the immersive display state and the non-immersive display state. In other words, when the mobile phone performs landscape/portrait mode switching, immersive status data of the mobile phone may change. Therefore, in this embodiment of this application, the mobile phone collects the immersive status data of the mobile phone when performing landscape/portrait mode switching, and may collect changed immersive status data. In this way, the mobile phone may perform (3) "Remote-local status data transmission" procedure to transmit latest immersive status data of the mobile phone to the tablet computer.

Implementation (2):

When receiving a first preset operation of the user, the mobile phone collects immersive status data of the mobile phone. The first preset operation may trigger the mobile phone to switch from the immersive display state to the non-immersive display state, or switch from the non-immersive display state to the immersive display state.

The first preset operation may be a user operation entered on a UI interface of an application displayed on the mobile phone. The first preset operation may trigger the mobile phone to switch from the immersive display state to the non-immersive display state, or switch from the non-immersive display state to the immersive display state.

Figure 9A:
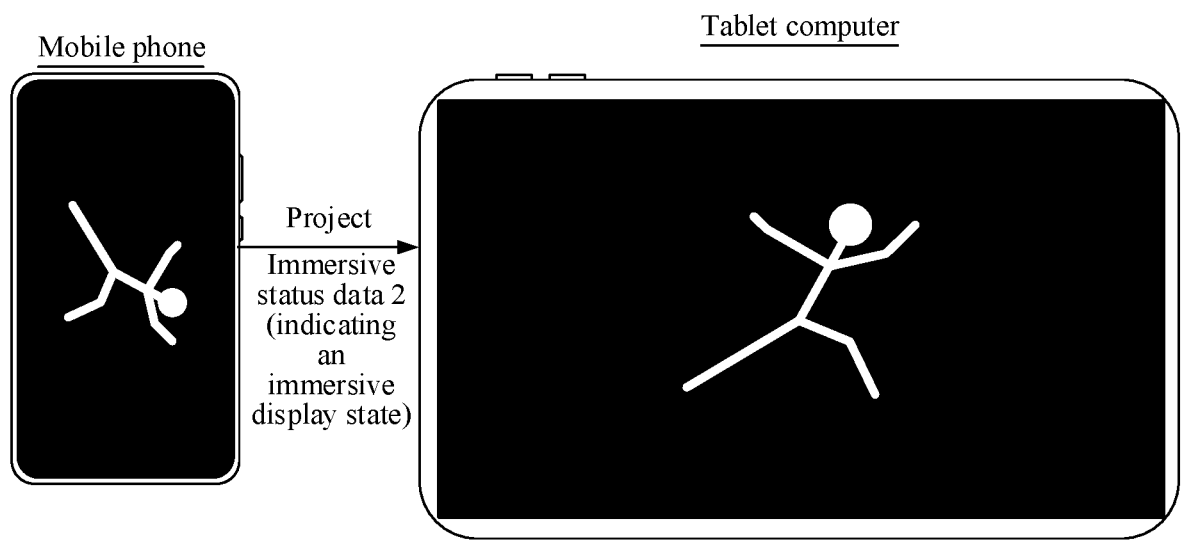
FIG. 9A and FIG. 9B are schematic diagrams of UI interfaces of a mobile phone and a tablet computer in a physical display projection scenario according to an embodiment of this application.

For example, as shown in FIG. 8A, the UI interface of the video application displayed by the mobile phone includes an "extended" button 801. The "extended" button 801 is configured to trigger the mobile phone to display a video playback picture of the video application in full screen. The foregoing first preset operation may be a tapping operation performed by the user on the "extended" button 801. In response to the tapping operation performed by the user on the "extended" button 801, as shown in FIG. 9A, the mobile phone may display a video playback picture of the video application in full screen. In other words, the mobile phone may display the UI interface of the video application in an "immersive display" manner.

Figure 9B:
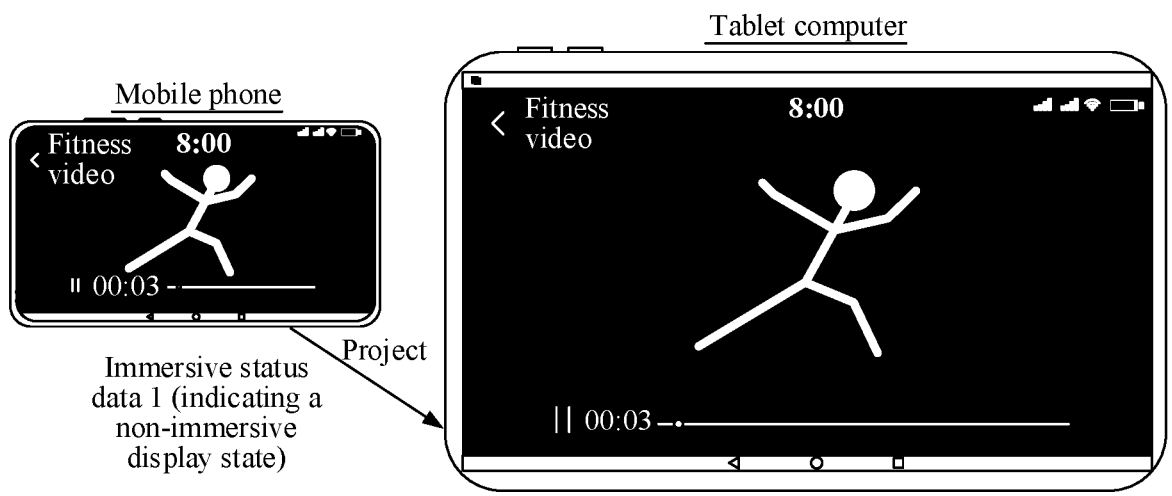

For another example, as shown in FIG. 8B, the mobile phone displays the UI interface of the video application in the "immersive display" manner, and the mobile phone is in the immersive display state. The foregoing first preset operation may be a tapping operation performed by the user on any position in the UI interface displayed by the mobile phone. In response to the tapping operation, the mobile phone may display a UI interface of a video application shown in FIG. 9B. As shown in FIG. 9B, the UI interface displayed by the mobile phone includes a status bar and a navigation bar. Therefore, the mobile phone shown in FIG. 9B displays the UI interface of the video application in a "non-immersive display" manner, and the mobile phone is in a non-immersive display state.

In conclusion, the first preset operation in the foregoing example may trigger the mobile phone to switch from the immersive display state to the non-immersive display state, or switch from the non-immersive display state to the immersive display state. In other words, after the mobile phone receives the first preset operation, immersive status data of the mobile phone may change. Therefore, in this embodiment of this application, when receiving the first preset operation, the mobile phone collects the immersive status data of the mobile phone, and may collect changed immersive status data. In this way, the mobile phone may perform (3) "Remote-local status data transmission" procedure to transmit latest immersive status data of the mobile phone to the tablet computer.

Implementation (3):

The mobile phone can collect immersive status data of the mobile phone when the mobile phone switches between interfaces (That is, a display interface of the mobile phone is switched from a UI interface of an application to a UI interface of another application).

When displaying the UI interface of the application, the mobile phone may receive a message from another device (for example, text messages or chat messages from instant messaging applications), and may receive a call from another device. In this case, interface switching may occur on the mobile phone, and immersive status data of the mobile phone may change.

For example, as shown in FIG. 8B, the mobile phone displays the UI interface of the video application in the "immersive display" manner, and the mobile phone is in the immersive display state. The mobile phone receives a call from another device (For example, a mobile phone number is 180****7522), an incoming call notification message 1001 shown in FIG. 10A may be displayed. The incoming call notification message 1001 includes an "Answer" button 1002 and a "Hang up" button. In response to a tapping operation performed by the user on the "Hang up" button, the mobile phone may display the UI interface of the video application shown in FIG. 8B. In response to a tapping operation performed by the user on the "Answer" button 1002, the mobile phone may display a display interface 1005 shown in FIG. 10B, and the mobile phone performs interface switching.

Alternatively, in some other embodiments, as shown in FIG. 8B, the mobile phone displays the UI interface of the video application in the "immersive display" manner, and the mobile phone is in the immersive display state. The mobile phone receives a call from another device (For example, a mobile phone number is 180****7522), the display interface 1005 shown in FIG. 10B may be directly displayed, and the mobile phone performs interface switching.

Figure 10A:
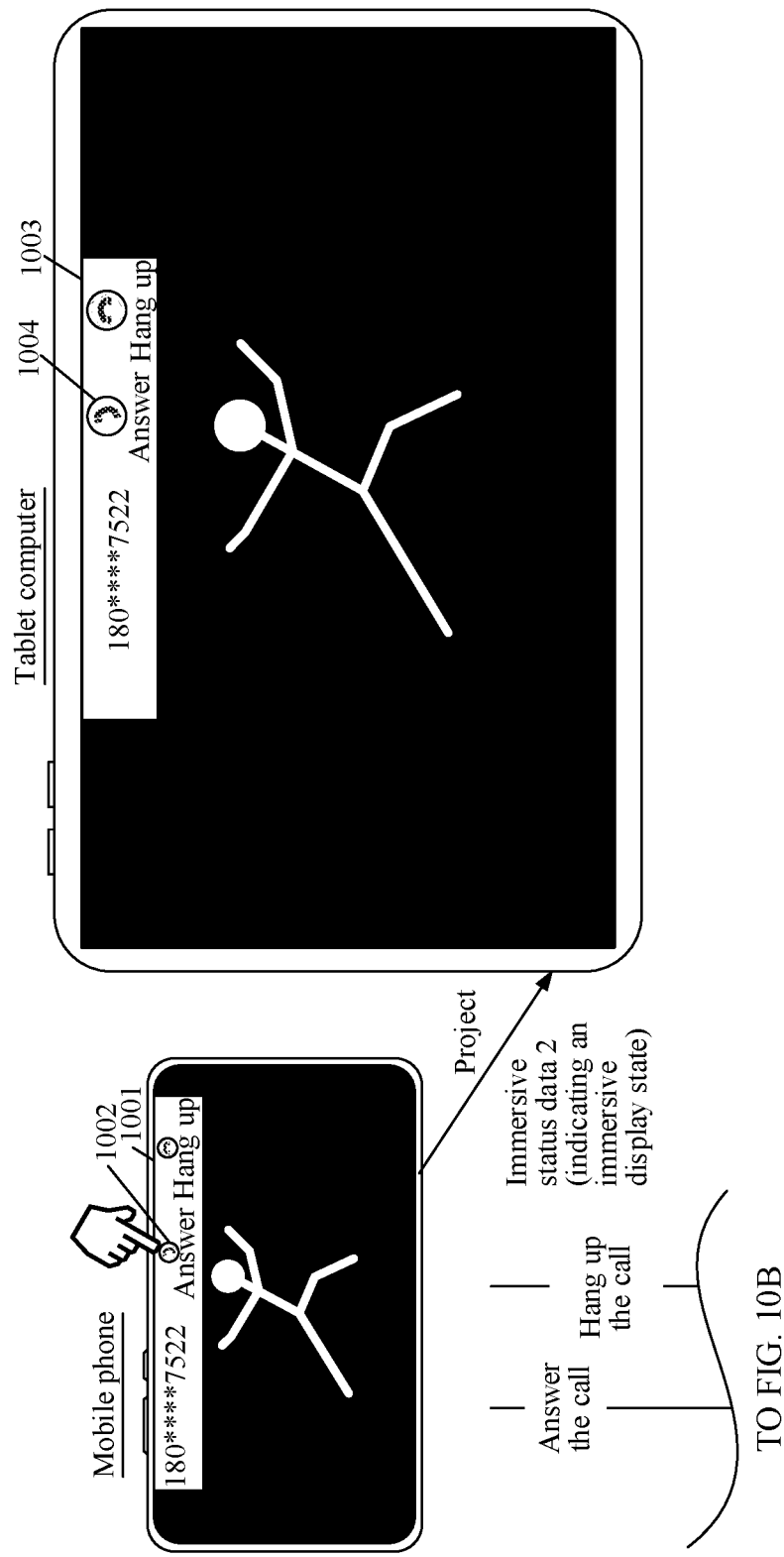
FIG. 10A and FIG. 10B are schematic diagrams of UI interfaces of a mobile phone and a tablet computer in a physical display projection scenario according to an embodiment of this application.
Figure 10B:
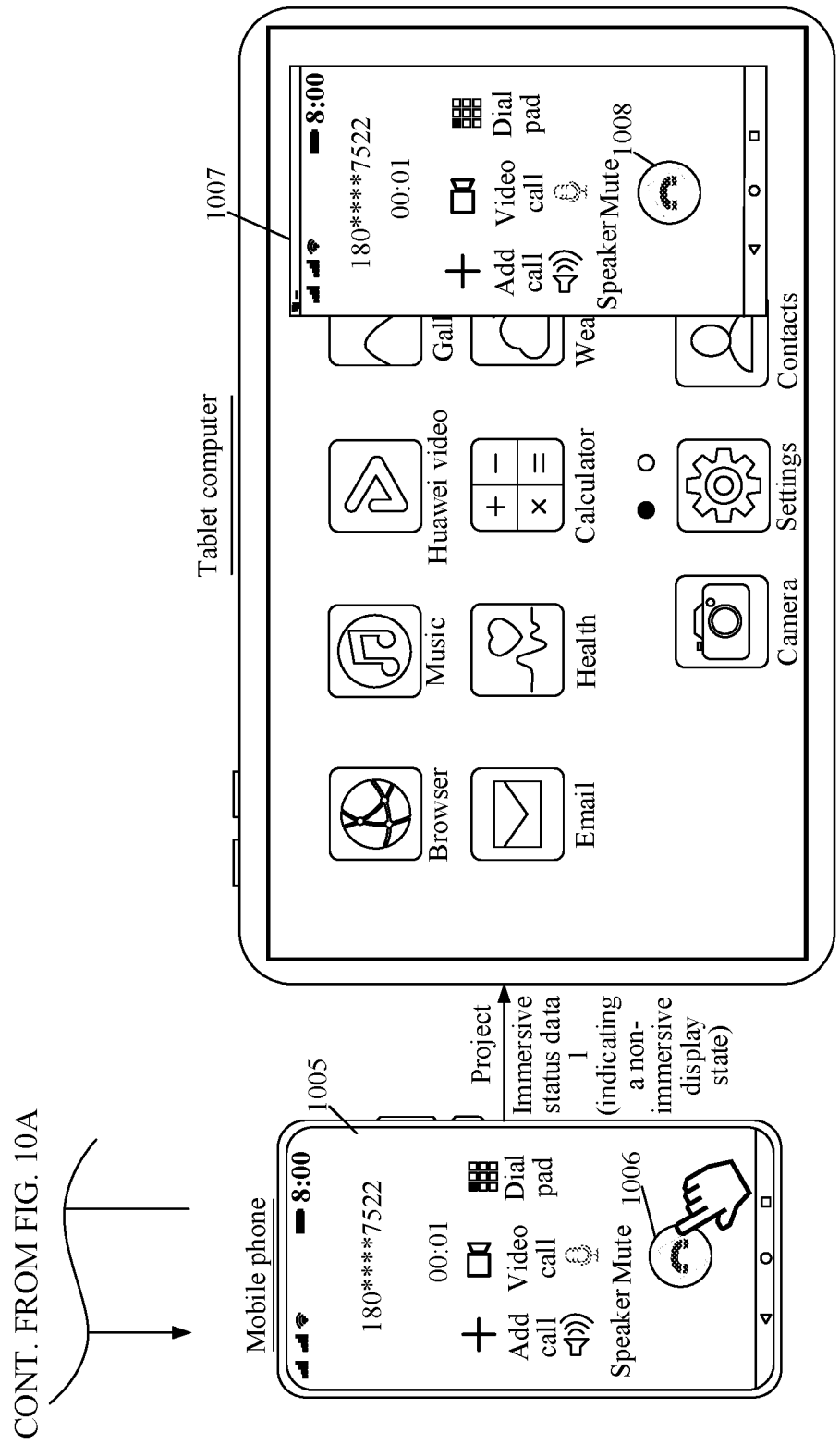

A display interface shown in FIG. 10A does not include the status bar and the navigation bar of the mobile phone, and the mobile phone is in the immersive display state. As shown in FIG. 10B, the display interface 1005 includes not only a call interface of a telephone application, but also the status bar and the navigation bar of the mobile phone. The mobile phone is in the non-immersive display state. In other words, the mobile phone switches from the immersive display state shown in FIG. 10A to the non-immersive display state shown in FIG. 10B, and immersive status data of the mobile phone changes.

The display interface shown in FIG. 10B includes a "Hang up" button 1006. In response to a tapping operation performed by the user on the "Hang up" button 1006, the mobile phone may also perform interface switching. For example, in response to the tapping operation performed by the user on the "Hang up" button 1006, as shown in FIG. 8B, the mobile phone may display the UI interface of the video application in the "immersive display" manner. In other words, the mobile phone switches from the non-immersive display state shown in FIG. 10B to the immersive display state shown in FIG. 8B, and the immersive status data of the mobile phone changes.

For another example, as shown in FIG. 8B, the mobile phone displays the UI interface of the video application in the "immersive display" manner, and the mobile phone is in the immersive display state. After receiving a new message from another device, the mobile phone may display a new message notification 1101 shown in FIG. 11A. In response to a tapping operation performed by the user on the new message notification 1101, the mobile phone may display a display interface 1103 shown in FIG. 11B, and the mobile phone performs interface switching.

Figure 11A:
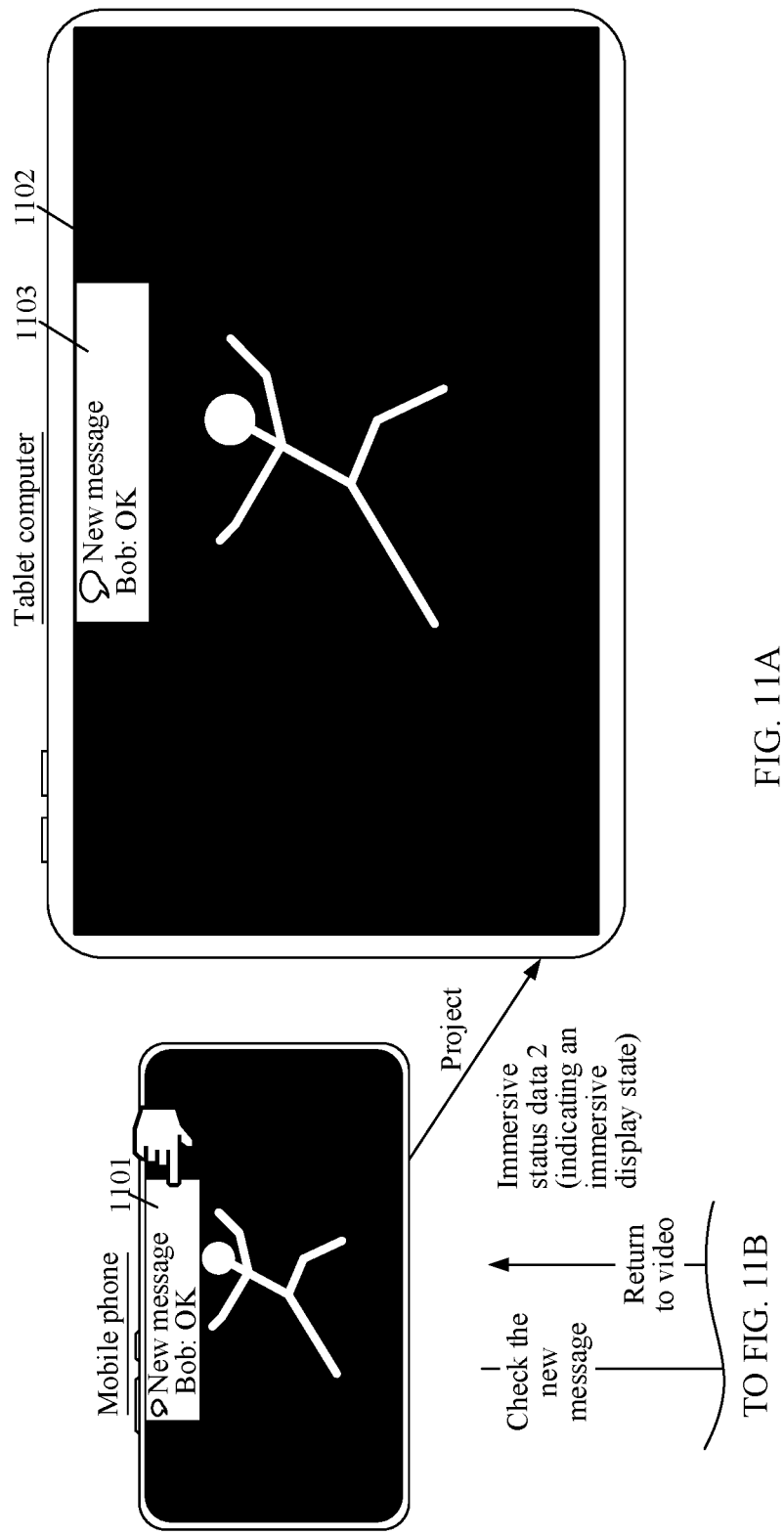
FIG. 11A and FIG. 11B are schematic diagrams of UI interfaces of a mobile phone and a tablet computer in a physical display projection scenario according to an embodiment of this application.
Figure 11B:
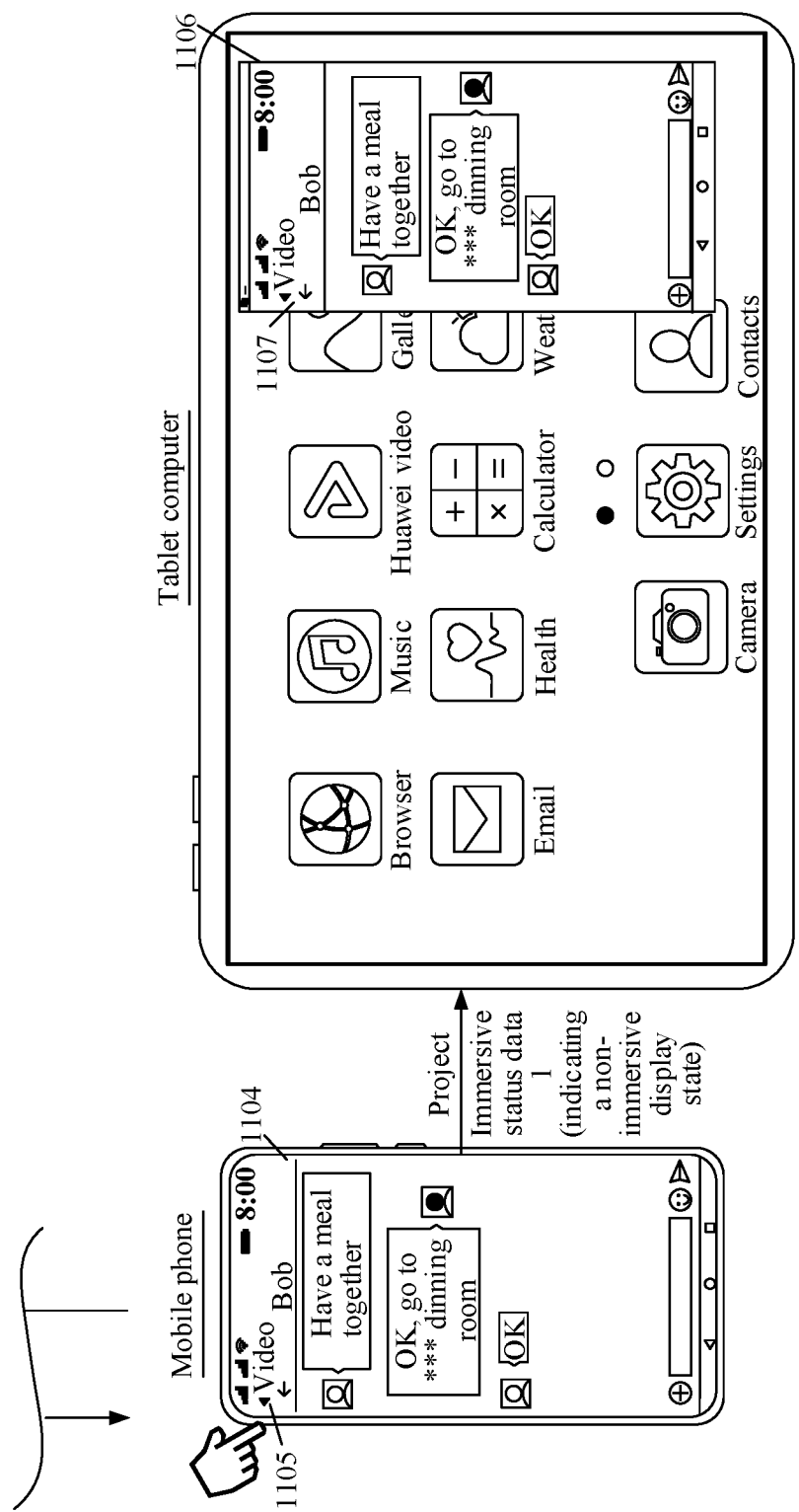

A display interface shown in FIG. 11A does not include a status bar and a navigation bar of the mobile phone, and the mobile phone is in an immersive display state. As shown in FIG. 11B, the display interface 1103 includes not only a call interface of a telephone application, but also the status bar and the navigation bar of the mobile phone. The mobile phone is in the non-immersive display state. In other words, the mobile phone switches from the immersive display state shown in FIG. 11A to the non-immersive display state shown in FIG. 11B, and immersive status data of the mobile phone changes.

The display interface 1103 shown in FIG. 11B includes a "Return to video" button 1104. In response to a tapping operation performed by the user on the "Return to video" button 1104, the mobile phone may also perform interface switching. For example, in response to the tapping operation performed by the user on the "Return to video" button 1104, as shown in FIG. 8B, the mobile phone may display the UI interface of the video application in an "immersive display" manner. In other words, the mobile phone switches from the non-immersive display state shown in FIG. 11B to the immersive display state shown in FIG. 8B, and the immersive status data of the mobile phone changes.

In conclusion, when interface switching occurs on the mobile phone, the mobile phone may be triggered to switch from the immersive display state to the non-immersive display state, or to switch from the non-immersive display state to the immersive display state. That is, when interface switching occurs on the mobile phone, the immersive status data of the mobile phone may change. Therefore, in this embodiment of this application, when interface switching occurs on the mobile phone, the immersive status data of the mobile phone is collected, and changed immersive status data may be collected. In this way, the mobile phone may perform (3) "Remote-local status data transmission" procedure to transmit latest immersive status data of the mobile phone to the tablet computer.

It should be noted that, the first preset operation in the foregoing implementation (2) may further include: the tapping operation performed by the user on the "Answer" button 1002 shown in FIG. 10A, the tapping operation performed by the user on the "Hang up" button 1006 shown in FIG. 10B, the tapping operation performed by the user on the new message notification 1101 shown in FIG. 11A, and the tapping operation performed by the user on the "Return to video" button 1104 shown in FIG. 11B.

Generally, the foregoing first preset operation may trigger interface switching on the mobile phone. Therefore, in this embodiment of this application, that the mobile phone collects the immersive status data of the mobile phone may be triggered by the foregoing first preset operation, or may be triggered by interface switching on the mobile phone. This is not limited in this embodiment of this application.

Implementation (4):

The mobile phone periodically collects immersive status data of the mobile phone after a projection starts.

Periodicity duration in which the mobile phone periodically collects the immersive status data of the mobile phone may be preconfigured in the mobile phone, or may be set by a user in the mobile phone.

Figure 12:
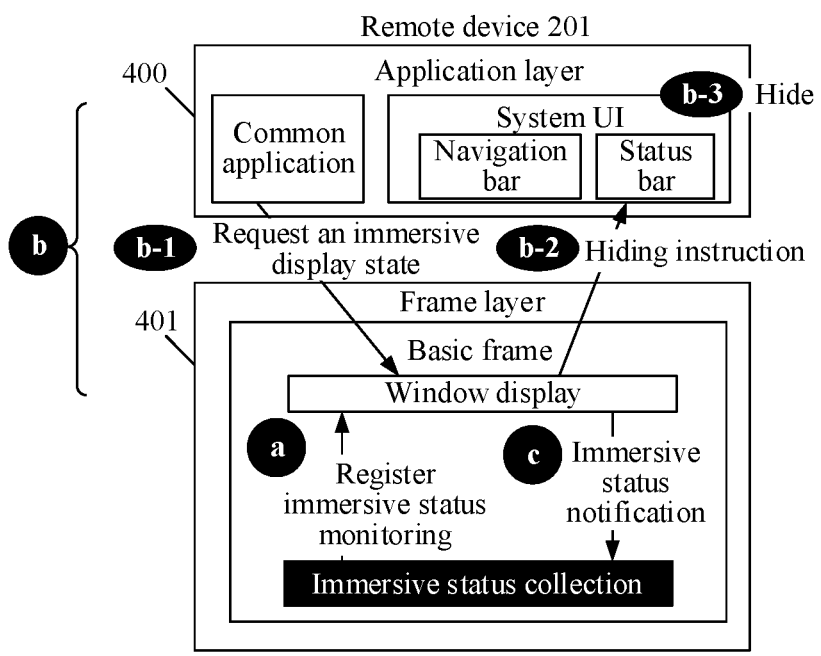
FIG. 12 is a schematic flowchart of "remote device status collection" according to an embodiment of this application.

In this embodiment of this application, in a process of projecting a screen from a mobile phone to a tablet computer, when the mobile phone meets the foregoing trigger condition or trigger occasion, the mobile phone may collect the immersive status data of the mobile phone. In this embodiment of this application, with reference to the software architecture shown in FIG. 4A and FIG. 4B, a specific manner in which the mobile phone collects the immersive status data of the mobile phone is described by using an example. For example, as shown in FIG. 12, a mobile phone may perform the following step a to step c, to implement the foregoing (2) "Remote device status collection" procedure.

Step a: An immersive state collection module of a framework layer 401 registers monitoring with a window display module, and requests the window display module to monitor whether an application of an application layer 400 is in an immersive display state.

For example, when the mobile phone starts to project a screen to the tablet computer, the immersive state collection module of the framework layer 401 may register monitoring with the window display module, and request the window display module to monitor whether the application of the application layer 400 is in the immersive display state. In addition, in a process in which the mobile phone projects a screen to the tablet computer, the window display module may continuously monitor whether the application at the application layer 400 is in the immersive display state.

A display state of the application at the application layer 400 may include: the immersive display state and a non-immersive display state. That the application at the application layer 400 is in the immersive display state specifically means: The mobile phone displays a UI interface of the application at the application layer 400 in an "immersive display" manner. In this case, the mobile phone is in the immersive display state. That the application at the application layer 400 is in the non-immersive display state specifically means: The mobile phone displays a UI interface of the application at the application layer 400 in a "non-immersive display" manner. In this case, the mobile phone is in the non-immersive display state.

Step b: The window display module detects that the display status of the application at the application layer 400 changes.

In a process of projecting a screen from the mobile phone to the tablet computer, when the mobile phone meets the foregoing trigger condition or trigger occasion, the window display module of the framework layer 401 may detect that the display status of the application at the application layer 400 changes.

For example, in this embodiment of this application, a principle of "the window display module detects that the display status of the application at the application layer 400 changes" in step b is described herein by using an example in which the mobile phone switches from the non-immersive display state to the immersive display state. Specifically, as shown in FIG. 12, step b may include step b-1, step b-2, and step b-3.

Step b-1: The application of the application layer 400 requests the immersive display state from the window display module of the framework layer 401.

In a process in which the mobile phone projects a screen to the tablet computer, when the mobile phone meets the foregoing trigger condition or trigger occasion, the application at the application layer 400 may request the immersive display state from the window display module.

Step b-2: After receiving the request of the application, the window display module sends a hiding instruction to a system UI of the application layer 400.

The hiding instruction indicates the system UI to hide a navigation bar and a status bar.

Step b-3: After receiving the hiding instruction, the system UI hides the navigation bar and status bar.

After the navigation bar and the status bar are hidden by the system UI, the mobile phone may enter the immersive display state, that is, the mobile phone switches from the non-immersive display state to the immersive display state.

Step c: The window display module notifies the immersive state collection module: current display state of the system UI (for example, the immersive display state).

After the window display module sends the hiding instruction to the system UI, or when the window display module sends the hiding instruction to the system UI, the window display module may alternatively perform step c. In this way, the immersive state collection module may learn of the current display state of the system UI in time. For example, the system UI is hidden, and the mobile phone enters the immersive display state.

In some other embodiments, the mobile phone may alternatively switch from the immersive display state to the non-immersive display state. In this embodiment, step b-1 may be replaced with "the application of the application layer 400 requests a non-immersive display state from the window display module of the framework layer 401". The foregoing step b-2 may be replaced with "after receiving the request of the application, the window display module sends, to the system UI of the application layer 400, an instruction (referred to as a display instruction) for not hiding the navigation bar and the status bar." The display instruction indicates the system UI to display the navigation bar and the status bar, that is, not to hide the navigation bar and the status bar. The foregoing step b-3 may be replaced with "After receiving the display instruction, the system UI displays the navigation bar and the status bar, that is, does not hide the navigation bar and the status bar".

In conclusion, after step c, the immersive state collection module may collect the immersive status data of the mobile phone. The immersive status data indicates that the mobile phone is in the immersive display state or the non-immersive display state.

(3) Remote-Local Status Data Transmission Procedure

After collecting the immersive status data of the mobile phone, the mobile phone may transmit the immersive status data of the mobile phone to the tablet computer.

Figure 13A:
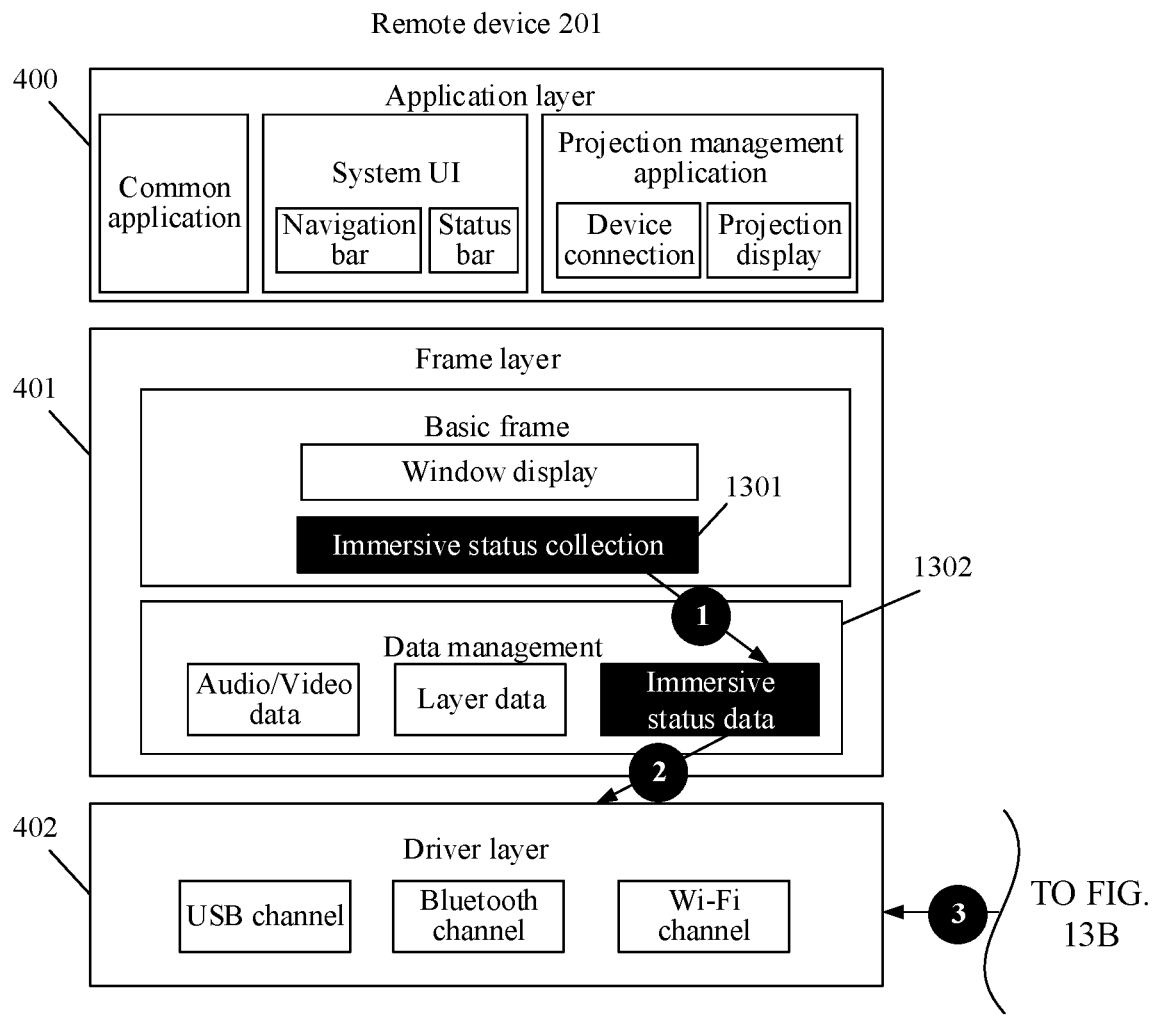
FIG. 13A and FIG. 13B are a schematic flowchart of "remote-local status data transmission" according to an embodiment of this application.
Figure 13B:
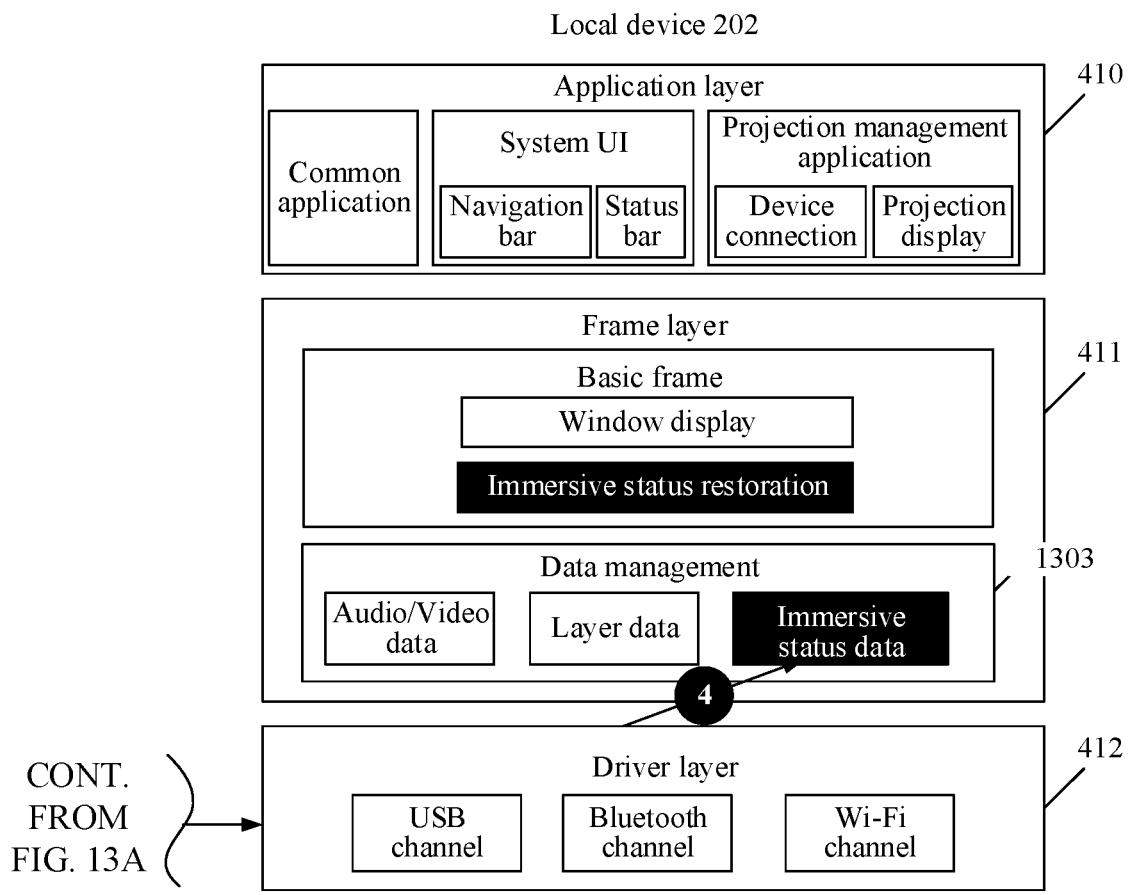

In this embodiment of this application, with reference to the software architecture shown in FIG. 4A and FIG. 4B, a specific manner of transmitting the immersive status data by the mobile phone to the tablet computer is described herein by using an example. For example, as shown in FIG. 13A and FIG. 13B, a mobile phone may perform the following step 1 to step 4, to implement the foregoing (3) "Remote-local status data transmission" procedure.

Step 1: An immersive state collection module 1301 of the mobile phone sends collected immersive status data to a data management module 1302.

After receiving the immersive status data, the data management module 1302 may convert the immersive status data into an immersive data structure. The data structure may include at least: an immersive event identifier tag_immersive; and an immersive event value_immersive.

The immersive event identifier tag_immersive may be used to indicate a function or role of the immersive data structure. Specifically, the immersive event identifier tag_immersive may indicate that the immersive data structure is used to indicate a status of the mobile phone. The immersive event value_immersive may be any one of the following events: (1) An event 1 indicating that the mobile phone is in the non-immersive display state in a projection process (namely, the event 1 shown in FIG. 6A), where the event 1 is used to indicate, to the tablet computer, that "the mobile phone is in the non-immersive display state". (2) An event 2 indicating that the mobile phone is in the immersive display state in a projection process (namely, the event 2 shown in FIG. 6A), where the event 2 is used to indicate, to the tablet computer, that "the mobile phone is in the immersive display state".

Step 2: A driver layer 402 encapsulates the foregoing immersive data structure into a projection transmission protocol between the mobile phone and the tablet computer.

In one case, a wireless connection is established between the mobile phone and the tablet computer. In this case, the projection transmission protocol is a wireless projection transmission protocol. For example, the wireless projection transmission protocol may be a Huawei cast+protocol. Certainly, the wireless projection transmission protocol may alternatively be any protocol such as a Miracast protocol, an AirPlay protocol, or a Digital Living Network Alliance (DIGITAL LIVING NETWORK ALLIANCE, DLNA) protocol.

In another case, a wired connection is established between the mobile phone and the tablet computer. In this case, the projection transmission protocol is a wired projection transmission protocol.

For example, when the foregoing wired connection is a USB connection, the mobile phone and the tablet computer may establish a connection by using a remote network driver interface specification (Rndis). The wired projection transmission protocol may be a Huawei cast+protocol. Certainly, the wired projection transmission protocol may also be any protocol such as a Miracast protocol or an HDMI protocol.

It should be noted that, because a data volume of the foregoing immersive status data (namely, the immersive data structure) is small, it may be encapsulated into any protocol such as Huawei cast+protocol and mirrocast protocol for transmission, or may be encapsulated into another user-defined transmission protocol for independent transmission. A projection transmission protocol used to transmit the immersive status data is not limited in this embodiment of this application.

Step 3: The driver layer 402 transmits the immersive data structure to the tablet computer by using the connection established between the mobile phone and the tablet computer.

For example, the mobile phone may transmit the immersive status data of the mobile phone to the tablet computer by using the connection (for example, the wired connection or the wireless connection) established between the mobile phone and the tablet computer. For example, the wired connection may be a USB connection, and the wireless connection may be any connection such as a Bluetooth connection or a Wi-Fi connection. The USB connection may correspond to a USB channel shown in FIG. 13A and FIG. 13B, the Bluetooth connection may correspond to a Bluetooth channel shown in FIG. 13A and FIG. 13B, and the Wi-Fi connection may correspond to a Wi-Fi channel shown in FIG. 13A and FIG. 13B.

Step 4: After the tablet computer receives the immersive data structure, a driver layer 412 sends the immersive data structure to the data management module 1303.

(4) "Status Synchronization of the Local Device" Procedure

After receiving the immersive status data (for example, the immersive data structure) from the mobile phone (for example, the remote device 201), the tablet computer (that is, the local device 202) may adjust a status of the tablet computer according to the immersive status data, so that the status of the tablet computer is consistent with a state indicated by the immersive status data.

For example, as shown in FIG. 8A, in a process of projecting a screen from the mobile phone to the tablet computer, the mobile phone is in the non-immersive display state, and the tablet computer (for example, a projection window 802 of the tablet computer) is also in the non-immersive display state. The tablet computer is in the same state as the mobile phone.

With reference to the foregoing implementation (1), after the mobile phone switches from the portrait mode shown in FIG. 8A to the landscape mode shown in FIG. 8B, the mobile phone may switch from the non-immersive display state shown in FIG. 8A to the immersive display state shown in FIG. 8B, and executes the foregoing (2) "Remote device status collection" procedure to collect immersive status data 2 of the mobile phone. The immersive status data 2 indicates that the mobile phone is in the immersive display state. Then, the mobile phone may perform (3) "Remote-local status data transmission" procedure. As shown in FIG. 8B, the mobile phone may transmit the immersive status data 2 to the tablet computer. Finally, after receiving the immersive status data 2, the tablet computer may perform "Status synchronization of the local device" procedure, to switch from the non-immersive display state shown in FIG. 8A to the immersive display state shown in FIG. 8B. As shown in FIG. 8B, both the tablet computer and the mobile phone are in the immersive display state, and the tablet computer is in the same state as the mobile phone.

For another example, with reference to the foregoing implementation (1), after the mobile phone switches from the landscape mode shown in FIG. 8B to the portrait mode shown in FIG. 8A, the mobile phone may switch from the immersive display state shown in FIG. 8B to the non-immersive display state shown in FIG. 8A, and executes the foregoing (2) "Remote device status collection" procedure to collect immersive status data 1 of the mobile phone. The immersive status data 1 indicates that the mobile phone is in the non-immersive display state. Then, the mobile phone may perform (3) "Remote-local status data transmission" procedure. As shown in FIG. 8A, the mobile phone may transmit the immersive status data 1 to the tablet computer. Finally, after receiving the immersive status data 1, the tablet computer may perform "Status synchronization of the local device" procedure, to switch from the immersive display state shown in FIG. 8B to the non-immersive display state shown in FIG. 8A. As shown in FIG. 8A, both the tablet computer and the mobile phone are in the non-immersive display state, and the tablet computer is in the same state as the mobile phone.

For another example, the mobile phone may receive the tapping operation (namely, the first preset operation) performed by the user on the "extended" button 801 shown in FIG. 8A. With reference to the foregoing implementation (2), in response to the tapping operation performed by the user on the "extended" button 801, the mobile phone may switch from the non-immersive display state shown in FIG. 8A to the immersive display state shown in FIG. 9A, and executes the foregoing (2) "Remote device status collection" procedure to collect immersive status data 2 of the mobile phone. The immersive status data 2 indicates that the mobile phone is in the immersive display state. Then, the mobile phone may perform (3) "Remote-local status data transmission" procedure. As shown in FIG. 9A, the mobile phone may transmit the immersive status data 2 to the tablet computer. Finally, after receiving the immersive status data 2, the tablet computer may perform "Status synchronization of the local device" procedure, to switch from the non-immersive display state shown in FIG. 8A to the immersive display state shown in FIG. 9A. As shown in FIG. 9A, both the tablet computer and the mobile phone are in the immersive display state, and the tablet computer is in the same state as the mobile phone.

It should be noted that, the reason why the mobile phone switches from the non-immersive display state shown in FIG. 8A to the immersive display state shown in FIG. 9A is as follows: The mobile phone receives the first preset operation instead of switching from the portrait mode to the landscape mode. In other words, the mobile phone may be triggered to switch from the non-immersive display state to the immersive display state, or to switch from the immersive display state to the non-immersive display state when the mobile phone performs landscape/portrait mode switching and receives the first preset operation. If the mobile phone performs landscape/portrait mode switching and the mobile phone receives the first preset operation, the mobile phone may be triggered to perform the foregoing (2) "Remote device status collection" procedure.

For another example, as shown in FIG. 10A, in a process of projecting a screen from the mobile phone to the tablet computer, the mobile phone is in the immersive display state, and the tablet computer is also in the immersive display state. The tablet computer is in the same state as the mobile phone.

With reference to the foregoing implementation (2), the mobile phone may receive the tapping operation performed by the user on the "Answer" button 1002 shown in FIG. 10A. In response to the tapping operation performed by the user on the "Answer" button 1002 shown in FIG. 10A, the mobile phone may switch from the immersive display state shown in FIG. 10A to the non-immersive display state shown in FIG. 10B, and perform the foregoing (2) "Remote device status collection" procedure, and collect the immersive status data 1 of the mobile phone.

Alternatively, with reference to the foregoing implementation (3), in response to the tapping operation performed by the user on the "Answer" button 1002 shown in FIG. 10A, a display interface of the mobile phone is switched from the UI interface of the video application shown in FIG. 10A to the call interface shown in FIG. 10B. In response to interface switching of the mobile phone, the mobile phone may perform the foregoing (2) "Remote device status collection" procedure to collect the immersive status data 1 of the mobile phone.

Then, the mobile phone may perform (3) "Remote-local status data transmission" procedure. As shown in FIG. 10B, the mobile phone may transmit the immersive status data 1 to the tablet computer. Finally, after receiving the immersive status data 1, the tablet computer may perform "Status synchronization of the local device" procedure, to switch from the immersive display state shown in FIG. 10A to the non-immersive display state shown in FIG. 10B. As shown in FIG. 10B, a projection window 1007 displayed on the tablet computer includes a title bar, a navigation bar, and a status bar, and the projection window 1007 is in the non-immersive display state. In conclusion, as shown in FIG. 10B, both the tablet computer and the mobile phone are in the non-immersive display state, and the tablet computer is in the same state as the mobile phone.

For another example, with reference to the foregoing implementation (2), the mobile phone may receive the tapping operation performed by the user on the "Hang up" button 1006 shown in FIG. 10B. In response to the tapping operation performed by the user on the "Hang up" button 1006 shown in FIG. 10B, the mobile phone may switch from the non-immersive display state shown in FIG. 10B to the immersive display state shown in FIG. 8B, perform the foregoing (2) "Remote device status collection" procedure, and collect the immersive status data 2 of the mobile phone.

Alternatively, with reference to the foregoing implementation (3), in response to the tapping operation performed by the user on the "Hang up" button 1006 shown in FIG. 10B, the display interface of the mobile phone is switched from the call interface 1005 shown in FIG. 10B to the UI interface of the video application shown in FIG. 8B. In response to interface switching of the mobile phone, the mobile phone may perform the foregoing (2) "Remote device status collection" procedure to collect the immersive status data 2 of the mobile phone.

Then, the mobile phone may perform (3) "Remote-local status data transmission" procedure. As shown in FIG. 8B, the mobile phone may transmit the immersive status data 2 to the tablet computer. Finally, after receiving the immersive status data 2, the tablet computer may perform "Status synchronization of the local device" procedure, to switch from the non-immersive display state shown in FIG. 10B to the immersive display state shown in FIG. 8B. As shown in FIG. 8B, both the tablet computer and the mobile phone are in the immersive display state, and the tablet computer is in the same state as the mobile phone.

For another example, as shown in FIG. 11A, in a process of projecting a screen from the mobile phone to the tablet computer, the mobile phone is in the immersive display state, and the tablet computer is also in the immersive display state. The tablet computer is in the same state as the mobile phone.

With reference to the foregoing implementation (2), the mobile phone may receive a tapping operation performed by the user on a new message notification 1101 shown in FIG. 11A. In response to the tapping operation performed by the user on the new message notification 1101 shown in FIG. 11A, the mobile phone may switch from the immersive display state shown in FIG. 11A to the non-immersive display state shown in FIG. 11B, perform the foregoing (2) "Remote device status collection" procedure, and collect the immersive status data 1 of the mobile phone.

Alternatively, with reference to the foregoing implementation (3), in response to the tapping operation performed by the user on the new message notification 1101 shown in FIG. 11A, the display interface of the mobile phone is switched from the UI interface of the video application shown in FIG. 11A to a chat interface 1104 shown in FIG. 11B. In response to interface switching of the mobile phone, the mobile phone may perform the foregoing (2) "Remote device status collection" procedure to collect the immersive status data 1 of the mobile phone.

Then, the mobile phone may perform (3) "Remote-local status data transmission" procedure. As shown in FIG. 11B, the mobile phone may transmit the immersive status data 1 to the tablet computer. Finally, after receiving the immersive status data 1, the tablet computer may perform "Status synchronization of the local device" procedure, to switch from the immersive display state shown in FIG. 11A to the non-immersive display state shown in FIG. 11B. As shown in FIG. 11B, a projection window 1106 displayed on the tablet computer includes a title bar, a navigation bar, and a status bar, and the projection window 1106 is in the non-immersive display state. In conclusion, as shown in FIG. 11B, both the tablet computer and the mobile phone are in the immersive display state, and states of the tablet computer and the mobile phone are consistent.

For another example, with reference to the foregoing implementation (2), the mobile phone may receive the tapping operation performed by the user on the "Return to video" button 1105 shown in FIG. 11B. In response to the tapping operation performed by the user on the "Return to video" button 1105 shown in FIG. 10B, the mobile phone may switch from the non-immersive display state shown in FIG. 11B to the immersive display state shown in FIG. 8B, perform the foregoing (2) "Remote device status collection" procedure, and collect the immersive status data 2 of the mobile phone.

Alternatively, with reference to the foregoing implementation (3), in response to the tapping operation performed by the user on the "Return to video" button 1105 shown in FIG. 11B, the display interface of the mobile phone is switched from the chat interface 1104 shown in FIG. 11B to the UI interface of the video application shown in FIG. 8B. In response to interface switching of the mobile phone, the mobile phone may perform the foregoing (2) "Remote device status collection" procedure to collect the immersive status data 2 of the mobile phone.

Then, the mobile phone may perform (3) "Remote-local status data transmission" procedure. As shown in FIG. 8B, the mobile phone may transmit the immersive status data 2 to the tablet computer. Finally, after receiving the immersive status data 2, the tablet computer may perform "Status synchronization of the local device" procedure, to switch from the non-immersive display state shown in FIG. 11B to the immersive display state shown in FIG. 8B. As shown in FIG. 8B, both the tablet computer and the mobile phone are in the immersive display state, and states of the tablet computer and the mobile phone are consistent.

Figure 14:
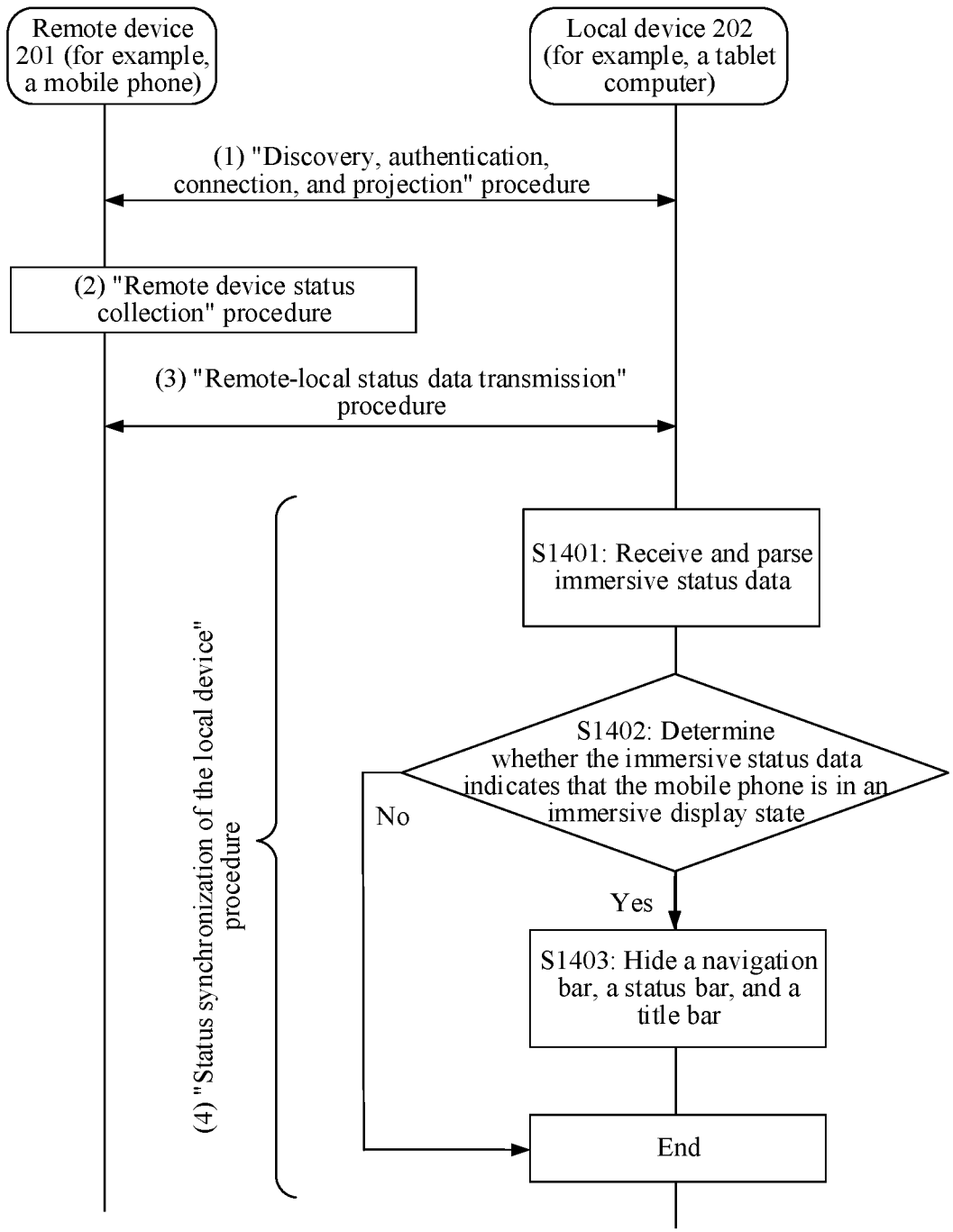
FIG. 14 is a flowchart of another projection display method according to an embodiment of this application.

For example, as shown in FIG. 14, the foregoing (4) "Status synchronization of the local device" procedure may include the following steps: S1401-S1403

S1401: A tablet computer receives and parses immersive status data.

It can be learned from the foregoing embodiment that: The immersive status data transmitted by the mobile phone to the tablet computer is specifically an immersive data structure. The data structure may include at least: an immersive event identifier tag_immersive and an immersive event value_immersive. Therefore, the tablet computer parses the immersive status data (that is, the immersive data structure) to obtain the immersive event identifier tag_immersive and the immersive event value_immersive. The immersive event identifier tag_immersive may be referred to as an event identifier for short. The immersive event value_immersive may include a first event and a second event.

The immersive event identifier tag_immersive may be used to indicate a function or role of the immersive data structure. Specifically, the immersive event identifier tag_immersive may indicate that the immersive data structure is used to indicate a status of the mobile phone. Therefore, the tablet computer may determine, based on the immersive event identifier tag_immersive obtained through parsing, that the immersive event value_immersive indicates the status of the mobile phone.

The immersive event value_immersive may be any one of the following events: (1) A second event, that is, an event 1 in a non-immersive display state in a projection process of the mobile phone (that is, the event 1 shown in FIG. 6A). (2) The first event is an event 2 (that is, the event 2 shown in FIG. 6B) in which the mobile phone is in an immersive display state in a projection process. The event 1 is used to indicate, to the tablet computer, that "the mobile phone is in the non-immersive display state", and the event 2 is used to indicate, to the tablet computer, that "the mobile phone is in the immersive display state". Therefore, the tablet computer may perform S1402 to determine, according to the immersive event value_immersive obtained through parsing, whether the mobile phone is in the immersive display state or the non-immersive display state.

S1402: The tablet computer determines whether the immersive status data indicates that the mobile phone is in the immersive display state.

Specifically, if the immersive status data indicates that the mobile phone is in the immersive display state, the tablet computer performs S1403. If the immersive status data indicates that the mobile phone is in the non-immersive display state, (4) "Status synchronization of the local device" procedure ends.

S1403: The tablet computer hides the navigation bar, the status bar, and the title bar.

Figure 15:
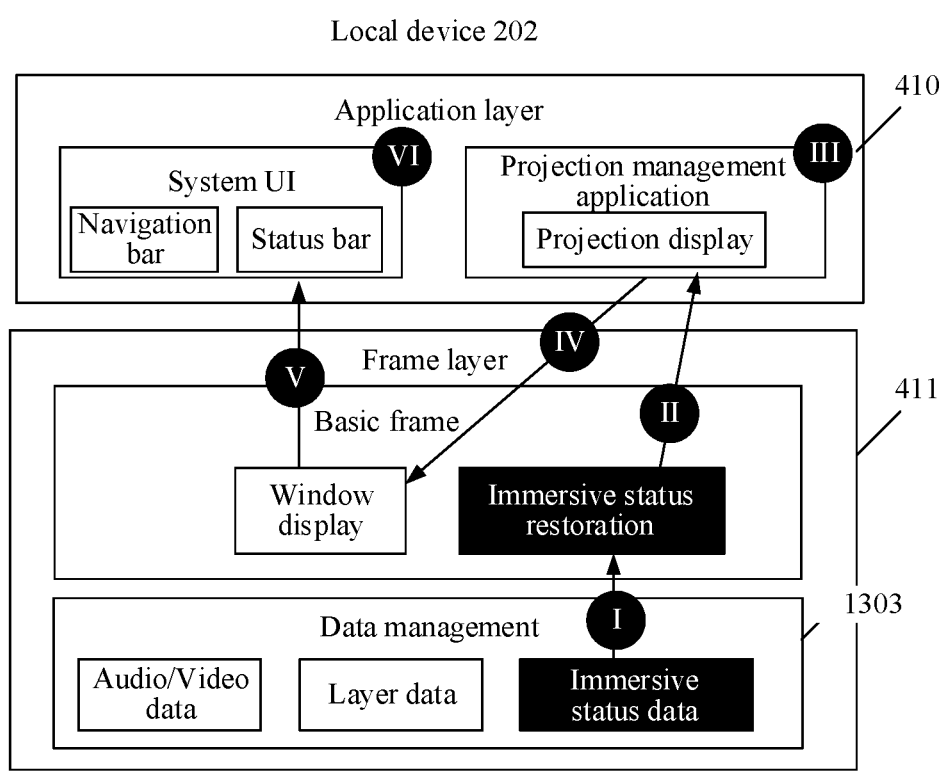
FIG. 15 is a schematic flowchart of "status synchronization of a local device" according to an embodiment of this application.

In this embodiment of this application, with reference to the software architecture shown in FIG. 4A and FIG. 4B, an example in which the immersive data structure indicates that the mobile phone is in the immersive state is used to describe a specific manner of performing status synchronization by the tablet computer. As shown in FIG. 15, a mobile phone may perform the following step I to step VI, to implement the foregoing (4) "Status synchronization of the local device" procedure.

Step I: After obtaining the immersive event identifier tag_immersive by parsing, a data management module 1302 sends the immersive data structure to an immersive state restoration module.

The immersive state restoration module may parse an immersive event value_immersive in the immersive data structure. When it is identified that the mobile phone is in the immersive display state, a projection management application (a projection application for short) may be controlled to hide the title bar. Specifically, after step I, you can perform step II.

Step II: The immersive state restoration module parses the immersive event value_immersive in the immersive data structure, identifies that the mobile phone is in the immersive display state, and sends an immersive instruction to the projection application.

The immersive instruction indicates the projection management application to hide the title bar. S1401 and S1402 may include step I and step II.

Step III: The projection management application hides the title bar.

Step IV: The projection management application requests an immersive display state from a window display module.

For example, the projection management application may send a hiding request to the window display module, to request the window display module to hide a status bar and a navigation bar.

Step V: The window display module sends a hiding instruction to a system UI. The hiding instruction indicates the system UI to hide the status bar and the navigation bar.

Step VI: The system UI hides the status bar and the navigation bar.

S1403 may include step III and step VI.

In the method provided in this embodiment of this application, in a process in which a remote device 201 (for example, a mobile phone) projects a screen to a local device 202 (for example, a tablet computer), the mobile phone may not only transmit projection data to the tablet computer, but also transmit immersive status data to the tablet computer. The immersive status data may indicate a status of the mobile phone, for example, an immersive display state or a non-immersive display state. In this way, the tablet computer may adjust a status of the tablet computer based on the immersive status data, to implement immersive display effect synchronization between the local device 202 and the remote device 201. In this way, when the mobile phone is in the "immersive display state", the tablet computer may also enter the "immersive display state", and display a projection interface of the mobile phone in an "immersive display" manner.

In some other embodiments, in a process of projecting a screen from the mobile phone to the tablet computer, when the mobile phone meets a trigger condition or a trigger occasion in any one of the foregoing implementations (1) to (4), the foregoing (2) "Remote device status collection" procedure, (3) "Remote-local status data transmission" procedure, and (4) "Status synchronization of the local device" procedure cannot be performed. Instead, the method in this embodiment of this application can be performed only after a preset function switch is started, when the foregoing trigger condition or trigger occasion is met. The preset function switch is used to trigger the mobile phone to start the preset function, that is, a function of synchronizing the immersive status data of the mobile phone to the tablet computer by the mobile phone.

For example, the mobile phone may start the foregoing preset function in any one of the following implementations, that is, a function of synchronizing the immersive status data of the mobile phone to the tablet computer by the mobile phone.

Implementation (a): The projection interface of the mobile phone may include the preset function switch. The preset function switch may be displayed in a switch control at a fixed position in the projection interface. Alternatively, the preset function switch may be a floating window, a floating button, or a floating icon displayed on the projection interface.

Figure 16:
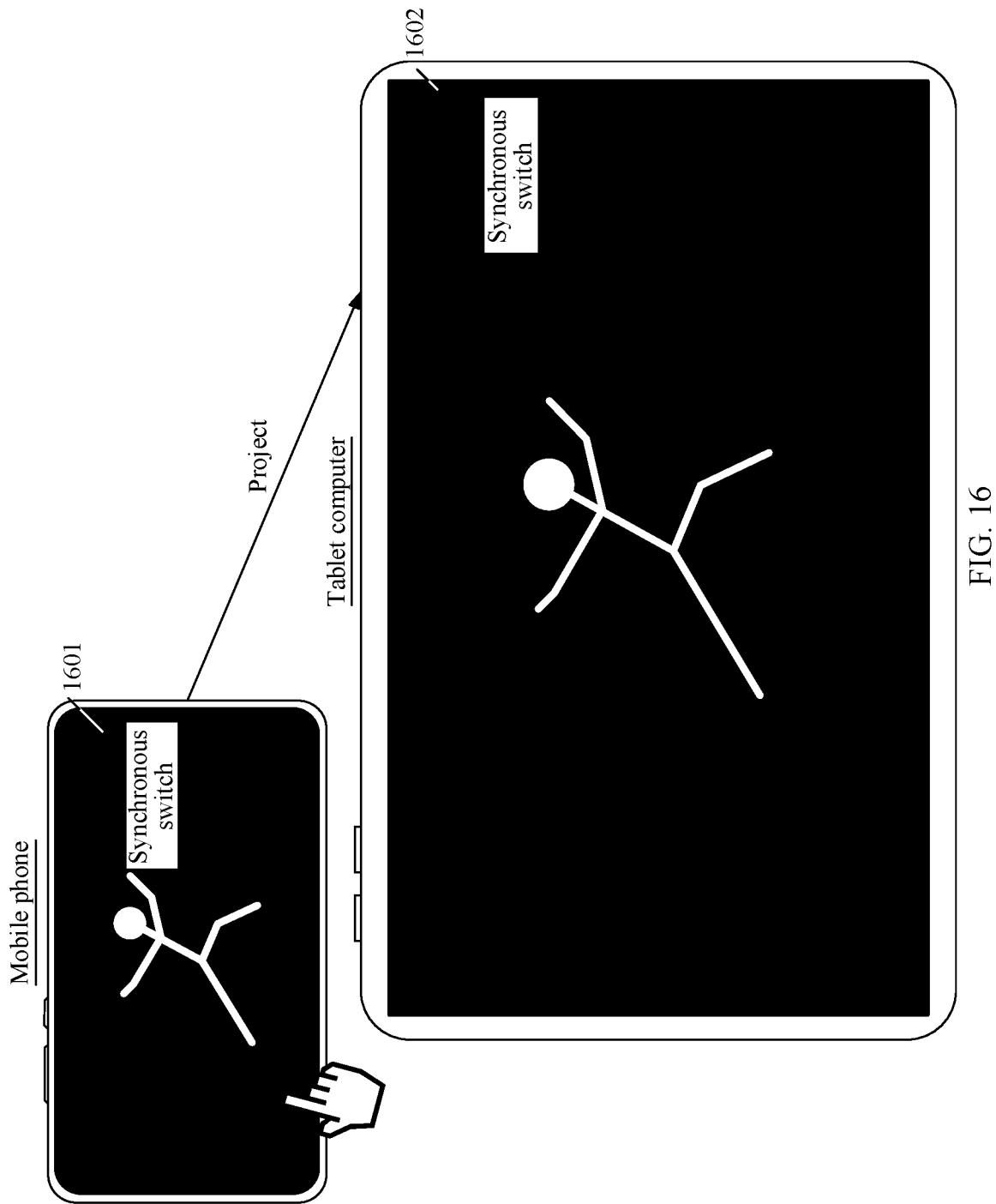
FIG. 16 is a schematic diagram of an interface of a preset function switch according to an embodiment of this application.

For example, as shown in FIG. 16, a projection interface of a mobile phone includes a preset function switch, for example, a "synchronous switch" 1601. In response to a turning-on operation of a user on the "synchronous switch" 1601, the mobile phone may start a preset function.

The preset function switch displayed on the projection interface of the mobile phone or the projection window of the tablet computer in a manner of the floating window, the floating button, or the floating icon may be translucent. In this way, visual interference caused by the preset function switch to the user can be reduced, and use experience of the user can be improved.

Implementation (b): A setting interface of the mobile phone may include the foregoing preset function switch. The mobile phone may receive a turning-on operation performed by the user on the preset function switch in the setting interface, and start the preset function.

Figure 17:
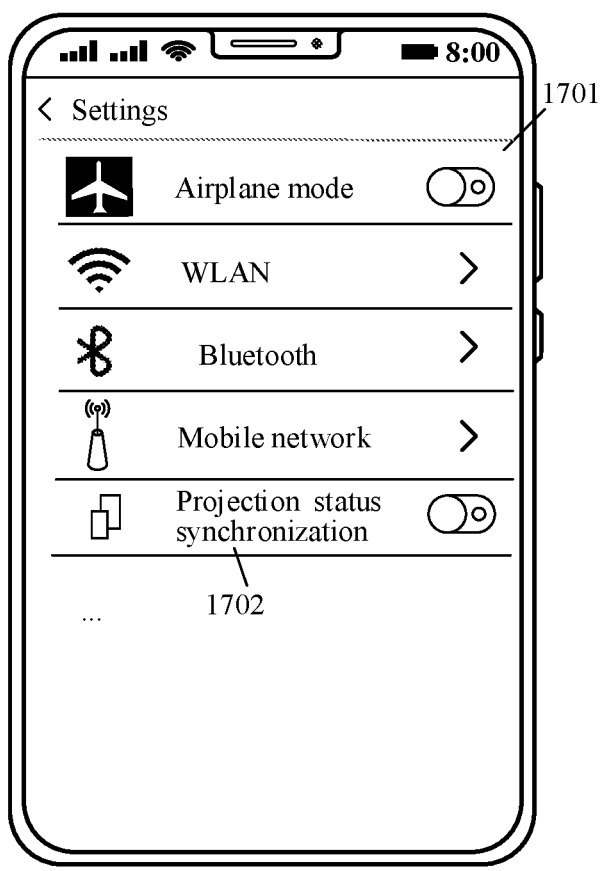
FIG. 17 is a schematic diagram of an interface of another preset function switch according to an embodiment of this application.

For example, as shown in FIG. 17, a setting interface 1701 of the mobile phone includes a preset function switch, for example, a "Projection status synchronization" switch 1702. In response to a turning-on operation of the user on the "Projection status synchronization" switch 1702, the mobile phone may start the preset function.

The setting interface 1701 shown in FIG. 17 further includes an "airplane mode" switch, a "WLAN" option, a "Bluetooth" option, a "mobile network" option, and the like of the mobile phone. For specific functions of these switches and options, refer to detailed descriptions of each switch and option on the setting interface in a conventional technology. Details are not described herein again.

Implementation (c): A notification bar of the mobile phone may include the foregoing preset function switch. The mobile phone starts the preset function in response to the operation of starting the preset function that is entered by the user on the notification bar of the mobile phone.

Figure 18:
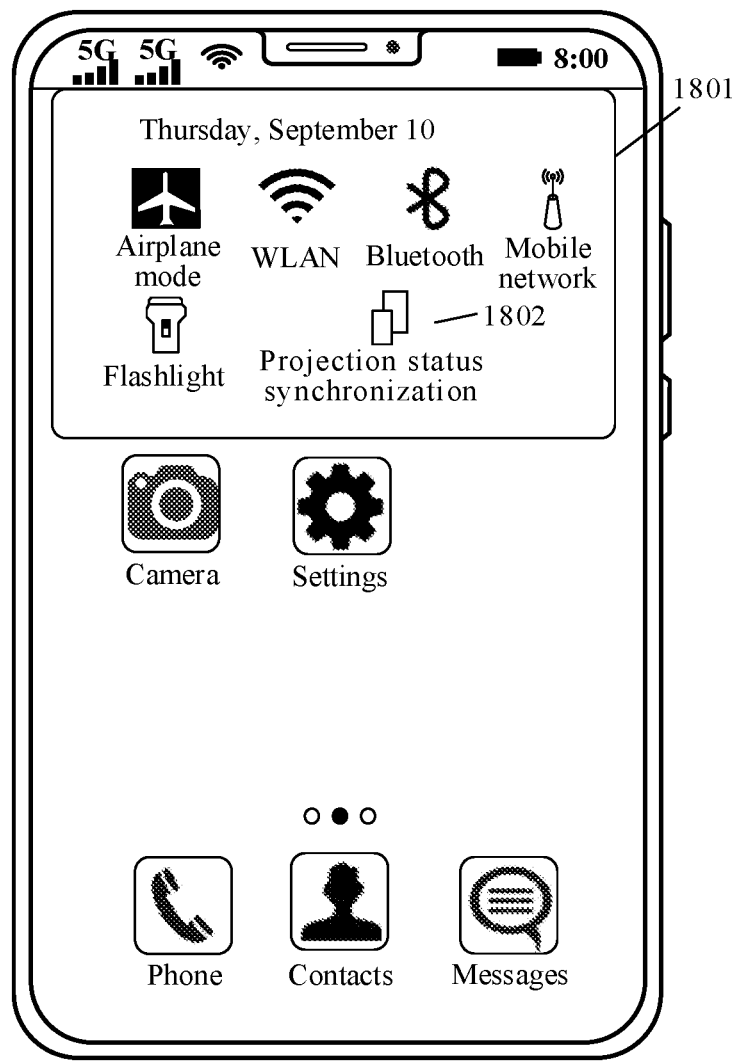
FIG. 18 is a schematic diagram of an interface of another preset function switch according to an embodiment of this application.

For example, the mobile phone may display a notification bar 1801 shown in FIG. 18 in response to a pull-down operation performed by the user on the top of a display (such as a touchscreen) of the mobile phone. The notification bar 1801 includes the preset function switch, for example, a "Projection status synchronization" switch 1802. In response to a turning-on operation of the user on the "Projection status synchronization" switch 1802, the mobile phone may start the preset function.

The notification bar 1801 shown in FIG. 18 further includes an "airplane mode" switch, a "WLAN" option, a "Bluetooth" option, a "mobile network" option, a "flashlight" switch, and the like of the mobile phone. For specific functions of these switches and options, refer to detailed descriptions of each switch and option on the notification bar in a conventional technology. Details are not described herein again.

It should be understood that after the mobile phone starts the preset function, when the mobile phone meets the trigger condition or trigger occasion in any one of the foregoing implementations (1) to (4), the foregoing (2) "Remote device status collection" procedure, (3) "Remote-local status data transmission" procedure, and (4) "Status synchronization of the local device" procedure can be performed.

Certainly, a projection window, a notification bar, and a setting interface of the tablet computer may also include the preset function switch. The preset function switch is used to trigger the mobile phone to start the preset function in a virtual display projection scenario (for example, a function of the mobile phone synchronizing the immersive status data of the mobile phone to the tablet computer). For a principle of starting the preset function of the mobile phone through interaction between the tablet computer and the mobile phone in the virtual display projection scenario, refer to the detailed descriptions in the following embodiment. Details are not described herein again.

In this embodiment, the mobile phone or the tablet computer may start the preset function of the mobile phone in any one of the foregoing implementation. In this way, when the mobile phone meets the trigger condition or the trigger occasion in this embodiment of this application, the mobile phone may perform the method in this embodiment of this application, to implement status synchronization between the tablet computer and the mobile phone.

It should be noted that, the foregoing embodiment describes a solution of implementing status synchronization between the tablet computer and the mobile phone in a process in which the mobile phone projects a screen to the tablet computer in a single window in a physical display projection scenario. In this embodiment of this application, the mobile phone may alternatively project a screen to the tablet computer in a plurality of windows (for example, dual windows). In a process in which the mobile phone projects a screen to the tablet computer by using the plurality of windows, status synchronization between the tablet computer and the mobile phone is implemented.

(1) That the mobile phone projects a screen to the tablet computer in a single window specifically refers to: In a process of projecting a screen from the mobile phone to the tablet computer, a display of the mobile phone displays only one window, and one interface of one application is displayed in the window. In addition, a projection window of the tablet computer also displays one interface of the application.

Figure 19A:
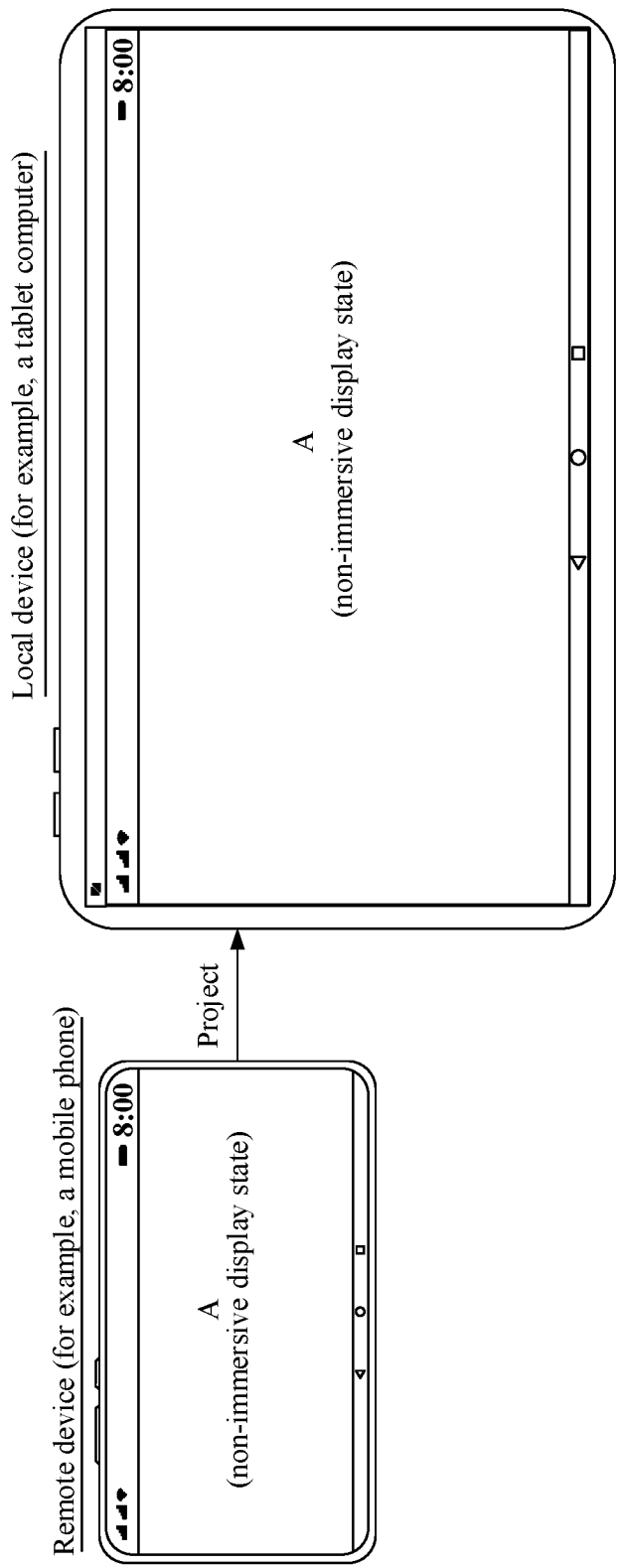
FIG. 19A and FIG. 19B are schematic diagrams of UI interfaces of a mobile phone and a tablet computer in a physical display projection scenario according to an embodiment of this application.
Figure 19B:
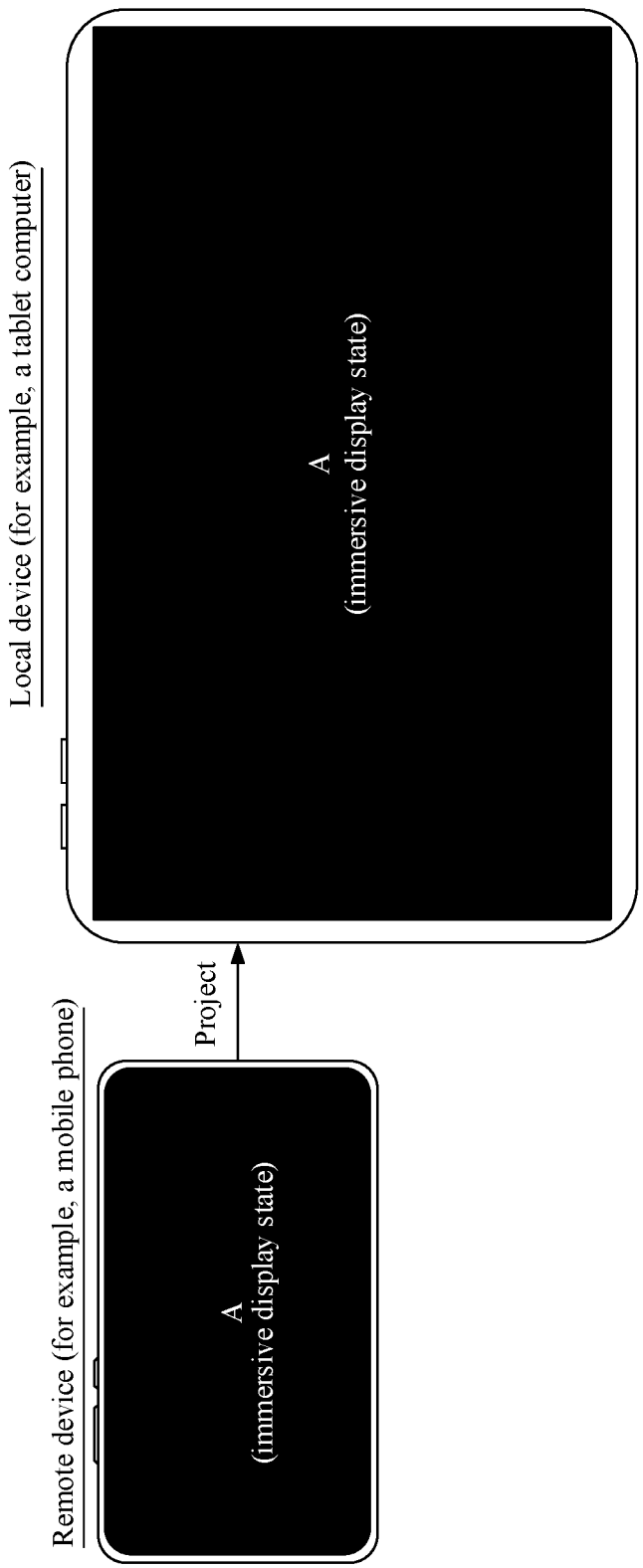

For example, as shown in FIG. 6A, the mobile phone displays a playback interface of a video application in the single window. A projection window 610 of the tablet computer displays a playback interface of the video application in the single window. For another example, as shown in FIG. 6B, the mobile phone displays a playback interface of a video application in the single window. A projection window 630 of the tablet computer displays a playback interface of the video application in the single window. For another example, as shown in FIG. 8A, the mobile phone displays a playback interface of a video application in the single window. A projection window 802 of the tablet computer displays a playback interface of the video application in the single window. For another example, as shown in FIG. 19A or FIG. 19B, the mobile phone displays a single window A. The tablet computer also displays the single window A. The window A is used to display an interface of an application, for example, an interface of a video application or an interface of a game application.

In this embodiment of this application, in a process in which the mobile phone projects a screen to the tablet computer in the single window, status synchronization between the tablet computer and the mobile phone can be implemented. For example, as shown in FIG. 19A, when the mobile phone is in a non-immersive display state, the tablet computer is also in the non-immersive display state. For another example, as shown in FIG. 19B, when the mobile phone is in an immersive display state, the tablet computer is also in the immersive display state.

(2) That the mobile phone projects a screen to the tablet computer in a plurality of windows specifically refers to: In a process in which the mobile phone projects a screen to the tablet computer, the mobile phone displays the plurality of windows on split screens, and the plurality of windows display a plurality of interfaces. Each window corresponds to one interface. The plurality of interfaces may be interfaces of a same application, or may be interfaces of different applications. In addition, a projection interface of the tablet computer may alternatively display the plurality of interfaces on split screens.

Figure 20A:
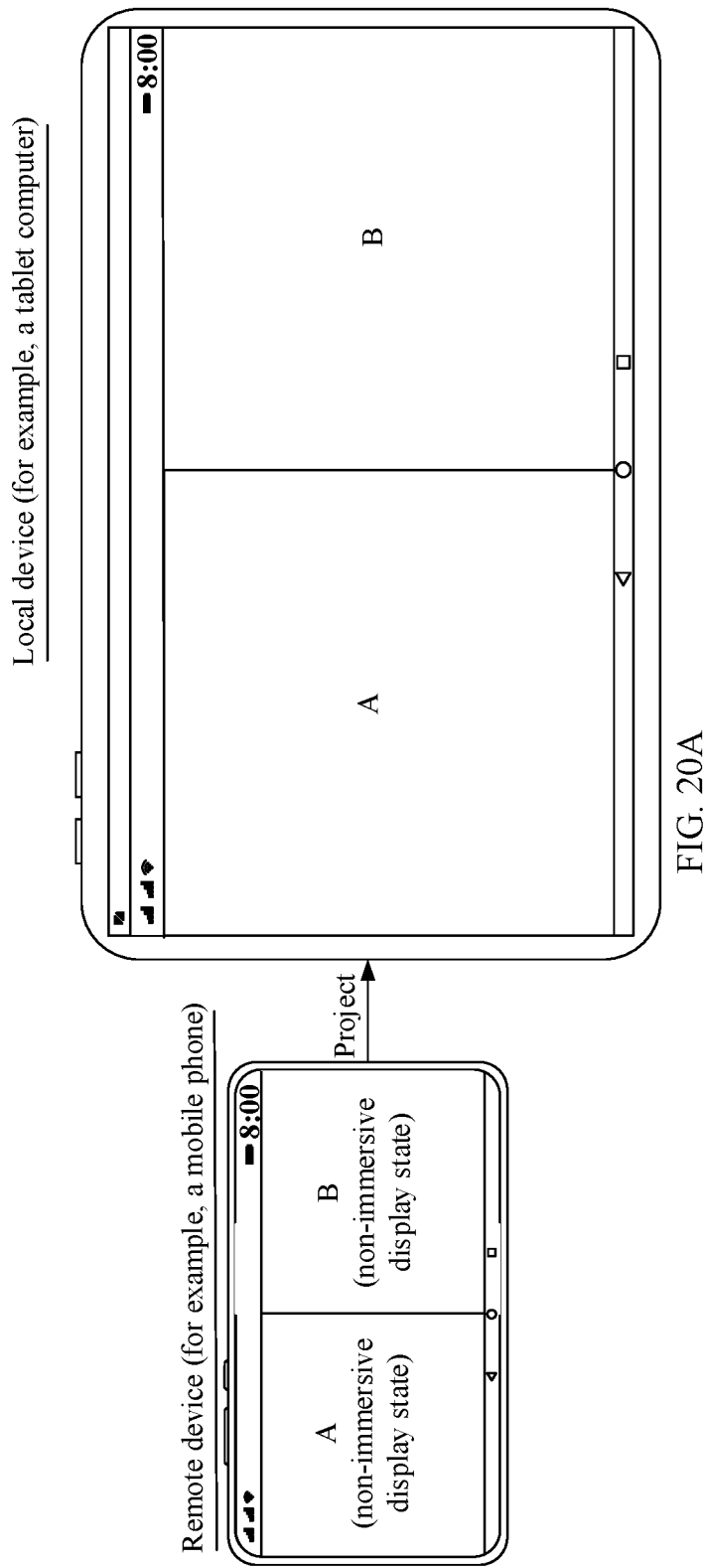
FIG. 20A to FIG. 20C are schematic diagrams of UI interfaces of a mobile phone and a tablet computer in a physical display projection scenario according to an embodiment of this application.
Figure 20B:
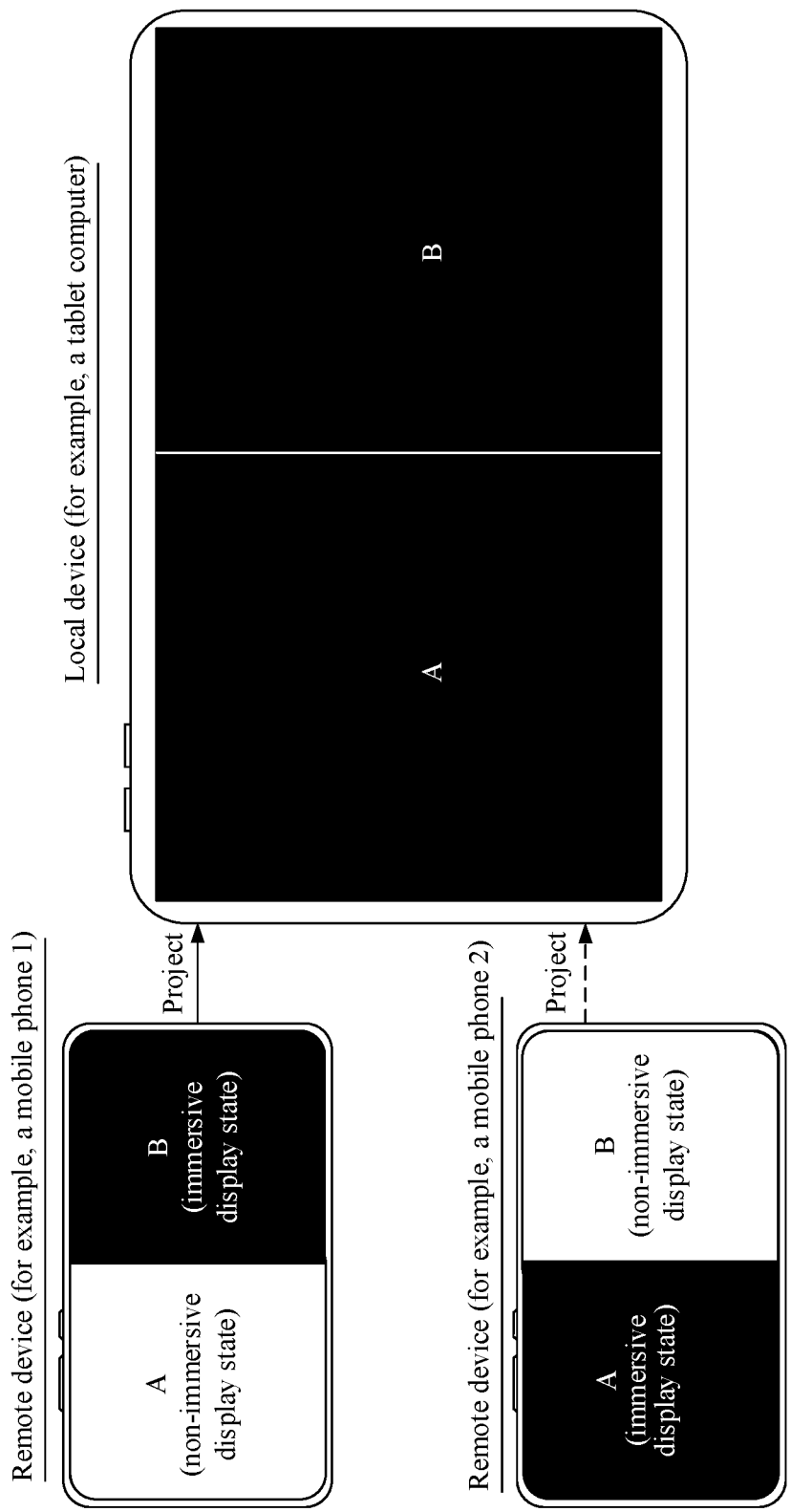
Figure 20C:
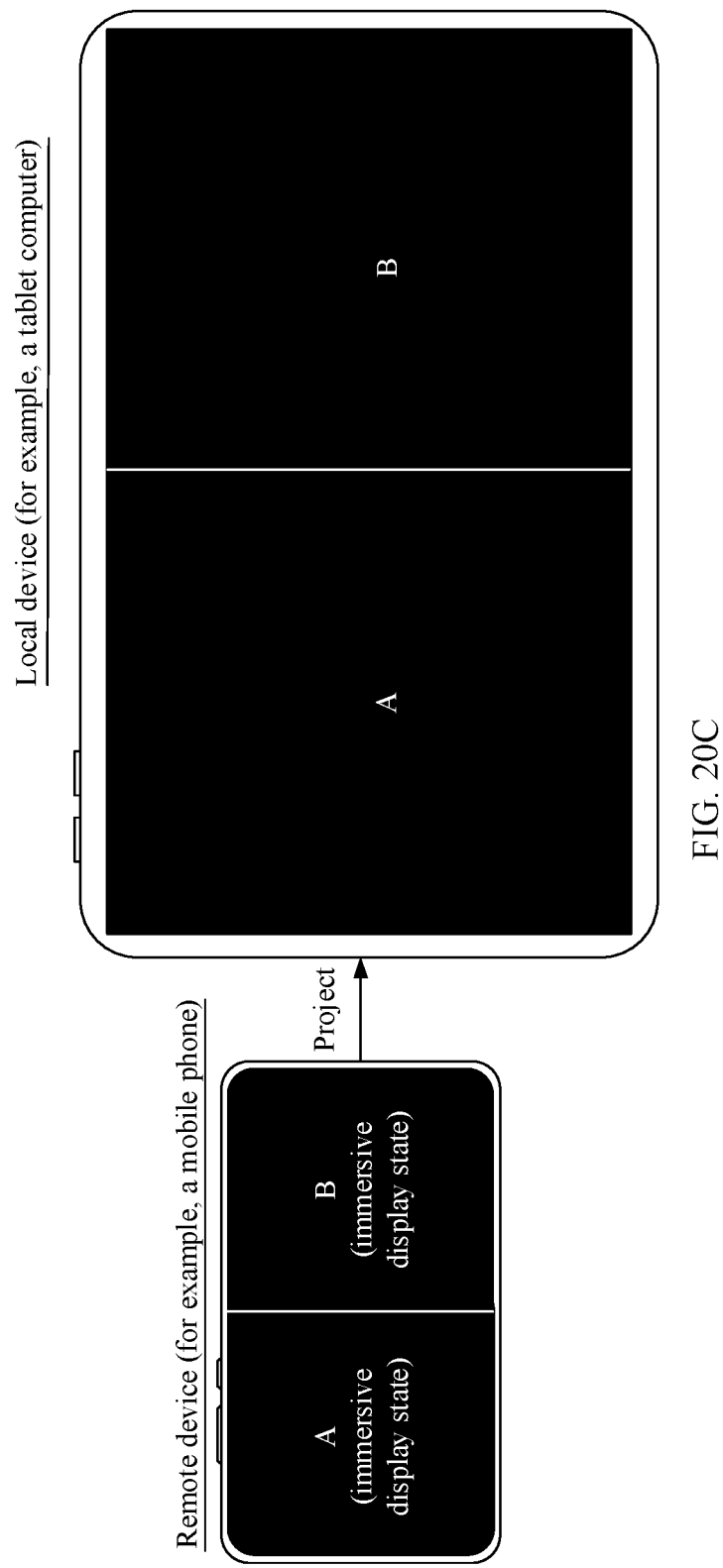

In the following embodiments, the method in this embodiment of this application is described by using an example in which the foregoing plurality of windows are dual windows. For example, as shown in FIG. 20A, FIG. 20B, or FIG. 20C, the mobile phone displays a window A and a window B. The tablet also displays the window A and the window B. The window A and the window B may be two windows of one application, or may be two windows of different applications. This is not limited in this embodiment of this application.

In the method provided in this embodiment of this application, in a process in which the mobile phone projects a screen to the tablet computer by using a plurality of windows, status of each window may be different or may be the same. For example, as shown in FIG. 20A, both the window A and the window B displayed on the mobile phone are in a non-immersive display state. As shown in FIG. 20C, both the window A and the window B displayed on the mobile phone are in an immersive display state. For another example, as shown in FIG. 20B, the window A displayed on a mobile phone 1 is in the non-immersive state, and the window B is in the immersive display state. The window A displayed on a mobile phone 2 is in the immersive display state, and the window B is in the non-immersive display state.

Regardless of whether the window A and the window B of the mobile phone are in the immersive display state or the non-immersive display state, status synchronization between the tablet computer and the mobile phone can be implemented by using the method in this embodiment of this application. In the following embodiment, a specific method for implementing status synchronization between the tablet computer and the mobile phone in a process of projection from the mobile phone to the tablet computer in dual windows is described.

The mobile phone may collect immersive status data A of the window A, and collect immersive status data B of the window B. Then, the mobile phone may transmit the immersive status data A and the immersive status data B to the tablet computer. For a method for collecting and transmitting the immersive status data of each window by the mobile phone to the tablet computer, refer to the method for collecting and transmitting the immersive status data of a single window to the tablet computer by the mobile phone in a projection process in a single window. Details are not described herein in this embodiment of this application.

After receiving the immersive status data A and the immersive status data B, the tablet computer may adjust a status of the tablet computer based on the immersive status data A and the immersive status data B, to implement status synchronization (that is, immersive display effect synchronization) between the tablet computer and the mobile phone. For example, the window A and the window B are displayed on split screens, and the window A and the window B that are displayed on split screens are projected to the tablet computer.

In one case, if the mobile phone displays the window A and the window B in a "non-immersive display" manner, that is, both the window A and the window B are in the non-immersive display state, the tablet computer may display, in the "non-immersive display" manner, the window A and the window B projected by the mobile phone.

Specifically, the mobile phone may display first content and third content in two windows of a first interface on split screens. For example, the window A displays the first content, and the window B displays the third content. If the immersive status data A indicates that the window A of the mobile phone is in the non-immersive display state (for example, the window A includes a status bar and/or a navigation bar), and the immersive status data B indicates that the window B of the mobile phone is in the non-immersive display state (for example, the window B includes the status bar and/or the navigation bar), the tablet computer may display the window A and the window B on split screens in the "non-immersive display" manner. For example, as shown in FIG. 20A, both the window A and the window B of the mobile phone are in the non-immersive display state, and the tablet computer displays the window A and the window B on split screens in a first projection window in the "non-immersive display" manner. The tablet computer displays the first content in the window A, and displays the third content in the window B.

In one case, if the mobile phone displays at least one of the window A and the window B in an "immersive display" manner, that is, at least one of the window A and the window B is in the immersive display state, the tablet computer may display the window A and the window B projected by the mobile phone in an "immersive display" manner.

Specifically, the mobile phone may display second content and fourth content in two windows of a second interface on split screens. For example, the window A displays the second content, and the window B displays the fourth content. If at least one of the window A and the window B of the mobile phone is in the immersive display state, the tablet computer may display the second content and the fourth content in two windows of a second projection window on split screens.

For example, if the immersive status data A indicates that the window A of the mobile phone is in the non-immersive display state, the immersive status data B indicates that the window B of the mobile phone is in the immersive display state; or the immersive status data A indicates that the window A of the mobile phone is in the immersive display state, and the immersive status data B indicates that the window B of the mobile phone is in the non-immersive display state, the tablet computer may display the window A and the window B on split screens in the "immersive display" manner. For example, as shown in FIG. 20B, both the window A and the window B of the mobile phone are in the immersive display state, and the tablet computer displays the window A and the window B on split screens in the "immersive display" manner.

For another example, if the immersive status data A indicates that the window A of the mobile phone is in the immersive display state, and the immersive status data B indicates that the window B of the mobile phone is in the immersive display state, the tablet computer may display the window A and the window B on split screens in the "immersive display" manner. For example, as shown in FIG. 20C, both the window A and the window B of the mobile phone are in the immersive display state, and the tablet computer displays the window A and the window B on split screens in the "immersive display" manner.

It should be noted that, FIG. 20B and FIG. 20C show the immersive display state and the non-immersive display state of a split-screen window (such as the window A or the window B) in a black-and-white filling manner. FIG. 20B and FIG. 20C do not show a presentation manner of a status bar and a navigation bar on a display of the mobile phone when the mobile phone displays a split-screen window in the "non-immersive display" manner. FIG. 20B and FIG. 20C also do not show a presentation manner of a status bar, a navigation bar, and a title bar on a display of a tablet computer when the tablet computer displays a split-screen window in the "non-immersive display" manner. For example, in a process of projecting a screen from a mobile phone to a tablet computer in a plurality of windows, the mobile phone displays the window A or the window B in "non-immersive display". In the non-immersive display state, the mobile phone may separately display the navigation bar and the status bar on both the window A and the window B. In other words, the display of the mobile phone may include two navigation bars and two status bars. Alternatively, in the non-immersive display state, the mobile phone may display only one navigation bar and one status bar. For example, the status bar may be displayed at a position near the top of the mobile phone above the window A and the window B. The navigation bar may be displayed near the rear of the phone below the window A and the window B.

In conclusion, refer to Table 1. Table 1 shows a mapping relationship between a window state and an immersive attribute of a remote device (for example, a mobile phone), and a mapping relationship between a window state and an immersive attribute of a local device (for example, a tablet computer).

TABLE 1

| Remote device (Such as a mobile phone) | | Local device (Such as a tablet computer) | |
| --- | --- | --- | --- |
| Window state | Window immersive attributes | Window state | System immersive attributes |
| Full Screen | Immersive | Full Screen | Immersive |
| Full Screen | Non-immersive | Full Screen | Non-immersive |
| Split screen | Window A Non-immersive | Window B Non-immersive | Split screen | Non-immersive |
| Split screen | Window A Immersive | Window B Immersive | Split screen | Immersive |
| Split screen | Window A Immersive | Window B Non-immersive | Split screen | Immersive |
| Split screen | Window A Non-immersive | Window B Immersive | Split screen | Immersive |

As shown in Table 1, when a window state of the mobile phone is full screen (that is, the mobile phone displays a single window in full screen), if the window immersive attribute of the single window is "immersive", a window state of the tablet computer is also full screen (that is, the tablet computer displays the foregoing single window in full screen), and a system immersive attribute of the tablet computer is also "immersive". That is, both the mobile phone and the tablet computer are in an immersive display state.

As shown in Table 1, when a window state of the mobile phone is full screen (that is, the mobile phone displays a single window in full screen), if the window immersive attribute of the single window is "non-immersive", a window state of the tablet computer is also full screen (that is, the tablet computer displays the foregoing single window in full screen), and a system immersive attribute of the tablet computer is also "non-immersive". That is, both the mobile phone and the tablet computer are in a non-immersive display state.

As shown in Table 1, a window state of the mobile phone is split-screen (For example, the mobile phone displays the window A and the window B on split screens), if window immersive attributes of both the window A and the window B are "non-immersive", a window state of the tablet computer is also split screen (that is, the tablet computer displays the window A and the window B on split screens), and a system immersive attribute of the tablet computer is also "non-immersive". That is, both the mobile phone and the tablet computer are in a non-immersive display state.

As shown in Table 1, a window state of the mobile phone is split-screen (For example, the mobile phone displays the window A and the window B on split screens), if a window immersive attribute of at least one of the window A and the window B are "immersive", a window state of the tablet computer is also split screen (that is, the tablet computer displays the window A and the window B in split screen), and a system immersive attribute of the tablet computer is also "immersive". That is, both the mobile phone and the tablet computer are in an immersive display state.

In this embodiment of this application, in a process in which the mobile phone projects a screen to the tablet computer in a single window or a plurality of windows, status synchronization between the tablet computer and the mobile phone can be implemented.

In the following embodiments, the method in this embodiment of this application is described with reference to a virtual display projection scenario. It can be learned from the description of the "virtual display projection scenario" in the foregoing embodiment that: In the virtual display projection scenario, content displayed on a projection window displayed by a local device (for example, a tablet computer) is different from content displayed on a display interface of a remote device (a mobile phone).

Specifically, the local device (for example, the mobile phone) may adapt to a screen size of the remote device (for example, the tablet computer), generate a virtual display, generate (for example, draw and render) new projection data based on the virtual display, and transmit the projection data to the tablet computer. However, a physical screen size of the mobile phone cannot adapt to the projection data generated based on the virtual display. Therefore, the mobile phone may not display the display content of the projection window of the tablet computer. In this case, the mobile phone may display a main interface, or the mobile phone may display any one of one or more applications that have recently run and are not closed.

In the virtual display projection scenario, the tablet computer may receive an operation performed by a user on the projection window. In response to the operation performed by the user on the projection window, the tablet computer may send a request instruction to the mobile phone. The request instruction is used to request the mobile phone to generate and transmit projection data corresponding to the operation to the tablet computer. After receiving the request instruction, the mobile phone may generate, based on the virtual display, the projection data corresponding to the operation, and transmit the projection data to the tablet computer. After receiving the projection data, the tablet computer may display a corresponding projection window. However, the display interface of the mobile phone may not change.

It should be noted that, in the virtual display projection scenario, the status synchronization between the tablet and the mobile phone specifically refers to: Display content of the virtual display generated when the mobile phone adapts to the screen size of the tablet computer is the same as the display content of the projection window of the tablet computer. However, the virtual display is invisible to the user.

Figure 21:
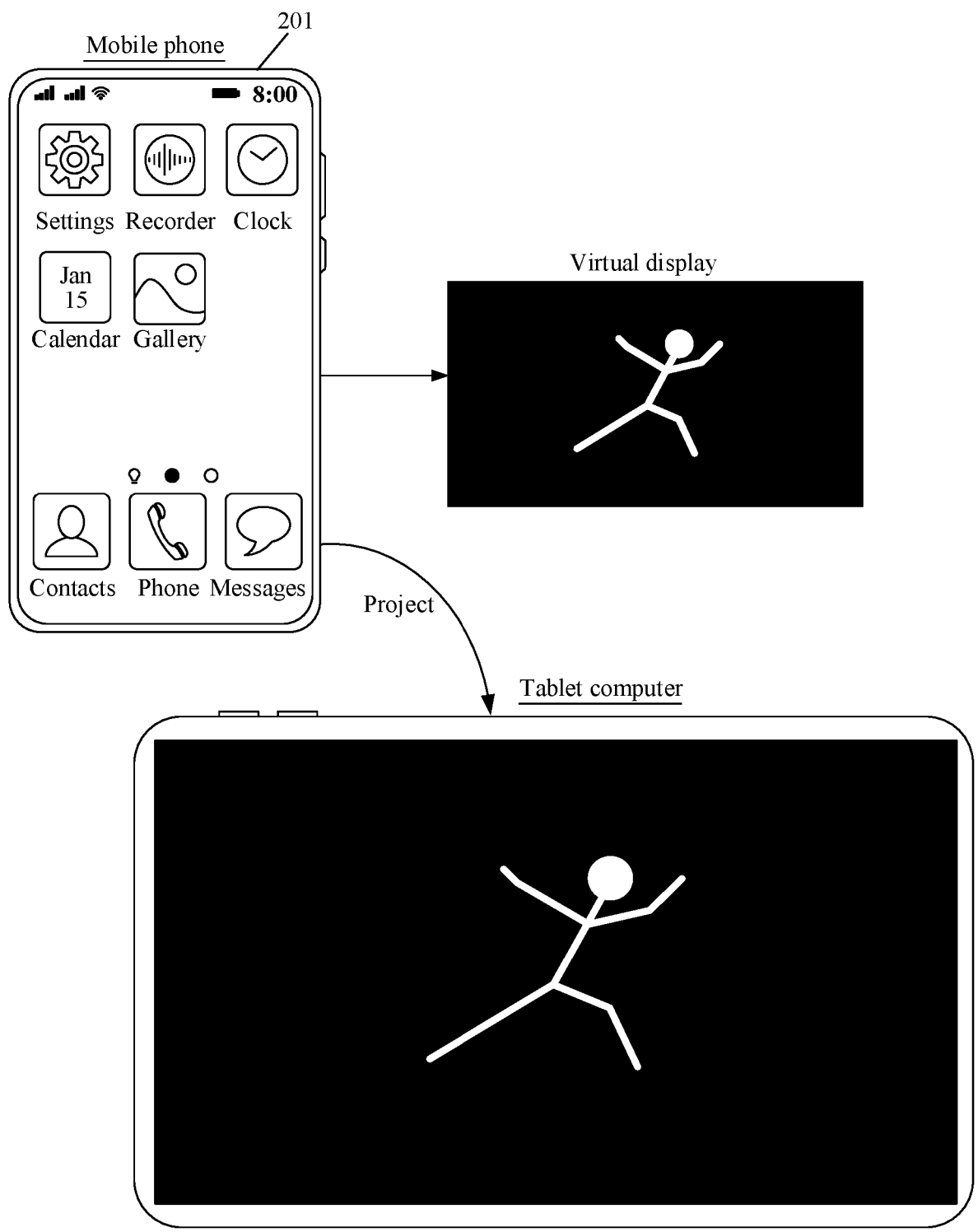
FIG. 21 is a schematic diagram of UI interfaces of a mobile phone and a tablet computer in a virtual display projection scenario according to an embodiment of this application.

For example, as shown in FIG. 8A, a UI interface of a video application displayed by the tablet computer includes an "extended" button 803. The "extended" button 803 is configured to trigger the tablet computer to display a video playback picture of the video application in full screen. The tablet computer may receive a tapping operation performed by the user on the "extended" button 803. In response to the tapping operation performed by the user on the "extended" button 803, the tablet computer may send a request instruction 1 to the mobile phone. After receiving the request instruction 1, the mobile phone may generate projection data 1 shown in the virtual display shown in FIG. 21, and transmit the projection data 1 to the tablet computer. After receiving the projection data 1, the tablet computer may display the projection window shown in FIG. 21. However, as shown in FIG. 21, the mobile phone still displays the main interface.

It should be noted that, in a physical display projection scenario, a remote device (such as a mobile phone) controls a local device (such as a tablet computer). However, in a virtual display projection scenario, the local device (such as the tablet computer) controls the remote device (such as the mobile phone). Therefore, the virtual display projection scenario may mean the following: In the physical display projection scenario, the local device (such as the tablet computer) reversely controls the remote device (such as the mobile phone).

In the virtual display projection scenario, the method in this embodiment of this application may also include the following steps: (1) "Discovery, authentication, connection, and projection" procedure; (2) "Remote device status collection" procedure; (3) "Remote-local status data transmission" procedure; (4) "Status synchronization of the local device" procedure In the virtual display projection scenario, the tablet computer may trigger the mobile phone to perform the foregoing (2) "Remote device status collection" procedure. Specifically, in a process of projecting a screen from a mobile phone to a tablet computer, that collecting a trigger condition or a trigger occasion of immersive status data of the mobile phone may include not only the foregoing implementation (1) to the implementation (4), but also an implementation (5).

Implementation (5):

After receiving a first message from the tablet computer, the mobile phone collects immersive status data of the virtual display.

In one aspect, when switching from a landscape mode to a portrait mode, the tablet computer may send a first message-1 to the mobile phone, where the first message-1 indicates the tablet computer to switch from the landscape mode to the portrait mode. After receiving the first message-1, the mobile phone may generate projection data in a non-immersive display state based on the virtual display, and the virtual display enters the non-immersive display state. The first message-1 is further used to trigger the mobile phone to collect immersive status data 1 of the virtual display. The immersive status data 1 indicates that the virtual display of the mobile phone is in the non-immersive display state.

In another aspect, when switching from the portrait mode to the landscape mode, the tablet computer sends a first message-2 to the mobile phone, where the first message-2 indicates the tablet computer to switch from the portrait mode to the landscape mode. After receiving the first message-2, the mobile phone may generate projection data in an immersive display state based on the virtual display, and the virtual display enters the immersive display state. The first message-2 is further used to trigger the mobile phone to collect immersive status data 2 of the virtual display. The immersive status data 2 indicates that the virtual display of the mobile phone is in the immersive display state.

In still another aspect, when receiving a second preset operation of the user, the tablet computer may send a preset message (for example, a first message-3) to the mobile phone. The first message-3 is used to trigger the mobile phone to generate, based on the virtual display, projection data corresponding to the second preset operation, and transmit the projection data to the tablet computer. The first message-3 is further used to trigger the mobile phone to collect immersive status data of the virtual display.

Figure 22:
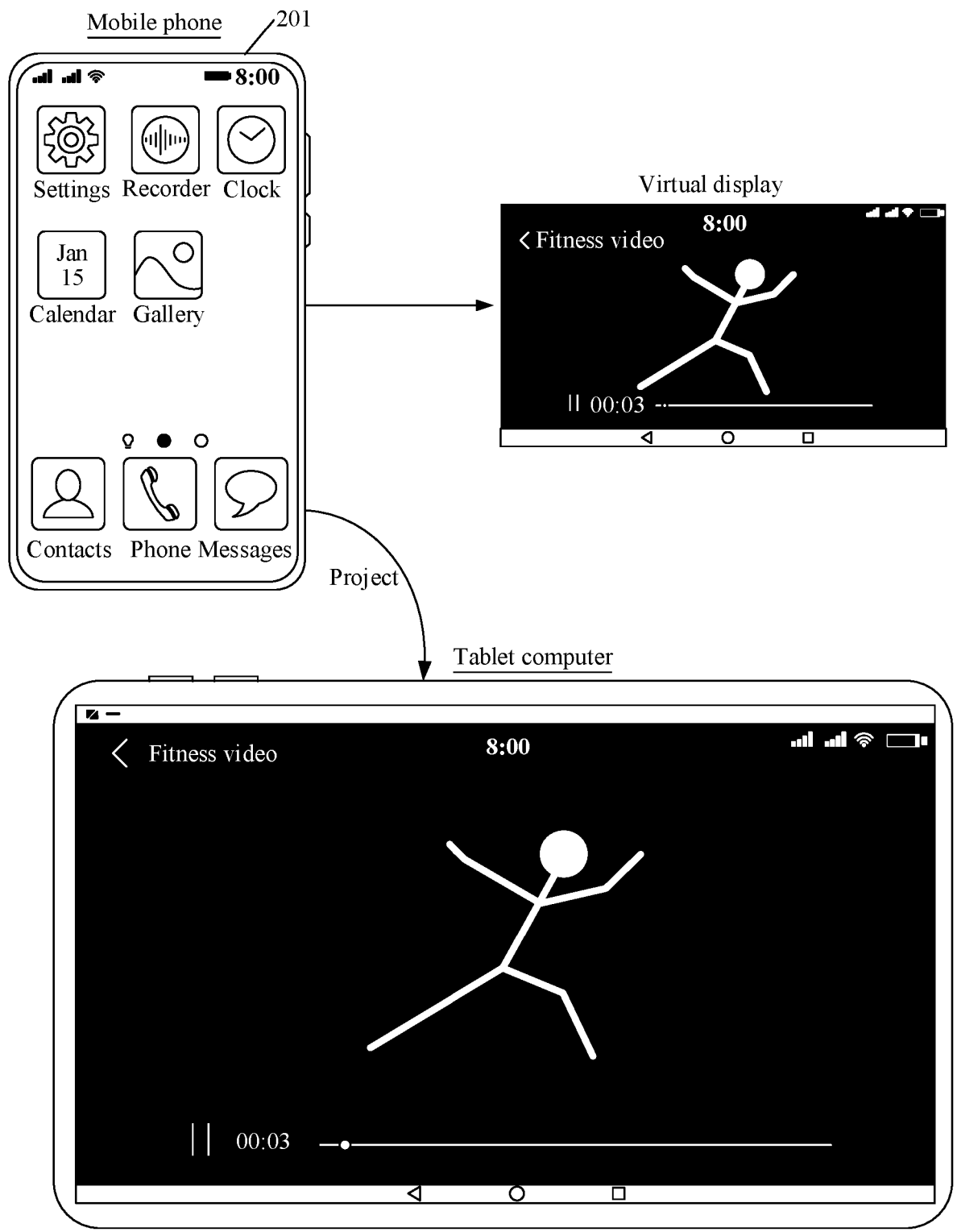
FIG. 22 is a schematic diagram of a UI interface of a mobile phone and a tablet computer in a virtual display projection scenario according to an embodiment of this application.

For example, as shown in FIG. 8A, a UI interface of a video application displayed by the tablet computer includes an "extended" button 803. The "extended" button 803 is configured to trigger the tablet computer to display a video playback picture of the video application in full screen. The foregoing second preset operation may be a tapping operation performed by the user on the "extended" button 803. In response to the tapping operation performed by the user on the "extended" button 803, the tablet computer may display a projection window shown in FIG. 22. However, as shown in FIG. 22, the mobile phone still displays a main interface.

The second preset operation may be any user operation that is received by the tablet computer and that is used to trigger the tablet computer to switch from an immersive display state to a non-immersive display state or switch from a non-immersive display state to an immersive display state. For example, the second preset operation may alternatively be a tapping operation performed by the user on the "Answer" button 1004 in the incoming call notification message 1003 shown in FIG. 10A. For another example, the second preset operation may be a tapping operation performed by the user on the "Hang up" button 1008 in the projection window 1007 shown in FIG. 10B. For another example, the second preset operation may be a tapping operation performed by the user on a new message notification 1103 in the projection window 1102 shown in FIG. 11A. For another example, the second preset operation may be a tapping operation performed by the user on the "Return to video" button 1107 in the projection window 1107 shown in FIG. 11B.

It should be noted that, in the virtual display projection scenario, the user may enable a preset function in a process of projection from the mobile phone to the tablet computer by using a preset function switch in the mobile phone or the tablet computer. The projection window, the setting interface, or the notification bar of the tablet computer may include the foregoing preset function switch. For example, as shown in FIG. 16, the projection window of the tablet computer includes the preset function switch, for example, a "synchronous switch" 1602.

In some other embodiments, in the virtual display projection scenario, the local device (for example, the tablet computer) may also trigger the remote device (for example, the mobile phone) to project a screen to the tablet computer in a plurality of windows (for example, dual windows). Different from the physical display projection scenario, the mobile phone does not display projection interfaces of the plurality of windows.

For example, as shown in FIG. 8A, a UI interface of a video application displayed by the tablet computer includes an "extended" icon 804. The "extended" icon 804 is used to trigger the tablet computer to display a video playback picture of the video application on split screens. In response to a tapping operation performed by the user on the "extended" icon 804, the tablet computer may send a second message to the mobile phone. The second message is used to request the mobile phone to generate, based on the virtual display, projection data of a split-screen display interface triggered by the tapping operation on the "extended" icon 804. For example, the mobile phone may generate projection data corresponding to a virtual display shown in FIG. 23A, FIG. 23B, and FIG. 23C, and send the projection data to the tablet computer. After receiving the projection data, the tablet computer may display a projection window 2301 shown in FIG. 23A, FIG. 23B, and FIG. 23C. The projection window 2301 includes: a window 2303 that displays a home page of a video application and a window 2302 that displays a playback interface of the video application.

Figure 23A:
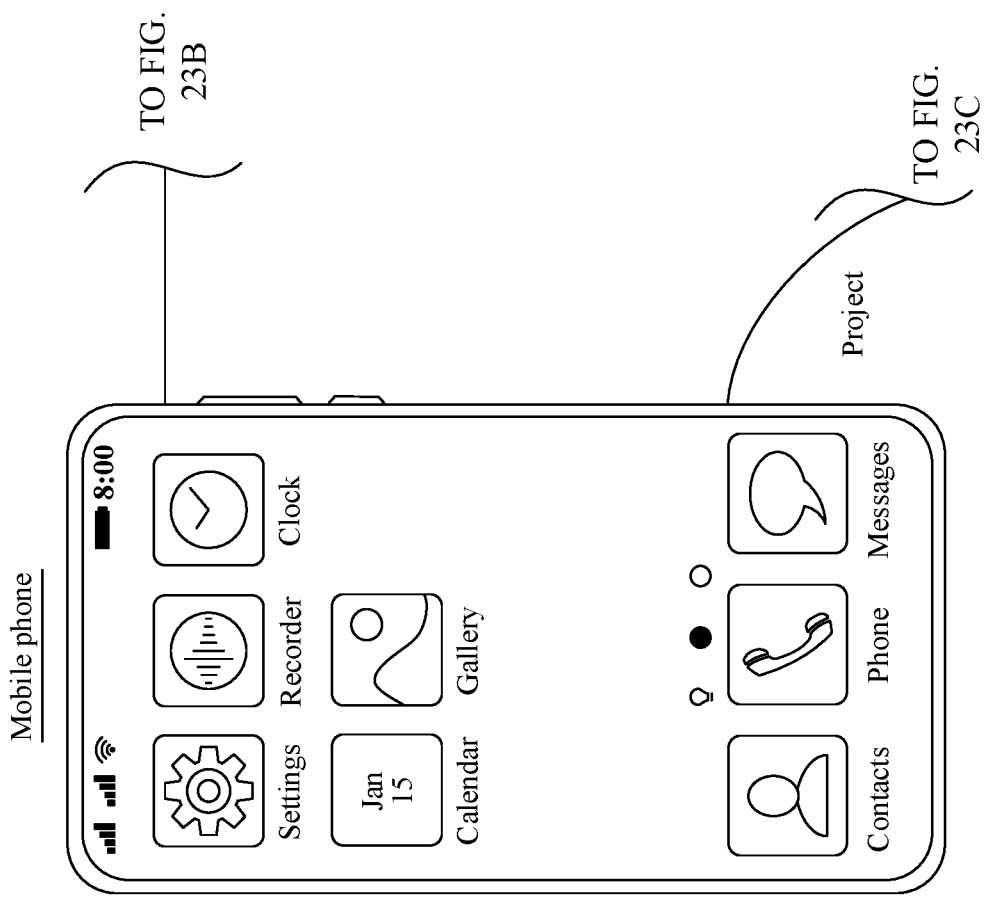
FIG. 23A, FIG. 23B, and FIG. 23C are a schematic diagram of UI interfaces of a mobile phone and a tablet computer in a virtual display projection scenario according to an embodiment of this application.
Figure 23B:
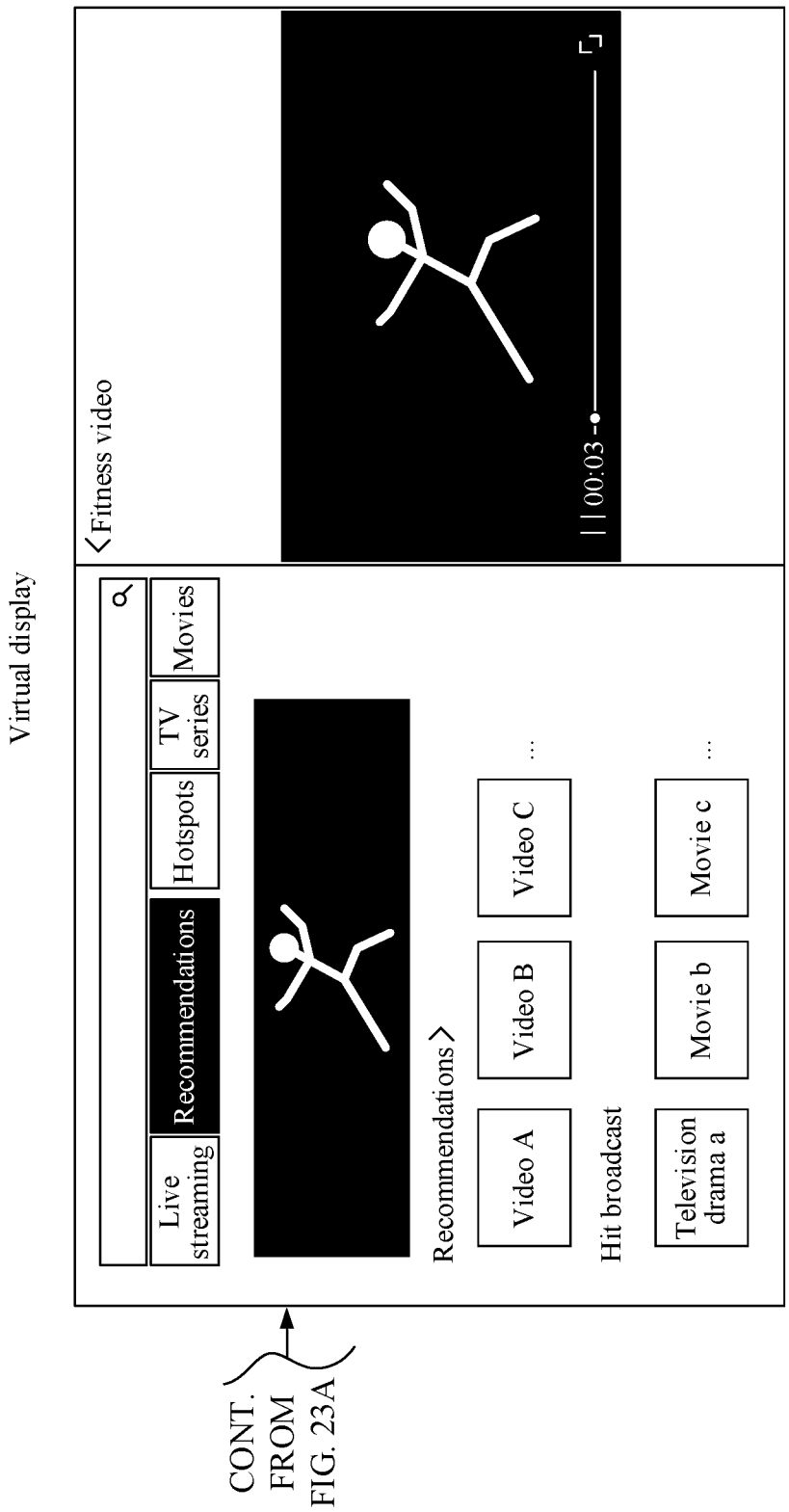
Figure 23C:
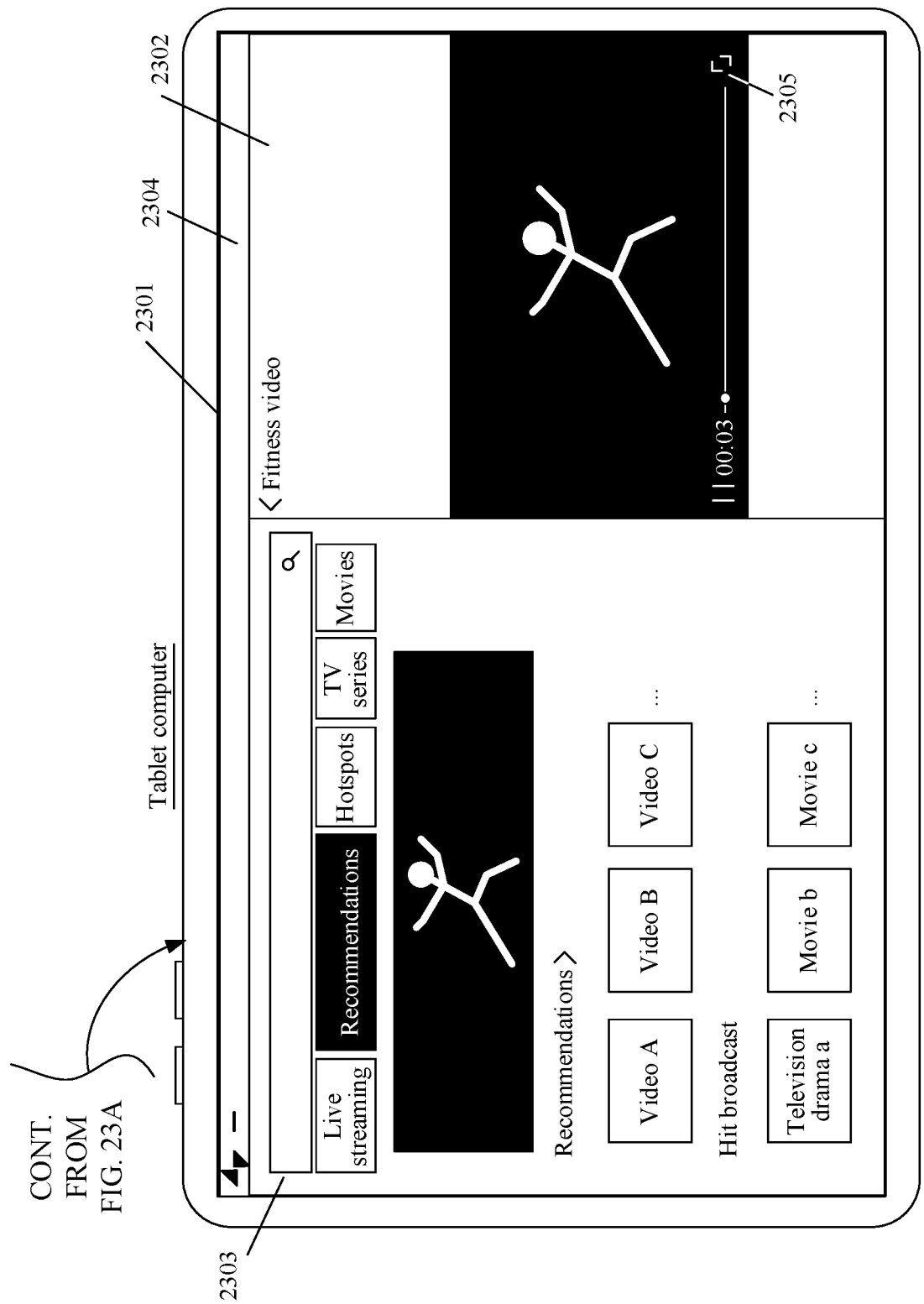

As shown in FIG. 23A, FIG. 23B, and FIG. 23C, the projection window 2301 of the tablet computer includes a title bar 2304. Therefore, the tablet computer is in a non-immersive display state. The window 2302 that is in the projection window 2301 and that is used to display the playback interface of the video application further includes an "extended" button 2305. The tablet computer may receive a tapping operation (that is, a second preset operation) performed by the user on the "extended" button 2305. In response to the tapping operation performed by the user on the "extended" button 2305, the tablet computer may send a third message to the mobile phone. The third message is used to request the mobile phone to generate, based on the virtual display, projection data of a full-screen display interface triggered by the tapping operation on the "extended" button 2305. For example, the mobile phone may generate projection data corresponding to a virtual display shown in FIG. 21, and send the projection data to the tablet computer. After receiving the projection data, the tablet computer may display a projection window shown in FIG. 21. However, the mobile phone still displays the main interface shown in FIG. 21. In this way, the tablet computer switches from the non-immersive display state shown in FIG. 23A, FIG. 23B, and FIG. 23C to the immersive display state shown in FIG. 21.

In some other embodiments, because of the tapping operation performed by the user on the "extended" button 2305, the tablet computer may be triggered to switch from split-screen interfaces of a plurality of windows to a single-window full-screen interface. For example, in response to the tapping operation performed by the user on the "extended" button 2305, the tablet computer may display a projection window shown in FIG. 21. A physical screen size of the mobile phone may be difficult to adapt to multi-window projection data generated based on the virtual display. However, the mobile phone may display the projection data of the single window in the landscape mode. For example, the mobile phone may display the UI interface of the video application shown in FIG. 9A.

Based on this, in response to the tapping operation performed by the user on the "extended" button 2305 shown in FIG. 23A, FIG. 23B, and FIG. 23C, as shown in FIG. 9A, the mobile phone may display the UI interface of the video application in an "immersive display" manner, and indicates the tablet computer to display a corresponding projection window in an "immersive display" manner.

According to the method provided in this embodiment of this application, in a virtual display projection scenario in which the mobile phone projects a screen to the tablet computer by using a plurality of windows, immersive display state synchronization between the tablet computer and the mobile phone may also be implemented.

It should be noted that, during multi-screen collaboration between the local device and the remote device, the local device may display a projection window of the remote device in a full window or a small window. Regardless of whether the local device displays the projection window in full window or small window, if the projection window displayed on the local device displays any of a status bar, a navigation bar, and a title bar, the local device is in the non-immersive display state. If the status bar, navigation bar, and title bar are not displayed on the projection window of the local device, the local device is in the "immersive display state".

Figure 24:
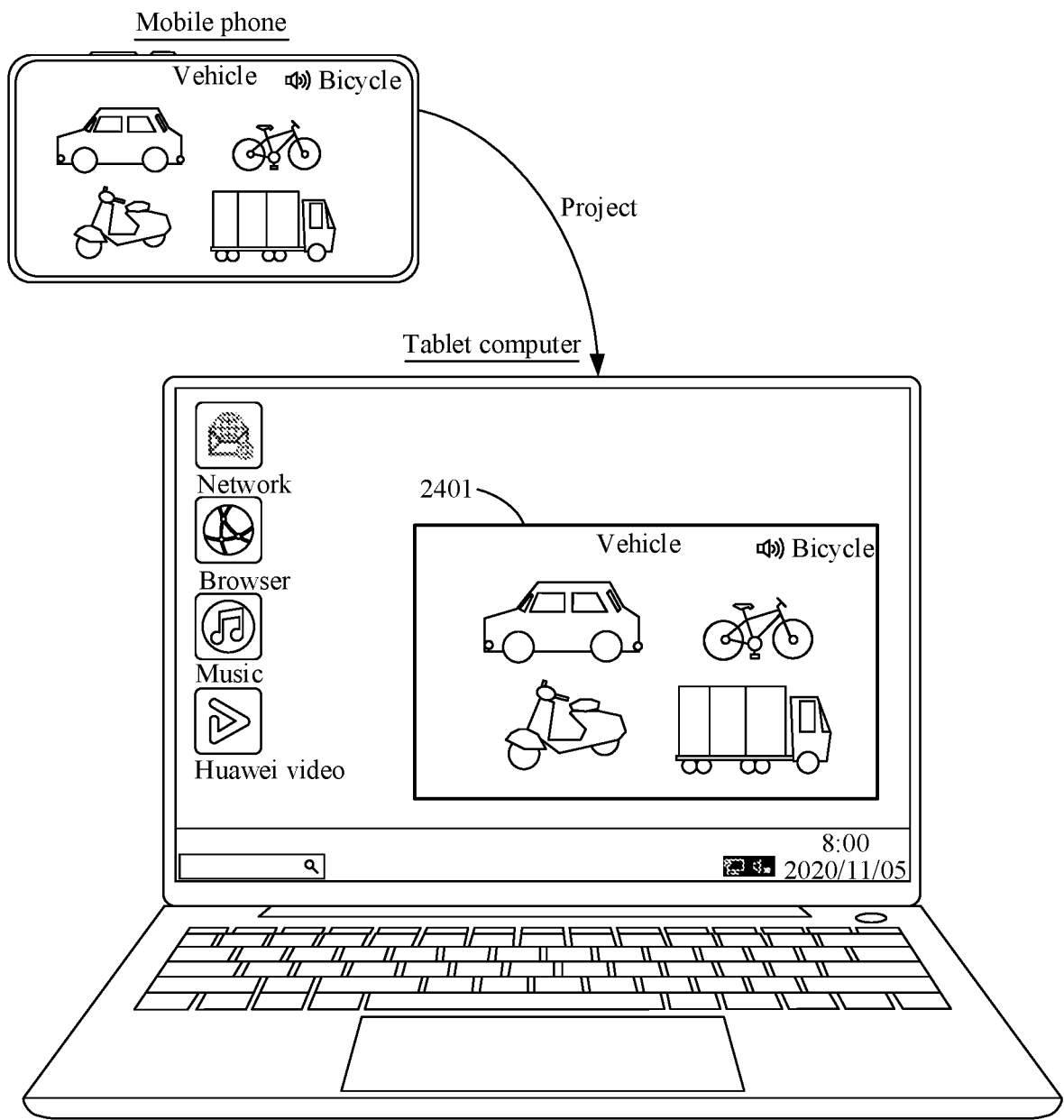
FIG. 24 is a schematic diagram of UI interfaces of a mobile phone and a tablet computer in a physical display projection scenario according to an embodiment of this application.

For example, as shown in FIG. 2A, a laptop computer displays a projection window 210 in a small window. The projection window 210 includes a status bar 212, a navigation bar 213, and a title bar 214. Therefore, the laptop computer is in the "non-immersive display state". For another example, as shown in FIG. 24, a laptop computer displays a projection window 2401 in a small window. The projection window 2401 does not include a status bar, a navigation bar, and a title bar. Therefore, the laptop computer is in an "immersive display state".

For another example, as shown in FIG. 2B, the tablet computer displays the projection window 220 in a full window. The projection window 220 includes a status bar 222, a navigation bar 223, and a title bar 224. Therefore, the tablet computer is in the "non-immersive display state". As shown in FIG. 6B, the tablet computer displays a projection window 630 in a full window. The projection window 630 does not include a status bar, a navigation bar, and a title bar. Therefore, the tablet computer shown in FIG. 6B is in the "immersive display state".

In some other embodiments of this application, an electronic device is provided. The electronic device may include: the foregoing touchscreen, a memory, and one or more processors. The touchscreen, the memory, and the processor are coupled. The memory is configured to store computer program code. The computer program code includes computer instructions. When the processor executes computer instructions, the electronic device may perform functions or steps performed by the mobile phone in the foregoing method embodiments. For a structure of the electronic device, refer to the structure of the electronic device 100 shown in FIG. 1.

In some other embodiments of this application, a display apparatus is provided. The apparatus may be applied to an electronic device including the foregoing touchscreen. The apparatus is configured to perform functions or steps performed by the mobile phone in the foregoing method embodiments.

Figure 25:
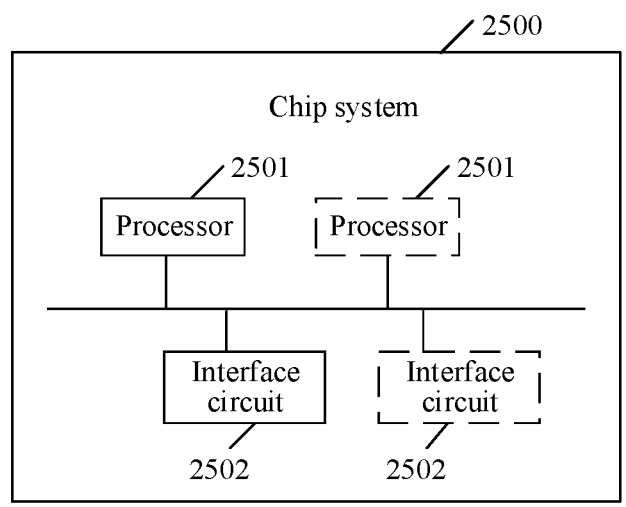
FIG. 25 is a schematic diagram of a structure of a chip system according to an embodiment of this application.

An embodiment of this application further provides a chip system. As shown in FIG. 25, the chip system includes at least one processor 2501 and at least one interface circuit 2502. The processor 2501 and the interface circuit 2502 may be connected to each other through a line. For example, the interface circuit 2502 may be configured to receive a signal from another apparatus (for example, a memory of an electronic device). For another example, the interface circuit 2502 may be configured to send a signal to another apparatus (for example, the processor 2501). For example, the interface circuit 2502 may read instructions stored in the memory, and send the instructions to the processor 2501. When the instructions are executed by the processor 2501, the electronic device is enabled to perform the steps in the foregoing embodiment. Certainly, the chip system may further include another discrete device. This is not specifically limited in this embodiment of this application.

An embodiment of this application further provides a computer storage medium. The computer storage medium includes computer instructions. When the computer instructions run on the foregoing electronic device, the electronic device is enabled to perform functions or steps performed by the mobile phone in the foregoing method embodiments.

An embodiment of this application further provides a computer program product. When the computer program product runs on a computer, the computer is enabled to perform functions or steps performed by the mobile phone in the foregoing method embodiments.

The foregoing descriptions about implementations allow a person skilled in the art to understand that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, the module or unit division is merely logical function division and there may be another division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to a conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes: any medium that can store program code, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A projection display method, applied to a first electronic device, wherein the first electronic device is connected to a second electronic device, and the method comprises:

displaying, by the first electronic device, a first interface comprising first content, wherein the first interface further comprises a status bar and/or a navigation bar of the first electronic device;

projecting, by the first electronic device, the first content to the second electronic device and sending second status data, wherein the second status data indicates that the first electronic device does not hide the status bar and the navigation bar;

switching, by the first electronic device, from displaying the first interface to displaying a second interface, wherein the second interface comprises second content and the second interface does not comprise the status bar and the navigation bar; and projecting, by the first electronic device, the second content to the second electronic device and sending, by the first electronic device, first status data to the second electronic device, wherein the first status data indicates that the first electronic device hides the status bar and the navigation bar.

2. The method according to claim 1, further comprising:
collecting, by the first electronic device, status data of the first electronic device, wherein the status data of the first electronic device is the first status data or the second status data.

3. The method according to claim 2, wherein the collecting, by the first electronic device, status data of the first electronic device comprises:
collecting, by the first electronic device, status data of the first electronic device in response to performing landscape/portrait mode switching.

4. The method according to claim 2, wherein the collecting, by the first electronic device, status data of the first electronic device further comprises:
collecting, by the first electronic device, status data of the first electronic device in response to receiving a first preset operation of a user.

5. The method according to claim 2, wherein collecting, by the first electronic device, status data of the first electronic device further comprises:
collecting status data of the first electronic device in response to a display interface of the first electronic device being switched from an interface of an application to an interface of another application.

6. The method according to claim 2, wherein the collecting, by the first electronic device, status data of the first electronic device further comprises:
periodically collecting, by the first electronic device, status data of the first electronic device.

7. The method according to claim 2, wherein:
at least one of the first interface, the second interface, a setting interface of the first electronic device, or a notification bar of the first electronic device comprises a preset function switch, wherein the preset function switch is used to start or close a preset function and the preset function is a function of synchronizing the status data of the first electronic device to the second electronic device by the first electronic device; and
receiving, by the first electronic device and before the collecting status data of the first electronic device, the method further comprises an enabling operation performed by the user on the preset function switch.

8. The method according to claim 1, further comprising:
displaying, by the first electronic device, the first content or the second content on a virtual display that is generated in response to the first electronic device adapting to a screen size of the second electronic device; and collecting, by the first electronic device, the status data of the first electronic device after receiving a first message from the second electronic device, wherein:

the status data of the first electronic device is status data of the virtual display, the status data of the virtual display is the first status data or the second status data, wherein the first status data indicates that the first electronic device hides the status bar and the navigation bar and the second status data indicates that the first electronic device does not hide the status bar and the navigation bar;

the first message is sent in response to the second electronic device performing landscape/portrait mode switching, and the first message indicates to the first electronic device to update a projection interface of the virtual display in response to the landscape/portrait mode switching of the second electronic device; and the first message is further used to trigger the first electronic device to collect the status data of the virtual display.

9. The method according to claim 1, further comprising:

displaying, by the first electronic device, the first content or the second content on a virtual display that is generated in response to the first electronic device adapting to a screen size of the second electronic device; and collecting, by the first electronic device, the status data of the first electronic device after receiving a first message from the second electronic device, wherein:

the status data of the first electronic device is status data of the virtual display, the status data of the virtual display is the first status data or the second status data, wherein the first status data indicates that the first electronic device hides the status bar and the navigation bar and the second status data indicates that the first electronic device does not hide the status bar and the navigation bar;

the first message is sent in response to the second electronic device receiving a second preset operation, and the first message indicates to the first electronic device to update a projection interface of the virtual display in response to the second preset operation; and the first message is further used to trigger the first electronic device to collect the status data of the virtual display.

10. The method according to claim 1, wherein:

the first status data comprises an event identifier and information about a first event and the second status data comprises the event identifier and information about a second event; and the information about the first event indicates an event of hiding the status bar and the navigation bar during projection from the first electronic device to the second electronic device, and the information about the second event indicates an event of displaying the status bar and the navigation bar during projection from the first electronic device to the second electronic device.

11. The method according to claim 1, wherein:

the first content and the second content are interface images of a video application; or the first content and the second content are interface images of a game application.

12. The method according to claim 1, wherein:

the first interface further comprises third content, and the first electronic device displays the first content and the third content in two windows of the first interface on split screens; and the first interface comprises a status bar and/or a navigation bar of the first electronic device and that specifically includes each of the two windows of the first interface, wherein the each of the two windows of the first interface comprises the status bar and/or the navigation bar.

13. The method according to claim 1, wherein:

the second interface further comprises fourth content and the first electronic device displays the second content and the fourth content in two windows of the second interface on split screens; and the second interface does not comprise the status bar and the navigation bar and is specifically at least one of the two windows of the second interface that does not comprise the status bar and the navigation bar.

14. A projection display method, applied to a second electronic device, wherein the second electronic device is connected to a first electronic device, and the method comprises:

receiving, by the second electronic device, first content and second status information from the first electronic device, wherein the second status data indicates that the first electronic device does not hide a first status bar and a navigation bar;

displaying, by the second electronic device, a first projection window comprising the first content, wherein the first projection window further comprises any one of the status bar, the navigation bar, and a title bar of a projection application;

receiving, by the second electronic device, second content and first status information from the first electronic device, wherein the first status data indicates that the first electronic device hides the status bar and the navigation bar; and switching, by the second electronic device, from displaying the first projection window to displaying a second projection window, wherein the second projection window comprises the second content, and the second projection window does not comprise the status bar, the navigation bar, and the title bar.

15. The method according to claim 14, wherein the method further comprises:

sending, by the second electronic device, a first message to the first electronic device in response to performing landscape/portrait mode switching, wherein the first message indicates the first electronic device to update, in response to the landscape/portrait mode switching, a projection interface of a virtual display that is generated when the first electronic device adapts to a screen size of the second electronic device; or sending, by the second electronic device, a first message to the first electronic device in response to receiving a second preset operation, wherein the first message indicates the first electronic device to update, in response to the second preset operation, a projection interface of a virtual display that is generated when the first electronic device adapts to a screen size of the second electronic device, wherein:

the first message is further used to trigger the first electronic device to collect status data of the first electronic device, wherein the status data of the first electronic device is status data of the virtual display and the status data of the first electronic device is the first status data or the second status data.

16. The method according to claim 14, wherein:
the first status data comprises an event identifier and information about a first event, and the second status data comprises the event identifier and information about a second event; and
the information about the first event indicates an event of hiding the status bar and the navigation bar during projection from the first electronic device to the second electronic device, and the information about the second event indicates an event of displaying the status bar and the navigation bar during projection from the first electronic device to the second electronic device.

17. The method according to claim 14, wherein:
the first content and the second content are interface images of a video application; or
the first content and the second content are interface images of a game application.

18. The method according to claim 14, wherein the first projection window further comprises third content projected by the first electronic device, and the second electronic device displays the first content and the third content in two windows of the first projection window on split screens, wherein each of the two windows of the first projection window comprises any one of the status bar, the navigation bar, and the title bar.

19. An electronic device, wherein the electronic device is a first electronic device, the first electronic device is connected to a second electronic device, and the first electronic device comprises:
a communication device, a display, a memory, and one or more processors, wherein the communication device, the display, the memory, and the processor are coupled, the memory is configured to store computer program code, the computer program code comprises computer instructions, and in response to the computer instructions being executed by the first electronic device, the first electronic device is enabled to perform operations comprising:
displaying a first interface comprising first content, wherein the first interface further comprises a status bar and/or a navigation bar of the first electronic device;
projecting the first content to the second electronic device and sending second status data to the second electronic device via the communication device, wherein the second status data indicates that the first electronic device does not hide the status bar and the navigation bar;
switching from displaying the first interface to displaying a second interface, wherein the second interface comprises second content and the second interface does not comprise the status bar and the navigation bar; and
projecting the second content to the second electronic device and sending first status data to the second electronic device via the communication device, wherein the first status data indicates that the first electronic device hides the status bar and the navigation bar.

20. An electronic device, wherein the electronic device is a second electronic device, the second electronic device is connected to a first electronic device, and the second electronic device comprises:
a communication device, a display, a memory, and one or more processors, wherein the communication device, the display, the memory, and the processor are coupled, the memory is configured to store computer program code, the computer program code comprises computer instructions, and in response to the computer instructions being executed by the second electronic device, the second electronic device is enabled to perform operations comprising:
receiving first content and second status information from the first electronic device via the communication device, wherein the second status data indicates that the first electronic device does not hide the first status bar and the navigation bar;
displaying a first projection window comprising the first content, wherein the first projection window further comprises any one of the status bar, the navigation bar, and a title bar of a projection application;
receiving second content and first status information from the first electronic device via the communication device, wherein the first status data indicates that the first electronic device hides the status bar and the navigation bar; and
switching from displaying the first projection window to displaying a second projection window, wherein the second projection window comprises the second content, and the second projection window does not comprise the status bar, the navigation bar, and the title bar.

* * * * *